US011760516B2

(12) United States Patent
Pitzer et al.

(10) Patent No.: US 11,760,516 B2
(45) Date of Patent: Sep. 19, 2023

(54) AUTOMATED PACKING OF CROPS

(71) Applicant: Harvest CROO, LLC, Plant City, FL (US)

(72) Inventors: Robert Henry Pitzer, Tampa, FL (US); Scott Gordon Scarpinato, Seminole, FL (US); Ryan McGee, Tampa, FL (US)

(73) Assignee: HARVEST CROO, LLC, Plant City, FL (US)

( * ) Notice: Subject to any disclaimer, the term of this patent is extended or adjusted under 35 U.S.C. 154(b) by 20 days.

(21) Appl. No.: 17/691,481

(22) Filed: Mar. 10, 2022

(65) Prior Publication Data
US 2022/0194641 A1   Jun. 23, 2022

Related U.S. Application Data

(63) Continuation-in-part of application No. 17/547,642, filed on Dec. 10, 2021, which is a continuation of
(Continued)

(51) Int. Cl.
*B65B 25/04* (2006.01)
*B65B 35/24* (2006.01)
(Continued)

(52) U.S. Cl.
CPC .............. *B65B 25/045* (2013.01); *B65B 1/22* (2013.01); *B65B 1/32* (2013.01); *B65B 25/046* (2013.01); *B65B 35/24* (2013.01)

(58) Field of Classification Search
CPC .... B65B 1/04; B65B 1/06; B65B 1/08; B65B 1/22; B65B 1/30; B65B 1/32; B65B 1/34;
(Continued)

(56) References Cited

U.S. PATENT DOCUMENTS 1,950,961 A * 3/1934 Allen .................... B65B 25/046
  53/145
1,974,192 A * 9/1934 Paxton .................. B65B 25/046
  493/453
(Continued)

FOREIGN PATENT DOCUMENTS

DE   19958761    6/2001
EP   0358847     3/1990
(Continued)

OTHER PUBLICATIONS

International Serach Report and Written Opinion from Int'l Application No. PCT/US22/19788 dated Jul. 12, 2022.
(Continued)

*Primary Examiner* — Stephen F. Gerrity
(74) *Attorney, Agent, or Firm* — BRYAN CAVE LEIGHTON PAISNER LLP

(57) ABSTRACT

A system including a flume. The flume can include a fluid and be configured to receive crops. The system also can include crop selectors each sized to move the crops individually from the flume into a scale. The system additionally can include the scale. The scale can be configured to weigh the crops while the crops are in the scale. The system further can include a container carrier configured to (i) hold a container that is submerged in the fluid while the crops are dumped from the scale into the container and (ii) lift the container out of the fluid to allow the fluid to drain from the container while the container holds the crops. Other embodiments are described.

20 Claims, 33 Drawing Sheets

Related U.S. Application Data application No. 16/803,607, filed on Feb. 27, 2020, now Pat. No. 11,198,529.

(60) Provisional application No. 63/159,359, filed on Mar. 10, 2021, provisional application No. 62/827,466, filed on Apr. 1, 2019.

(51) Int. Cl.
*B65B 1/32* (2006.01)
*B65B 1/22* (2006.01)

(58) Field of Classification Search
CPC .......... B65B 1/46; B65B 5/068; B65B 25/04; B65B 25/045; B65B 25/046; B65B 35/24; B65B 43/40
USPC ............................................ 53/235, 245, 502
See application file for complete search history.

(56) References Cited

U.S. PATENT DOCUMENTS

| | | | |
|---|---|---|---|
| 2,583,571 A | 1/1952 | Howe | |
| 2,626,042 A | 1/1953 | Aldridge | |
| 2,647,670 A | 8/1953 | Cox | |
| 3,099,115 A | 7/1963 | McKibben et al. | |
| 3,344,579 A | 3/1967 | Gentry et al. | |
| 3,447,337 A | 6/1969 | Skruch et al. | |
| 3,460,332 A | 8/1969 | Bucheke et al. | |
| 3,470,670 A | 10/1969 | Gorin | |
| 3,550,347 A | 12/1970 | Coates | |
| 3,552,108 A | 1/1971 | Kattan et al. | |
| 3,565,250 A | 2/1971 | Borba et al. | |
| 3,587,674 A | 6/1971 | Adkin | |
| 3,596,456 A | 8/1971 | Quick | |
| 3,643,400 A | 2/1972 | Barbet | |
| 3,643,799 A * | 2/1972 | Sheetz | B07B 13/04 209/665 |
| 3,656,272 A | 4/1972 | Sheetz | |
| 3,694,996 A | 10/1972 | Carlsen | |
| 3,696,584 A | 10/1972 | Rickard | |
| 3,698,171 A | 10/1972 | Hecht | |
| 3,949,861 A | 4/1976 | Scholtens et al. | |
| 4,003,193 A | 1/1977 | Haws | |
| 4,034,542 A | 7/1977 | Loehr | |
| 4,051,645 A | 10/1977 | Warkentin | |
| 4,064,682 A | 12/1977 | Haws | |
| 4,257,217 A | 3/1981 | McClendon | |
| 4,291,525 A | 9/1981 | Benkert | |
| 4,519,191 A | 5/1985 | Ledebuhr et al. | |
| 4,532,757 A | 8/1985 | Tutle | |
| 4,663,925 A | 5/1987 | Terada | |
| 4,693,285 A | 9/1987 | Chang | |
| 4,807,422 A | 2/1989 | Blanc | |
| 4,843,561 A | 6/1989 | Larson | |
| 5,024,052 A | 6/1991 | Bragg et al. | |
| 5,242,250 A | 9/1993 | Compagoni | |
| 5,345,748 A * | 9/1994 | Powell, Jr. | G01G 13/248 53/244 |
| 5,544,474 A | 8/1996 | Finkelstein | |
| 5,551,210 A * | 9/1996 | Williamson | B65B 1/06 53/377.6 |
| 6,012,270 A | 1/2000 | Vine | |
| 6,029,764 A | 2/2000 | Schubert | |
| 6,105,352 A | 8/2000 | Tremblay et al. | |
| 6,311,795 B1 | 11/2001 | Skotnikov et al. | |
| 6,338,236 B1 | 1/2002 | Rodriguez | |
| 6,671,582 B1 | 12/2003 | Hanley | |
| 7,159,373 B2 | 1/2007 | Blanc | |
| 7,472,799 B2 | 1/2009 | Cadiente et al. | |
| 7,613,560 B2 | 11/2009 | Nishi et al. | |
| 7,694,458 B2 | 4/2010 | Fukuyama et al. | |
| 8,306,663 B2 | 11/2012 | Wickham | |
| 8,336,893 B2 | 12/2012 | Grossberger | |
| 10,138,011 B2 | 11/2018 | Ruissen et al. | |

| | | | |
|---|---|---|---|
| 2002/0185284 A1 | 12/2002 | Bendix et al. | |
| 2004/0159527 A1* | 8/2004 | Williamson | B65B 25/046 198/459.1 |
| 2005/0016152 A1 | 1/2005 | Schwarz | |
| 2006/0092756 A1 | 5/2006 | Lindbeck et al. | |
| 2006/0150602 A1 | 7/2006 | Stimmann | |
| 2006/0213167 A1 | 9/2006 | Koselka et al. | |
| 2008/0046130 A1 | 2/2008 | Faivre et al. | |
| 2008/0066429 A1 | 3/2008 | De Greef | |
| 2010/0050588 A1 | 3/2010 | Ramirez | |
| 2010/0108092 A1 | 5/2010 | Zaharis | |
| 2010/0139235 A1 | 6/2010 | Pellenc et al. | |
| 2010/0152981 A1 | 6/2010 | Nishi et al. | |
| 2011/0022231 A1 | 1/2011 | Walker et al. | |
| 2011/0252760 A1 | 10/2011 | Bravo Trinidad et al. | |
| 2013/0138244 A1 | 5/2013 | Nagasaka et al. | |
| 2014/0260148 A1 | 9/2014 | Jens | |
| 2015/0015697 A1 | 1/2015 | Redden et al. | |
| 2015/0230403 A1 | 8/2015 | Jung et al. | |
| 2015/0305239 A1 | 10/2015 | Jung | |
| 2015/0307257 A1 | 10/2015 | Padda et al. | |
| 2015/0353212 A1 | 12/2015 | Williamson | |
| 2016/0157428 A1 | 6/2016 | Pitzer | |
| 2016/0161238 A1 | 6/2016 | Pitzer | |
| 2017/0015174 A1 | 1/2017 | Ruppert | |
| 2018/0035611 A1 | 2/2018 | D'Arrigo et al. | |
| 2018/0162571 A1 | 6/2018 | Nijland et al. | |
| 2019/0014719 A1 | 1/2019 | Treffer et al. | |
| 2020/0307838 A1 | 10/2020 | Morrow et al. | |

FOREIGN PATENT DOCUMENTS

| | | | |
|---|---|---|---|
| EP | 1958494 | 8/2008 | |
| EP | 3082397 | 8/2019 | |
| FR | 2675008 | 10/1992 | |
| GB | 2290517 A * | 1/1996 | B65B 25/045 |
| JP | H08023746 A | 1/1996 | |
| JP | H09145367 A | 6/1997 | |
| JP | 2757480 | 5/1998 | |
| JP | 2001095348 | 4/2001 | |
| JP | 2011206014 | 10/2011 | |
| JP | 2012148380 | 8/2012 | |
| KR | 101488221 B1 * | 2/2015 | B65B 25/045 |
| KR | 101767134 | 8/2017 | |
| WO | 2010063075 | 6/2010 | |
| WO | 2016133918 | 8/2016 | |

OTHER PUBLICATIONS

International Search Report and Written Opinion for Int'l Application No. PCT/US20/17673 dated Jun. 10, 2020.
International Search Report and Written Opinion for PCT/US2014/071411 dated Apr. 16, 2015. dated Apr. 16, 2015.
The Japan Times, "Latest robot can pick strawberry fields forever," http://www.japantimes.co.jp/news/2013/09/26/business/latest-robot-can-pick-strawberry-fields-forever/# Vln_X9LF-iA, Sep. 26, 2013. Sep. 26, 2013.
National Physical Laboratory (UK), "Robot strawberry pickers," http://www.npl.co.uk/news/robot-strawberry-pickers, Aug. 7, 2013. Aug. 7, 2013.
ASME, "Smart Robots for Picking Fruit," https://www.asme.org/engineering-topics/articles/robotics/smart-robots-for-picking-fruit. May 2013. May 1, 2013.
U.S. Department of Agriculture: National Institute of Food and Agriculture, "USDA Grants Support Federal Partnership for Robotics Research," http://www.csrees.usda.gov/newsroom/news/2013news/10251_robots.html, Oct. 25, 2013. Oct. 25, 2013.
CNS News, "Gov't Pays $1,123,463 to Develop Strawberry Harvest-Aiding Robots," http://cnsnews.com/article/eric-schneider/govt-pays-1123463-develop-strawberry-harvest-aiding-robots, Nov. 8, 2013. Nov. 8, 2013.
Singularity Hub, "Japan's Robot Picks Only the Ripest Strawberries," https://singularityhub.com/2010/12/04/japans-robot-picks-only-the-ripest-strawberries, Dec. 4, 2010. Dec. 4, 2010.
CNET, "Strawberry-picking robot knows when they're ripe," https://www.cnet.com/news/strawberry-picking-robot-knows-when-theyre-ripe/, Dec. 13, 2010. Dec. 13, 2010.

(56) References Cited

OTHER PUBLICATIONS

CNET, "$50,000 strawberry picking robot to go on sale in Japan," http://cnet.com/news/50000-strawberry-picking-robot-to-go-on-sale-in-japan/, Sep. 27, 2013. Sep. 27, 2013.
Techcrunch, "Video: Impressive Strawberry Picking Robot," http://techcrunch.com/2010/12/01/video-impressive-strawberry-picking-robot/, Dec. 1, 2010. Dec. 1, 2010.
Wired, "Robot Learns to Pick the Sweetest, Ripest Strawberries," http://www.wired.com/2012/08/st_strawberry_robot/, Aug. 6, 2012. Aug. 6, 2012.
Agrobot, "Strawbery Harvesters," http://www.agrobot.com/products.html, Jan. 16, 2015. Jan. 16, 2015.
Robotic Harvesting, LLC, "Products: Robotic Strawberry Harvester," http://roboticharvesting.com/products.html, Jan. 16, 2015. Jan. 16, 2015.
The Packer, "Robotic harvesters may be the future," http://www.thepacker.com/fruit-vegetable-news/shipping-profiles/Robotic-harvesters-may-be-the-futur-256744101.html?print-1, Apr. 25, 2014. Apr. 25, 2014.
CropCare, "PA 1400 Picking Assistant," http://www.cropcareequipment.com/vegetable_equip/picking_assistant.php, Jan. 16, 2015. Jan. 16, 2015.
International Search Report and Written Opinion from PCT/US2016/018099, dated May 12, 2016. dated May 12, 2016.

* cited by examiner

AUTOMATED PACKING OF CROPS

CROSS-REFERENCE TO RELATED APPLICATIONS

This application claims the benefit of U.S. Provisional Application No. 63/159,359, filed Mar. 10, 2021. This application also is a continuation-in-part of U.S. patent application Ser. No. 17/547,642, filed Dec. 10, 2021, which is a continuation of U.S. patent application Ser. No. 16/803,607, filed Feb. 27, 2020, which claims the benefit of U.S. Provisional Application No. 62/827,466, filed Apr. 1, 2019. U.S. Provisional Application Nos. 63/159,359 and 62/827,466, and U.S. patent application Ser. Nos. 17/547,642 and 16/803,607 are incorporated herein by reference in their entirety. Additionally, U.S. patent application Ser. No. 16/272,638, filed Feb. 11, 2019, and published as U.S. Patent Application Publication No. 2019/0166764 on Jun. 6, 2019 (referred to herein as the "'764 Publication"), is incorporated herein by reference in its entirety.

TECHNICAL FIELD

This disclosure relates generally to crop harvesting, and relates more particularly to automated systems and methods for automated packing of plants.

BACKGROUND

Various crops, such as strawberries, have been harvested, inspected, and packed typically using manual labor due to the delicate nature of the crops and the selective nature of the harvesting. For example, laborers perform the harvesting by selectively picking ripe crops from the plants while leaving unripe crops on the plants for later harvesting when they have ripened. The high seasonal demand for laborers and the limited labor force has resulted in increased labor costs and crops being left unpicked. Further, labor shortages have resulted in portions of fields being left unplanted in order to avoid the effort, expense, and waste involved with growing unpicked crops.

BRIEF DESCRIPTION OF THE DRAWINGS

To facilitate further description of the embodiments, the following drawings are provided in which.

Figure 1:
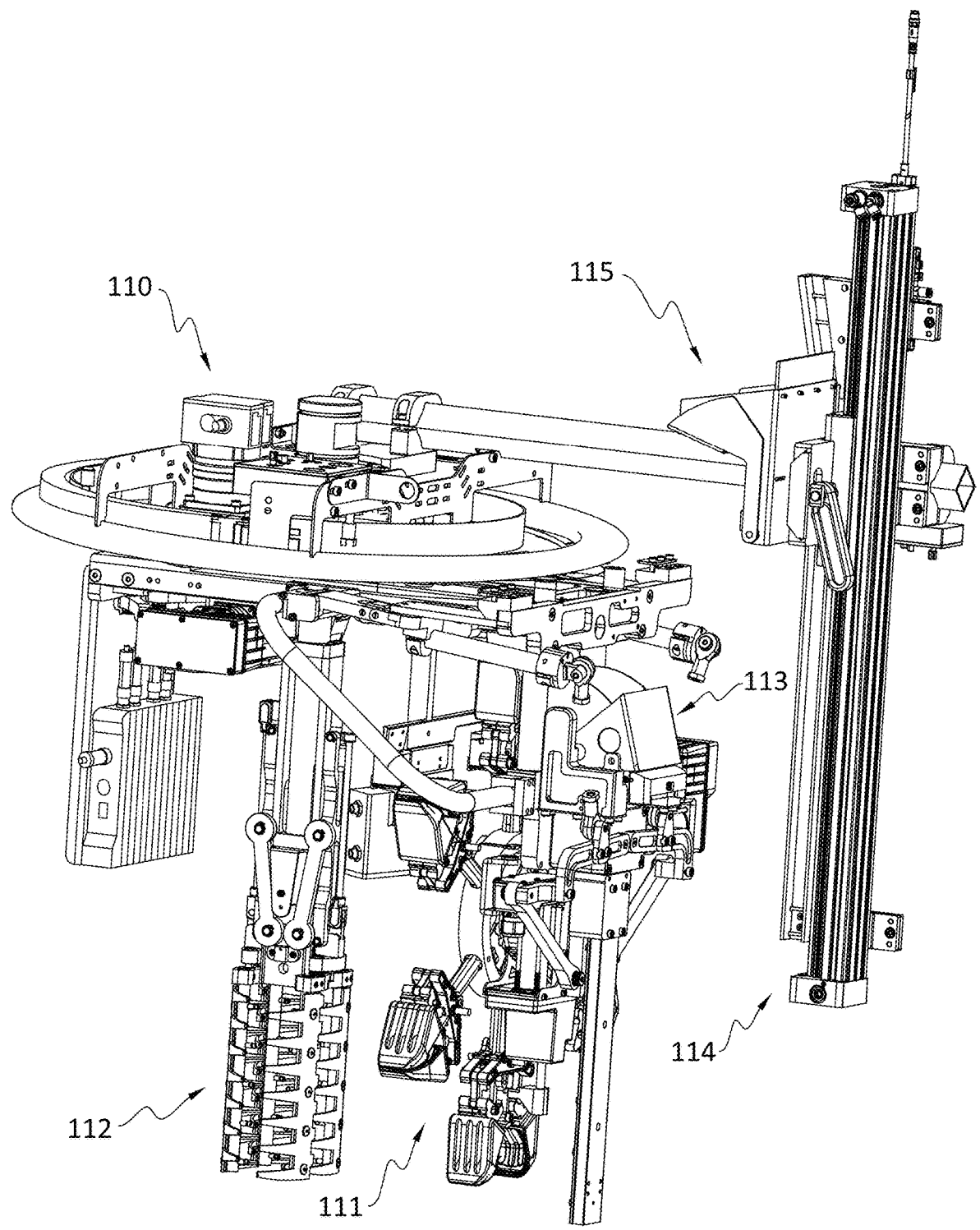
FIG. 1 illustrates a perspective view of a harvesting robot, a hopper, and a hopper track, according to an embodiment.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Some embodiments include a harvesting vehicle including harvesters configured to pick crops. The system also can include a crop fluid transporter configured to transport the crops. The system additionally can include one or more inspectors to classify the crops into a classification. The system further can include one or more packers configured to pack the crops in containers.

Various embodiments include a system including a flume. The flume can include a fluid and be configured to receive crops. The system also can include crop selectors each sized to move the crops individually from the flume into a scale. The system additionally can include the scale. The scale can be configured to weigh the crops while the crops are in the scale. The system further can include a container carrier configured to (i) hold a container that is submerged in the fluid while the crops are dumped from the scale into the container and (ii) lift the container out of the fluid to allow the fluid to drain from the container while the container holds the crops.

A number of embodiments include a method of providing a system. The method can include providing a flume including a fluid and configured to receive crops. The method also can include providing crop selectors each sized to move the crops individually from the flume into a scale. The method additionally can include providing the scale. The scale is configured to weigh the crops while the crops are in the scale. The method further can include providing a container carrier configured to (i) hold a container that is submerged in the fluid while the crops are dumped from the scale into the container and (ii) lift the container out of the fluid to allow the fluid to drain from the container while the container holds the crops.

Additional embodiments include a method. The method can include receiving crops in a fluid in a flume. The method also can include individually moving the crops, using crop selectors, from the flume into a scale. The scale weighs the crops while the crops are in the scale. The method additionally can include dumping the crops from the scale into a container held by a container carrier while the container is submerged in the fluid. The method further can include lifting the container carrier to raise the container out of the fluid to allow the fluid to drain from the container while the container holds the crops.

Various embodiments include a harvesting vehicle including harvesters configured to pick crops. The harvesting vehicle also can include a crop fluid transporter configured to float and transport the crops in a fluid on the harvesting vehicle.

A number of embodiments include a method of providing a harvesting vehicle. The method can include providing harvesters configured to pick crops. The method also can include providing a crop fluid transporter configured to float and transport the crops in a fluid on the harvesting vehicle.

Additional embodiments include a method. The method can include picking crops using harvesters on a harvesting vehicle. The method also can include floating and transporting the crops in a fluid on the harvesting vehicle.

Various embodiments include a system including one or more inspectors each configured to automatically inspect crops individually to classify the crops into a classification including two or more classes. The system also can include one or more respective separators associated with each of the one or more inspectors. The one or more respective separators can be configured to automatically physically separate the crops into two or more areas based on the classification.

A number of embodiments include a method of providing a system. The method can include providing one or more inspectors each configured to automatically inspect crops individually to classify the crops into a classification including two or more classes. The method also can include providing one or more respective separators associated with each of the one or more inspectors. The one or more respective separators can be configured to automatically physically separate the crops into two or more areas based on the classification.

Additional embodiments include a method. The method can include automatically inspecting crops, using one or more inspectors, to individually to classify the crops into a classification including two or more classes. The method also can include automatically physically separating the crops, using one or more respective separators associated with each of the one or more inspectors, into two or more areas based on the classification.

In a number of embodiments, crops, such as strawberries or other suitable crops, can be picked, transported, inspected, and packed delicately to avoid bruising or other damage to the crops. In several embodiments, the crops can be picked by robot claws and deposited into a cushioned container referred to herein as a trampoline. For example, the crops can be picked using a harvesting robot, such as the harvesting robots described and shown in the '764 Publication.

In some embodiments, the trampoline can hold the crops until the robot completes picking the plant. In many embodiments, as the robot transitions to the next plant, crops in the trampoline can be transferred to a hopper. In some embodiments, the hopper can move to a hold position to wait to dump the crops in a trough with other hoppers associated with that trough. In various embodiments, the hoppers containing crops can dump into trough with fluid flowing simultaneously in the trough. In some embodiments, crops can flow into a soak tank via the troughs and transfer tubes. In many embodiments, crop debris and/or heat buildup can be removed in the soak tank during flow to a lift conveyor.

In several embodiments, the lift conveyor can extract crops by a continuous flow of fluid that contains the crops draining through buckets of the lift conveyor. In some embodiments, the lift conveyor can drop crops into a top-level drop tank for secondary rinse and/or crop heat removal. In several embodiments, crops can circulate in the drop tank until removed by extraction conveyors, and in some embodiments can then be deposited in an inspection inlet of an inspector.

In various embodiments, as crops drop through the inspector, the quality of the crops can be assessed, and rejected crops can be removed from the crop flow. In a number of embodiments, the accepted crops can exit the inspector and enter a packer. In many embodiments, the packer can weigh crops to a weight threshold, and can transfer the crops to a container (e.g., clamshell). In some embodiments, after the containers are filled, the containers can be removed to run through a dryer. In various embodiments, after the dryer, the containers can be placed in flats for palletizing.

Figure 2:
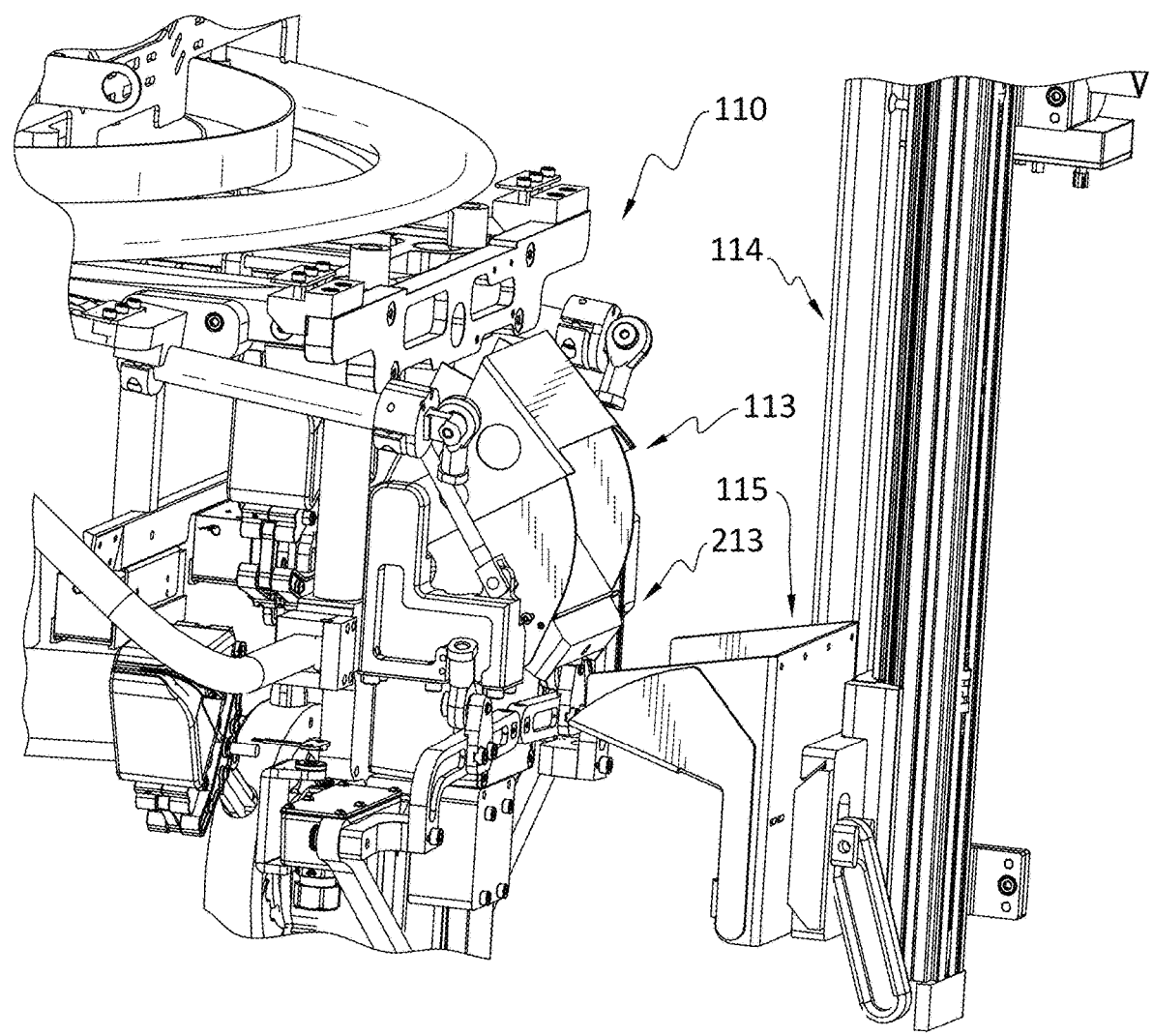
FIG. 2 illustrates an enlarged perspective view of the harvesting robot of FIG. 1, the hopper of FIG. 1, and the hopper track of FIG. 1, with the hopper at a lowest position on the hopper track.
Figure 3:
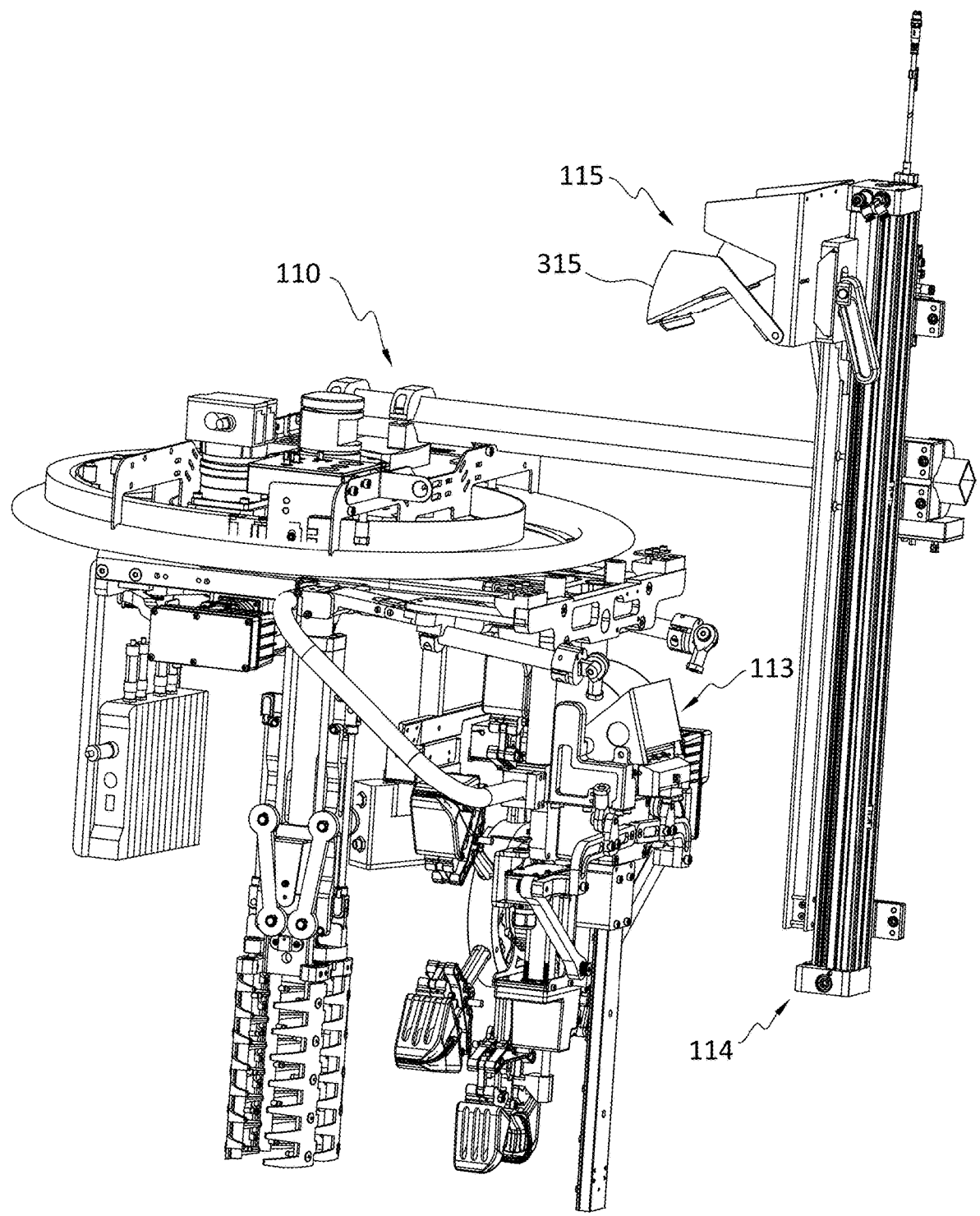
FIG. 3 illustrates a perspective view of the harvesting robot of FIG. 1, the hopper of FIG. 1, and the hopper track of FIG. 1, with the hopper at a highest position on the hopper track.

Turning to the drawings, FIG. 1 illustrates a perspective view of a harvesting robot 110, a hopper 115, and a hopper track 114. FIG. 2 illustrates an enlarged perspective view of harvesting robot 110, hopper 115, and hopper track 114, with hopper 115 at a lowest position on hopper track 114. FIG. 3 illustrates a perspective view of harvesting robot 110, hopper 115, and hopper track 114, with hopper 115 at a highest position on hopper track 114. Harvesting robot 110, hopper 115, and hopper track 114 are merely exemplary, and embodiments of the harvesting robot 110, hopper 115, and hopper track 114 are not limited to the embodiments presented herein. The harvesting robot 110, hopper 115, and hopper track 114 can be employed in many different embodiments or examples not specifically depicted or described herein. Harvesting robot 110 can be used to pick crops, such as strawberries or other suitable crops. In some embodiments, the crops can be fragile, such as easily bruised or damaged unless carefully picked, held, and/or transported. Harvesting robot 110 can be similar or identical to the harvesting robots described and shown in the '764 Publication, and various elements of harvesting robot 110 can be similar or identical to various elements of the harvesting robots described and shown in the '764 Publication. In many embodiments, harvesting robot 110 can include a picking apparatus 111, which can be similar or identical to the picking apparatuses described and shown in the '764 Publication. In a number of embodiments, harvesting robot 110 can include a leaf displacement system 112, which can be similar or identical to the leaf displacement systems and/or foliage displacement mechanisms described and shown in the '764 Publication. In several embodiments, harvesting robot 110 can be part of a harvesting vehicle that includes multiple harvesting robots. Various elements of the harvesting vehicle can be similar or identical to various elements of the harvesting described and shown in the '764 Publication.

In a number of embodiments, a trampoline 113 (e.g., a container) can be used to collect crops picked using picking apparatus 111. Trampoline 113 can be similar or identical to the collection apparatus described and shown in the '764 Publication. In a number of embodiments, a crop ejector, such as the crop ejector described and shown in the '764 Publication, can eject crops picked by picking apparatus 111 into trampoline 113. In several embodiments, trampoline 113 can hold any crops picked from a particular plant. Picking apparatus 111 can fill trampoline 113 as harvesting robot 110 rotates around the plant and picks crops from the plant. Most strawberry plants have a maximum of ten strawberries that could be picked, and typically, three or four strawberries are picked per strawberry plant per visit, based on the number of strawberries that are ripe and ready to be picked. In some embodiments, trampoline 113 can be sized large enough to hold at least a half-pound (0.23 kilogram (kg)) of strawberries, but can have another suitable size.

In several embodiments, each harvesting robot (e.g., 110) can be attached to a hopper (e.g., 115) and a hopper track (e.g., 114). Hopper 115 can be raised and/or lowered along hopper track 114. In several embodiments, while harvesting robot 110 rotates around the plant and picks the crops from the plant, hopper 115 can be positioned on hopper track 114 at a standby position at a mid-point of hopper track 114, as shown in FIG. 1.

In many embodiments, as shown in FIG. 2, after harvesting robot 110 has completed picking a plant and/or while harvesting robot 110 is being moved to the next plant to be picked, hopper 115 can be moved along hopper track 114 to a lowest position on hopper track 114, at which point trampoline 113 can dump its contents of crops into hopper 115. For example, a sensor can detect that hopper 115 is at the lowest position, which can activate a servo to open and lower bottom surface 213, such that the crops in trampoline 113 are dumped into hopper 115. In a number of embodiments, one or more of the surfaces of trampoline 113 and/or hopper 115 can include silicon rubber surfaces, which can provide an elastic "trampoline" effect to cushion crop handling during filling, operation and dumping. In several embodiments, bottom surface 213 can rotate to allow the crops to roll from trampoline 113 into hopper 115 with minimal dropping to avoid bruising of the crops.

In many embodiments, after trampoline 113 has dumped the crops into hopper 115, as shown in FIG. 2, hopper 115 can be moved back up to the standby (mid) position (as shown in FIG. 1) to wait for the harvesting robots associated with the same trough to finish picking. In a number of embodiments, once all the harvesting robots associated or aligned with a particular trough (e.g., trough 411 in FIG. 4 below) have completed picking, the hoppers (e.g., 115) can be moved up from the standby (mid) position to a highest position on hopper track 114, as shown in FIG. 3. In some embodiments, a front lip 315 of hopper 115 can be lowered and dropped over a lip of the trough (e.g., lip 422 of trough 411 in FIG. 4 below) to deposit the crops in the trough. In several embodiments, a cam at the top of hopper track 114 can cause front lip 315 of hopper 115 to open once hopper 115 reaches the top of hopper track 114. In various embodiments, all of the hoppers (e.g., 115) of the harvesting robots aligned with a particular trough can dump their crops at approximately the same time at various different locations along the trough, and from one or both sides of the trough. In a number of embodiments, hopper 115 can be raised to the trough to deposit the crops in the trough each time hopper 115 is filled from trampoline 113, such as each time the robot harvests crops from a plant.

Figure 4:
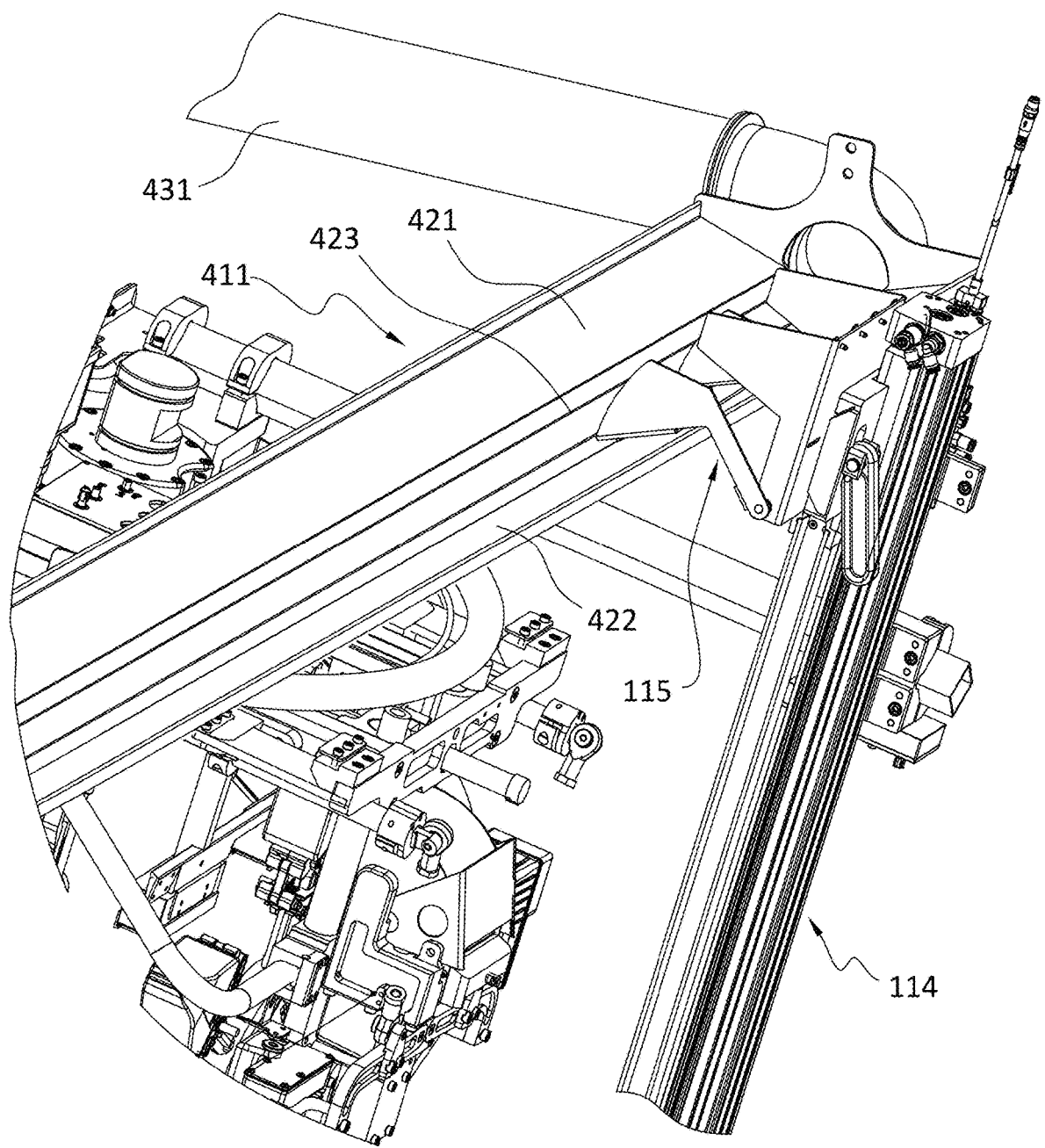
FIG. 4 illustrates a perspective view of the hopper of FIG. 1 in position to dump crops into a trough.

FIG. 4 illustrates a perspective view of hopper 115 in position to dump crops (not shown) into a trough 411. Trough 411 is merely exemplary, and embodiments of the trough are not limited to the embodiments presented herein. The trough can be employed in many different embodiments or examples not specifically depicted or described herein. In many embodiments, trough 411 can include a channel 423 and/or lips, such as lip 421 and 422 on each side of channel 423. Lips 421-422 can be slanted inwards down toward channel 423, which can prevent fluid and/or crops that splash out of channel 423 from escaping trough 411. In a number of embodiments, a flow of fluid can be initiated in channel 423, after which all of the hoppers (e.g., 115) of the harvesting robots aligned with trough 411 that contain crops can dump their crops at approximately the same time into channel 423. For example, front lip 315 (FIG. 3) can open over lip 422 of trough 411 to transfer the crops in hopper 115 into fluid flowing in channel 423. In several embodiments, the front lip 315 (FIG. 3) can open in such a position such that the crops can roll and/or fall into the flowing fluid and not land on lips 421 or 422.

In a number of embodiments, channel 423 can be sized based on the size of the crops to float the crops in a single-file line serially through channel 423, to minimize rolling, bunching, or clogging of crops to prevent damage to the crops, and/or to minimize the amount of fluid used. For example, for strawberries, channel 423 can be approximately 3 inches (7.62 centimeters (cm)) wide and/or approximately 3 inches (7.62 cm) deep.

In several embodiments, the troughs can be configured to catch the crops and/or route the crops serially. In a number of embodiments, the troughs can be configured to conserve the fluid. In some embodiments, nozzles on the troughs can be configured to provide high-volume and/or low-velocity flow into the troughs. In several embodiments, nozzles at a first end of trough 411 (e.g., a fluid-input end of trough 411) can be configured for high-volume and/or low-velocity flow. For example, for strawberries, the nozzles can fill the trough at least to a depth of approximately 2.5 inches (6.35 cm) to have enough fluid to float the strawberries without rolling the strawberries on the bottom of channel 423. Strawberries are on average approximately 1.75 inches (4.445 cm) in diameter (with some variation in size) and generally float in water or an aqueous solution with approximately 80% of the strawberry below the fluid line and 20% of the strawberry above the fluid line.

In some embodiments, the fluid can travel the full length of trough in approximately 2-4 seconds, which can be slow enough to not damage the crops. In some embodiments, the fluid can start to flow from the nozzles approximately 1-2 seconds before dumping the crops into trough 411 in order to fill trough 411 with fluid into which the crops can fall, and the fluid can continue to flow for an additional approximately 1-3 seconds after the crops have been dumped into the trough to flush the crops into transfer tube 431. By stopping the flow after the crops have been flushed out of the trough, fluid and energy can be conserved. By lining up the crops serially, the crops can flow through transfer tube 431 without clogging. The fluid can transport the crops in a manner that can limit and/or prevent the crops from bruising or other damage.

In a number of embodiments, the fluid can be a solution of water and hypochlorous acid (HOCl), which can kill fungus, bacteria, and/or mold from the crops, such as strawberries. The hypochlorous solution can be safe on organics without additional rinsing. In a number of embodiments, crops that are treated with hypochlorous acid can last longer before rotting and/or can avoid rotting despite being somewhat wet. In some embodiments, the hypochlorous solution can be produced using electrolysis. In other embodiments, the fluid can be water or another suitable fluid. In several embodiments, the fluid can be cooled to approximately 50 degrees Fahrenheit (or another suitable cooling temperature, such as approximately 40-60 degrees Fahrenheit), which can facilitate removing heat from the crops to cool the crops while in transport to be packed. In various embodiments, the turbulent action of flowing through the fluid can wash the crops.

In some embodiments, the troughs (e.g., 411) can be at least as long as the RPC track carrying the harvesting robots, such as the RPC track described in the '764 Publication. For example, in some embodiments, the RPC track can be approximately 70 inches (177.8 cm) in length, and the trough (e.g., 411) can be approximately 10 feet (3.048 meters (m)) in length. In several embodiments, the harvesting vehicle can include multiple troughs, which can be operated independently in conjunction with the respective robots associated with each of the troughs to manage the flow of the crops into the soak tank, as described below.

Figure 5:
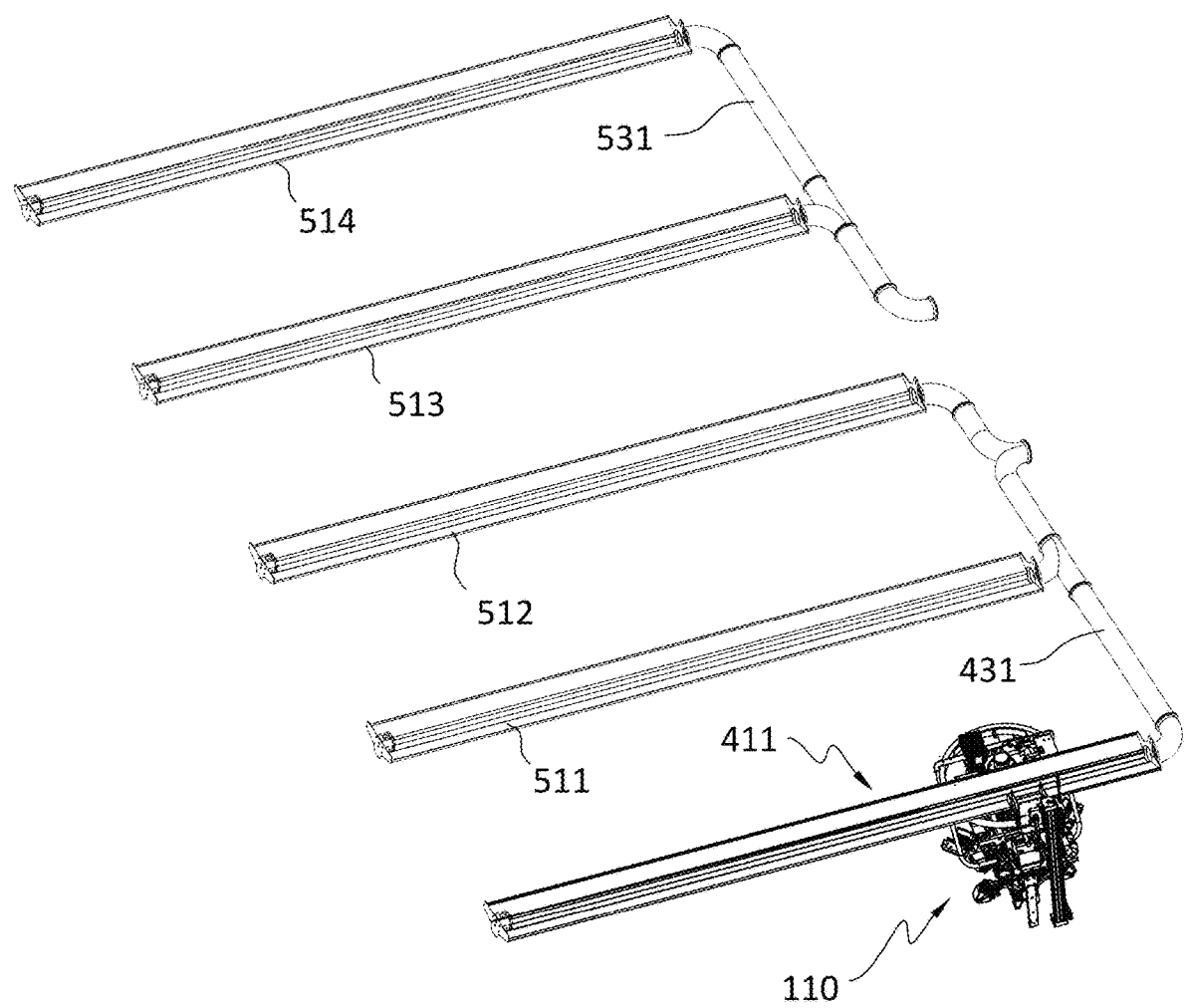
FIG. 5 illustrates a perspective view of troughs and transfer tubes, according to an embodiment.

FIG. 5 illustrates a perspective view of multiple troughs, namely troughs 411 and 511-514, as well as transfer tubes 431 and 531, which can be included on the pick deck of the harvesting vehicle. Troughs 511-514 and transfer tubes 431 and 531 are merely exemplary, and embodiments of the roughs and transfer tubes are not limited to the embodiments presented herein. The troughs and transfer tubes can be employed in many different embodiments or examples not specifically depicted or described herein. As shown in FIG. 5, in a number of embodiments, the harvesting vehicle can include multiple troughs, such as troughs 411 and 511-514. Troughs 411, 511, and 512 can drain into transfer tube 431, and troughs 513 and 514 can drain into transfer tube 531. The number of troughs can depend on the configuration of the harvesting robots on the harvesting vehicle. In many embodiments, the troughs can include a fluid-input end at a first end of the harvesting vehicle, such as at the left side of FIG. 5, and can have a downward slope toward the transfer tubes (e.g., 431, 531). For example, the troughs can be approximately 10 feet (3.048 m) long and can be approximately 1 inch (2.54 cm) to approximately 1.5 inches (3.81 cm) higher at the fluid-input end of the troughs than the other end of the troughs at the transfer tubes. In some embodiments, the pick deck of the harvesting vehicle can include some additional slope, such as an additional approximately 1 inch (2.54 cm) of slope. In a number of embodiments, the hoppers (e.g., 115 (FIG. 1)) of the robots (e.g., 110) can dump into the troughs at any position along the troughs, depending on the position of the robot along the RPC track.

In many embodiments, transfer tubes 431 and 531 can be sanitary piping, which can be flexible tubes that extend from the troughs to a soak tank, such as soak tank 600 shown in FIG. 6 and described below. In several embodiments, the transfer tubes (e.g., 431, 531) can be sized to be able to flow the crops without clogging. For example, for strawberries, transfer tubes 431 and/or 531 can be approximately 4-inch (10.16 cm) pipe and swivel joints to allow for parts of the harvesting vehicle that adjust for field adjustments. In a number of embodiments, the fluid system can be open at the troughs, to allow the robots to interface with the fluid system, but the fluid system can be closed and/or covered in other areas, to limit dirt and/or debris from entering the fluid system.

Figure 6:
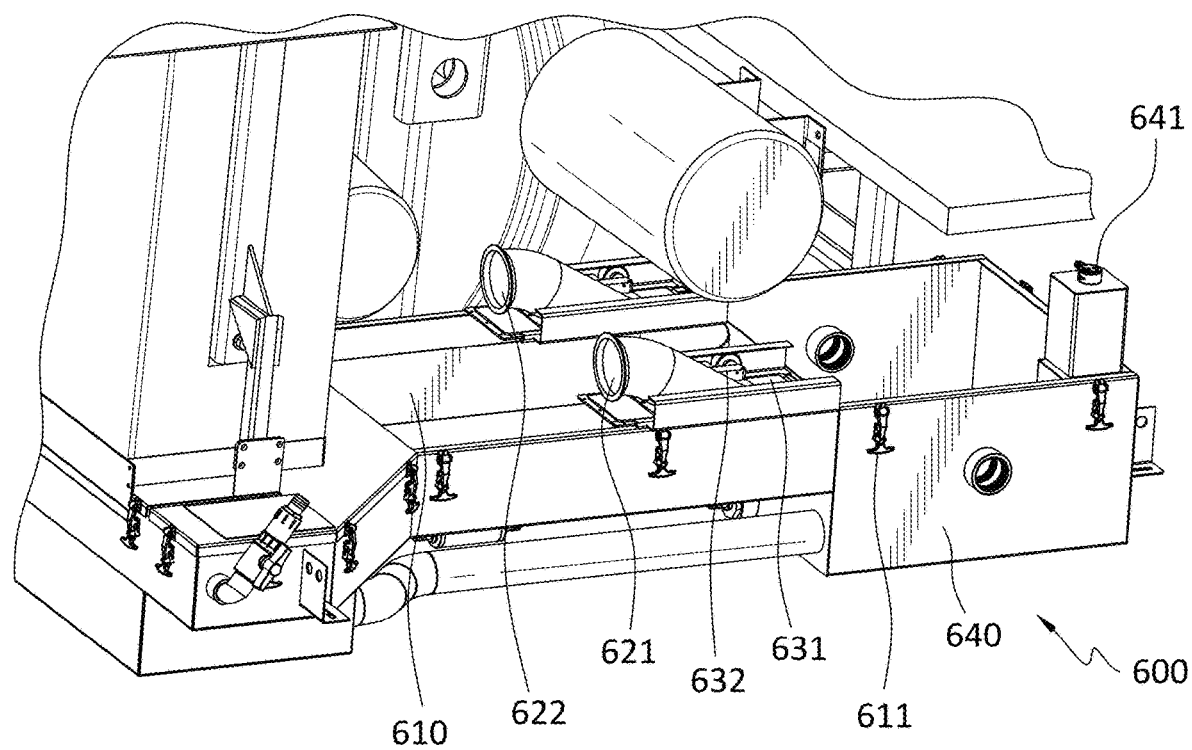
FIG. 6 illustrates a perspective view of a soak tank, according to an embodiment.

FIG. 6 illustrates a perspective view of a soak tank 600. Soak tank 600 is merely exemplary, and embodiments of the soak tank are not limited to the embodiments presented herein. The soak tank can be employed in many different embodiments or examples not specifically depicted or described herein. In many embodiments, the transfer tubes, such as transfer tubes 431 and 531 (FIG. 5) can attach to inlet pipes, such as inlet pipes 621 and 622, respectively, shown in FIG. 6. In many embodiments, the inlet pipes (e.g., 621, 622) can be sealed entry ports to soak tank 600, such that the crops can enter soak tank 600 through the inlet pipes (e.g., 621, 622). In a number of embodiments, each of the inlet pipes can be adjustable along a respective track at the top of soak tank 600. For example, inlet pipe 621 can move along track 631 using wheels, such as wheel 632. The inlet pipes can be adjustable to slide back and forth, as the pick deck, including the troughs (e.g., 411, 511-514 (FIG. 5)) and transfer tubes (e.g., 431, 531 (FIG. 5)), can move with respect to the harvesting vehicle as the pick deck is adjusted, while soak tank 600 can remain fixed with respect to the harvesting vehicle. The sliding of the inlet pipes can thus facilitate the travel of the pick deck while limiting flexing of the transfer tubes (e.g., 431, 531 (FIG. 5)).

In several embodiments, soak tank 600 can include a lid 610, which can be attached to soak tank 600 with clips, such as clip 611. Lid 610 can close and/or seal soak tank 600 to exclude and/or limit foreign matter, such a dirt and debris from the picking environment, from entering soak tank 600.

In some embodiments, soak tank 600 can include a surge tank 640 to handle a rush of excess fluid from the troughs (e.g., 411, 511-514 (FIG. 5)) when the crops are flushed from the troughs into the tubes, then into soak tank 600. In some embodiments, surge tank 640 can include a sensor 641, such as a sonar sensor, to monitor the level of fluid in surge tank 640. In many embodiments, soak tank 600 can include fittings to accommodate regular fluid flow involved in transporting the crops.

Figure 7:
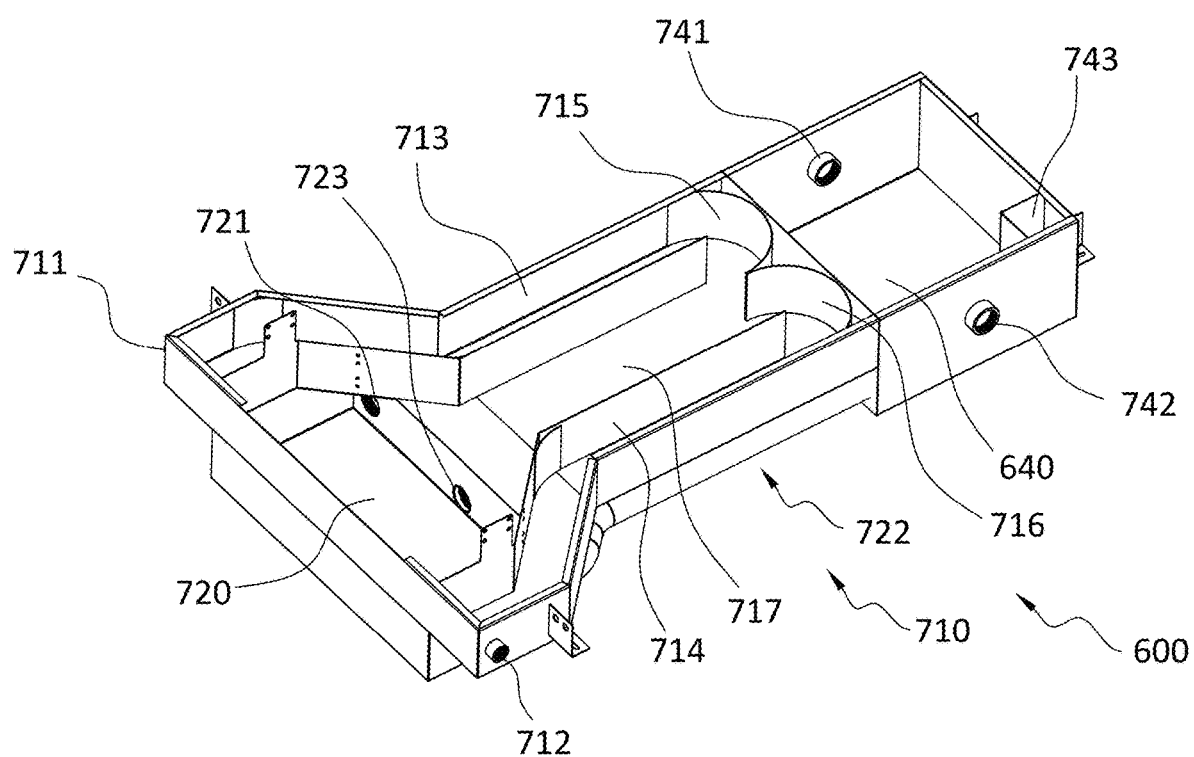
FIG. 7 illustrates a perspective view of an internal configuration of the soak tank of FIG. 6 beneath a lid of the soak tank.

FIG. 7 illustrates a perspective view of an internal configuration of soak tank 600 beneath lid 610 (FIG. 6). In many embodiments, soak tank 600 can include surge tank 640 and a crop-handling section 710. Crop-handling section 710 can include fluid inlets 711 and 712 to create flows of fluid in soak tank 600 that proceed in flow channels. These flow channels can proceed, on one side of soak tank 600, from fluid inlet 711 to a drop area 713, then to a bend 715, then to a common soak area 717, then to a conveyor sump 720; and on the other side of soak tank 600, from fluid inlet 712 to drop area 714, then to a bend 716, then to common soak area 717, then to conveyor sump 720. The crops can be dropped into fluid in soak tank 600 at drop areas 713 and/or 714, and can float in the respective flow channel from drop areas 713 and/or 714 around bends 715 and/or 716, respectively, into a confluence at common soak area 717, and then into conveyor sump 720. The flow channels can slow down the crops to dwell in the fluid to allow for cooling in the chilled fluid before the crops are lifted out of soak tank 600 by the lift conveyor (not shown in FIG. 7, but shown in FIG. 8 below). For example, in some embodiments, the crops can dwell in soak tank 600 for approximately 30 seconds. In other embodiments, the crops can dwell in soak tank 600 for approximately 15 seconds to approximately 120 seconds.

In several embodiments, as shown in FIG. 7, fluid inlets 711 and/or 712 can adjust the flow speed used to flush through the respective flows. The level of fluid in crop-handling section 710 can be controlled by weir pipes 721 and/or 722, which can be adjustable pipes extending from conveyor sump 720 to surge tank 640. Weir pipes 721 and/or 722 can fill surge tank 640 when the level of fluid in crop-handling section 710 is too high. The level of fluid in surge tank 640 can be monitored by sensor 641 (FIG. 6), which can be seated in sensor seat 743. For example, sensor 641 can be a sonar level sensor that can control pumping of fluid to adjust the fluid level between set points to accommodate fluid flow into soak tank 600 from fluid inlets 711 and/or 712, and flushing fluid from the troughs. Surge tank 640 can include check valves 741 and/or 742 connected to a head pipe to pull fluid from surge tank 640 when pumped. Check valves 741 and/or 742 can be one-directional valves to prevent back flow from the head pipe. In a number of embodiments, the flushing fluid used in the troughs that enters soak tank 600 through inlet pipes 621 and 622 (FIG. 6) can be provided by a main system pump that recirculates the fluid with a main reservoir of fluid until flushing is triggered for the troughs. In some embodiments, conveyor sump 720 can include a drain valve 723, which can rapidly drain the fluid from crop-handling section 710 to meet operational specifications.

Figure 8:
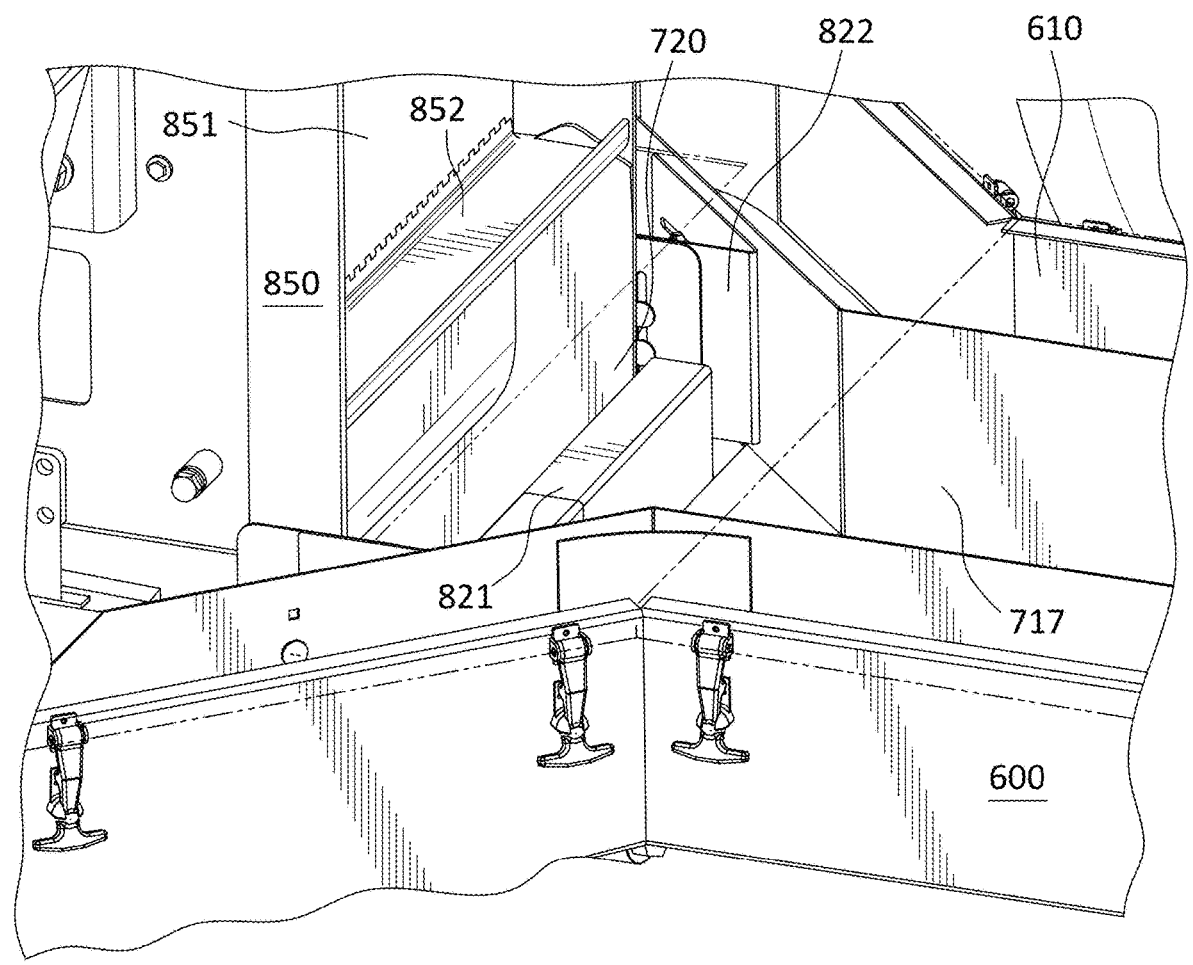
FIG. 8 illustrates a perspective view of a lift conveyor installed in conveyor sump of the soak tank of FIG. 6.

FIG. 8 illustrates a perspective view of lift conveyor 850 installed in conveyor sump 720 of soak tank 600. Lift conveyor 850 is merely exemplary, and embodiments of the lift conveyor are not limited to the embodiments presented herein. The lift conveyor can be employed in many different embodiments or examples not specifically depicted or described herein. In many embodiments, lift conveyor 850 can include a belt 851 with one or more conveyor shelves (e.g., buckets), such as conveyor shelf 852, which can lift out the crops floating in conveyor sump 720. In several embodiments, belt 851 and/or conveyor shelf 852 can be a plastic mesh to allow the fluid to flow through those elements. The flow of fluid through weir pipes 721 and/or 722 (FIG. 7) can promote surface flow of fluid toward lift conveyor 850, such that the crops can flow from common soak area 717 into conveyor sump 720 and then into lift conveyor 850.

In a number of embodiments, as the crops travel in soak tank 600, dirt and other debris can be removed from the crops. In a number of embodiments, conveyor sump can include adjustable guides, such as adjustable guides 821 and 822, which can move to promote the flow of fluid through lift conveyor 850 in order to extract the crops, and/or can move to prevent the crops from going around and/or under lift conveyor 850. For example, adjustable guide 821 can adjust up and down, and adjustable guide 822 can adjust in and out. In many embodiments, the fluid level can be above adjustable guide 821 (e.g., approximately 3 inches (7.62 cm)

above adjustable guide 821), such that adjustable guide 821 can act as a dam/weir to catch heavy debris while the crops float over adjustable guide 821 into conveyor sump 720 toward lift conveyor 850. In many embodiments, weir pipes 721 and/or 722 (FIG. 7) can be covered by screens to prevent crops and/or large debris from being passed into surge tank 640 (FIGS. 6-7), which can limit and/or prevent clogging of check valves 741 and/or 742 (FIG. 7).

Figure 9:
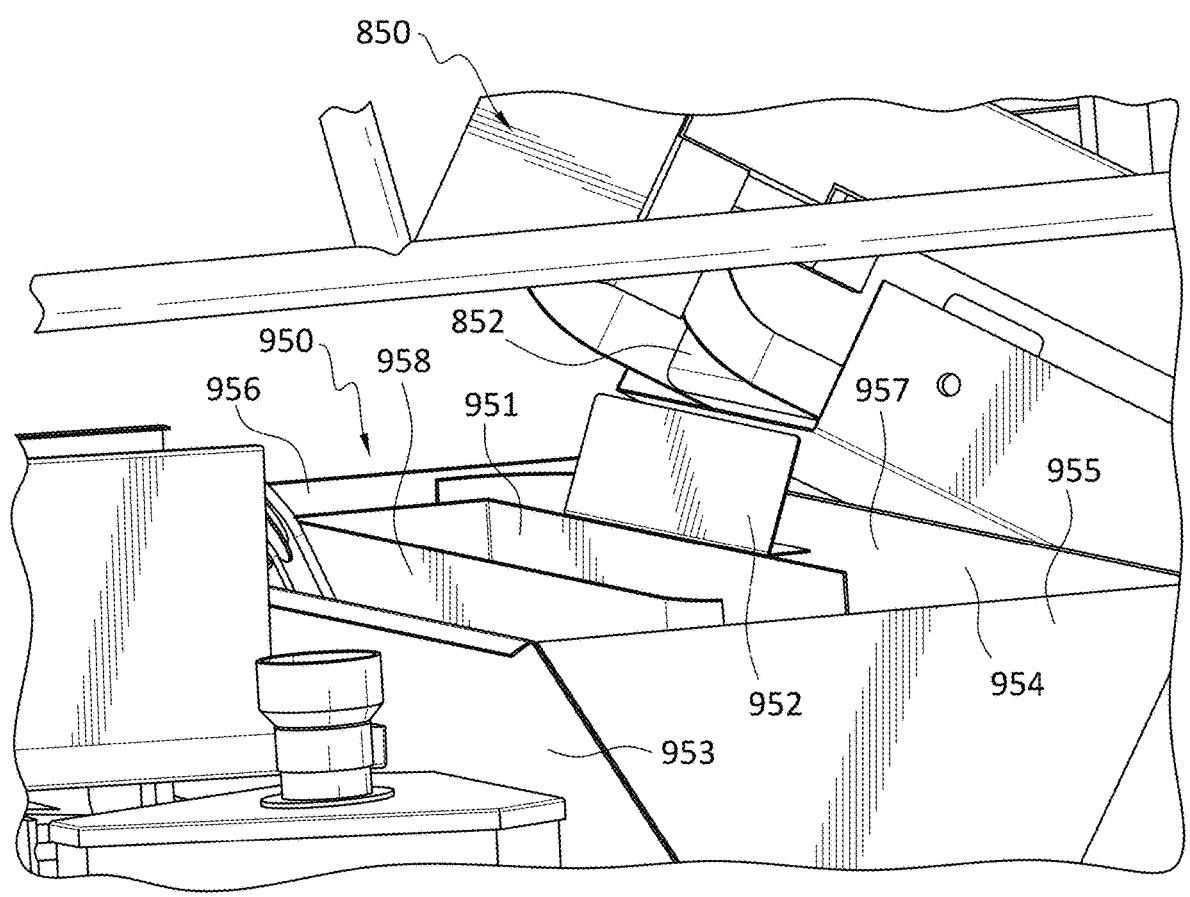
FIG. 9 illustrates a perspective view of a top portion of the lift conveyor of FIG. 8 and a drop tank.

FIG. 9 illustrates a perspective view of a top portion of lift conveyor 850 and a drop tank 950. Drop tank 950 is merely exemplary, and embodiments of the drop tank are not limited to the embodiments presented herein. The drop tank can be employed in many different embodiments or examples not specifically depicted or described herein. In many embodiments, as shown in FIG. 9, lift conveyor 850 can lift crops up using conveyor shelves (e.g., 852) to be dropped in drop tank 950. In several embodiments, belt 851 can rotate the conveyor shelves (e.g., 852) around lift conveyor 850. In a number of embodiments, the crops can fall from lift conveyor 850 into fluid in a center channel 951 of drop tank 950. In several embodiments, a shield 952 can prevent crops and/or fluid from falling into a different portion of drop tank 950. In a number of embodiments, fluid can flush rapidly through center channel 951 to move crops and prevent from crops from falling on each other.

Figure 10:
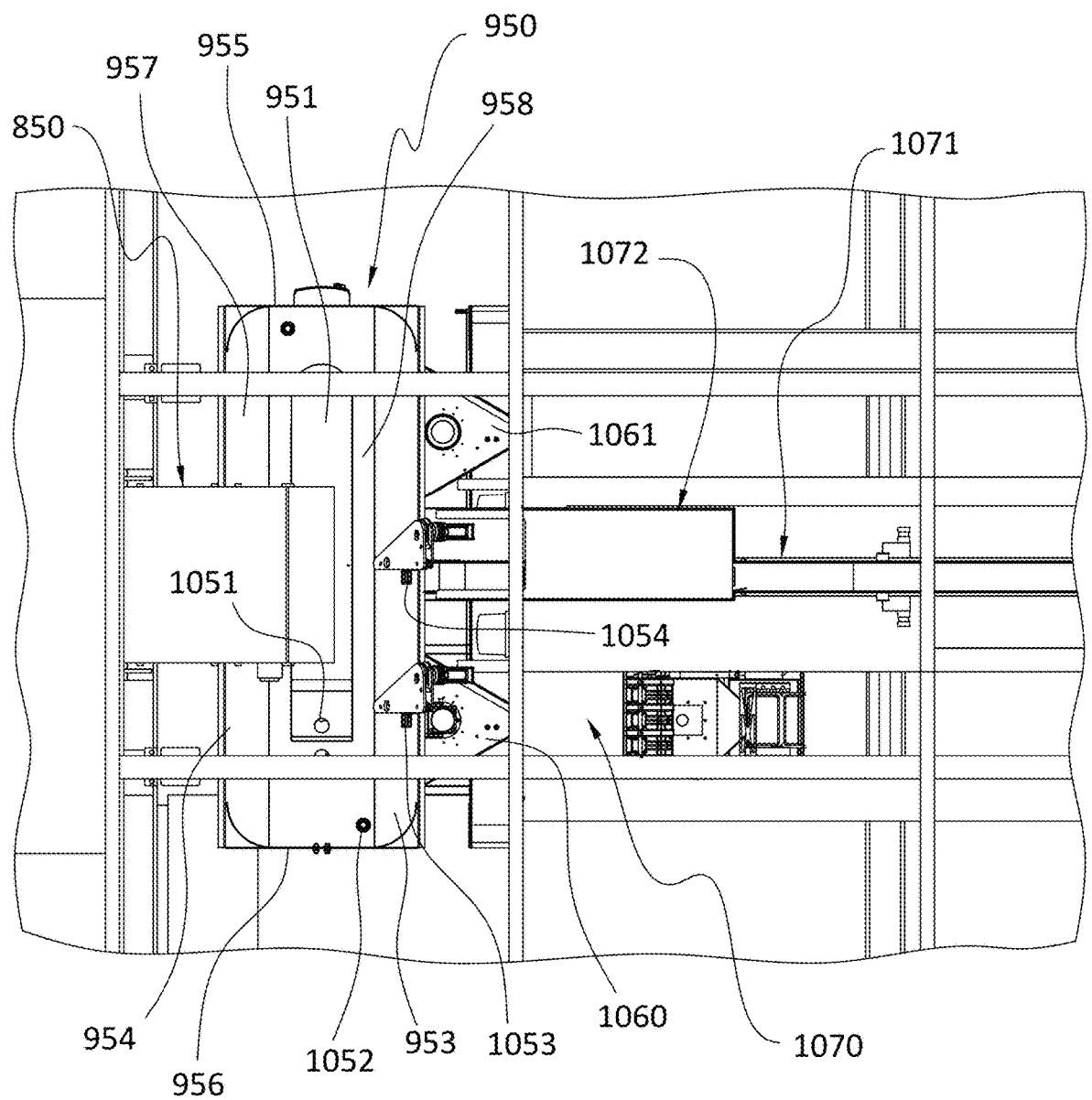
FIG. 10 illustrates a top plan view of the lift conveyor of FIG. 8, the drop tank of FIG. 9, inspectors, a packer, a presentation conveyor, and a drying tunnel.
Figure 11:
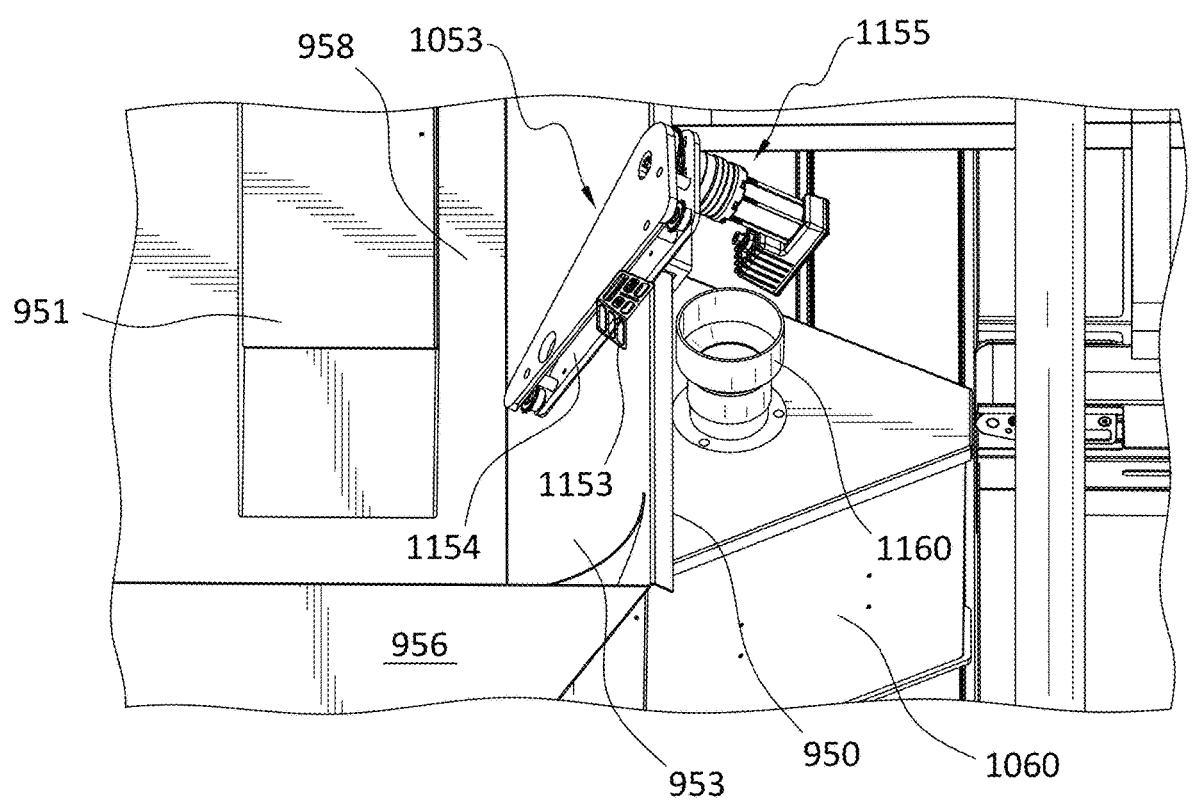
FIG. 11 illustrates a perspective view of an extraction conveyor and a portion of the drop tank of FIG. 9 and the inspector of FIG. 10.

In many embodiments, drop tank 950 can include sides 953 and 954, and/or ends 955 and 956. In some embodiments, sides 953 and/or 954 can be tilted up and outward, which can advantageously facilitate extraction of the crops from the drop tank using extraction conveyors, as shown in FIGS. 10-11. In some embodiments, the flow of fluid can proceed from center channel 951 toward end 955, and then curve around at end 955 to flow in a side channel 957 located between center channel 951 and side 954 toward end 956, and then curve around at end 956 to flow in a side channel 958 located between center channel 951 and side 953. Flow can continue toward end 955, and then curve around at end 955 to flow again in side channel 957. A circulating pump for drop tank 950 can draw the fluid from underneath a raised center channel 951, to prevent interfering with the circulating flow of the crops.

FIG. 10 illustrates a top plan view of lift conveyor 850, drop tank 950, inspectors 1060-1061, a packer 1070, a presentation conveyor 1071, and a drying tunnel 1072. Inspectors 1060-1061, packer 1070, presentation conveyor 1071, and drying tunnel 1072 are merely exemplary, and embodiments of the inspector(s), packer(s), presentation conveyor(s), and drying tunnel(s) are not limited to the embodiments present herein. The inspector(s), packer(s), presentation conveyor(s), and drying tunnel(s) can be employed in many different embodiments or examples not specifically depicted or described herein. In many embodiments, as shown in FIG. 10, drop tank 950 can include a fluid inlet 1051, through which fluid can flow up into drop tank 950. The crops dropped in drop tank 950 can float and can flow from center channel 951 toward end 955, and in side channels 957 and 958 around the perimeter of drop tank 950, circulating counterclockwise when viewed from above as shown in FIG. 10. In several embodiments, drop tank 950 can include a fluid inlet 1052 for jets, which can create a flow (e.g., a laminar flow) focused toward one or more extraction conveyors, such as extraction conveyors 1053 and/or 1054. In many embodiments, a drop tank pump can pump the fluid into fluid inlets 1051 and/or 1052 that circulates in drop tank 950. In some embodiments, drop tank 950 can include an adjustable pipe weir (not shown), which can maintain the fluid level in drop tank 950 and/or can drain to a packer sump of packer 1070. In a number of embodiments, drop tank 950 can include a diversion valve, which can be used to rapidly drain the fluid from drop tank 950 to the main reservoir before the harvesting vehicle moves in row transit (e.g., the harvesting vehicle moving from one set of rows to another set of rows at an end of the rows), to prevent and/or limit fluid from escaping the fluid system.

In several embodiments, drop tank 950 can provide crops to one or more inspectors, such as inspectors 1060 and/or 1061. In the same or other embodiments, drop tank 950 can provide crops to one or more presentation conveyors, such as presentation conveyor 1071. In several embodiments, each of the extraction conveyors (e.g., 1053, 1054) can lift crops individually out of drop tank 950 to provide crops individually to each of inspectors 1060 and/or 1061, and/or to place crops individually on presentation conveyor 1071. In several embodiments, there can be a separate extraction conveyor (e.g., 1053, 1054) for each inspector (e.g., 1060, 1061) and/or for each presentation conveyor (e.g., 1071). For example, extraction conveyor 1053 can be associated with inspector 1060, and extraction conveyor 1054 can be associated with presentation conveyor 1071. Inspector 1061 can have a separate extraction conveyor (not shown). In some embodiments, there can be a separate packer 1070 for each inspector (e.g., 1060, 1061). For example, packer 1070 can be associated with inspector 1060. Inspector 1061 can have a separate packer (not shown). In many embodiments, a harvesting vehicle can include multiple inspectors and packers. In some embodiments, a drying tunnel 1072 can be associated with presentation conveyor 1071, which can dry the crops being conveyed along presentation conveyor 1071 before the crops are handpicked off presentation conveyor 1071 and hand-packed.

FIG. 11 illustrates a perspective view of extraction conveyor 1053 and a portion of drop tank 950 and inspector 1060. In many embodiments, as shown in FIG. 11, each extraction conveyor (e.g., 1053) can be located on a side of drop tank 950, such as side 953. In several embodiments, extraction conveyor 1053 can include triangular plates that are separated by a flow-through region 1154, which can allow fluid focused toward extraction conveyor 1053 to flow through extraction conveyor 1053, which can urge the crops toward extraction conveyor 1053. Extraction conveyor 1053 can include one or more paddles, such as paddle 1153, which can be rotated around the outside of extraction conveyor 1053 by a motor 1155. The speed of rotation of the paddles (e.g., paddle 1153) can be adjustable to correspond with the inspection rate of crops in inspector 1060 and/or for suitable spacing on a presentation conveyor (e.g., presentation conveyor 1071) for hand-packing.

In several embodiments, paddle 1153 and/or the width of extraction conveyor 1053 can be sized to extract a single crop at a time and/or to promote serial flow of crops extracted from drop tank 950. For example, for strawberries, paddle 1153 can be approximately 2 inches (5.08 cm) wide. The tilted arrangement of side 953 can facilitate paddle 1153 lifting each crop out of the fluid and out of drop tank 950 to be deposited in an inspector inlet 1160 of inspector 1060, or alternatively on a presentation conveyor (e.g., presentation conveyor 1071 (FIG. 10)). In some embodiments, an alignment device, such as dangling chains, can be used adjacent to inspector inlet 1160 to center the berry so that the berry falls through the center of inspector 1060. Because extraction conveyor 1053 lifts a single crop at a time, some crops can flow around extraction conveyor 1053 to other extraction conveyors (e.g., 1054 (FIG. 10)), and/or can flow around all the extraction conveyors to proceed around the perimeter of drop tank 950 again to be extracted on a subsequent rotation around drop tank 950. The speed of extraction conveyor 1053 can be adjusted to adjust how fast crops are extracted and dropped into the inspector (e.g., 1060). For example, in some embodiments, extraction conveyor can extract and drop the crops into inspector at a rate of 2-3 crops per second.

Figure 12A:
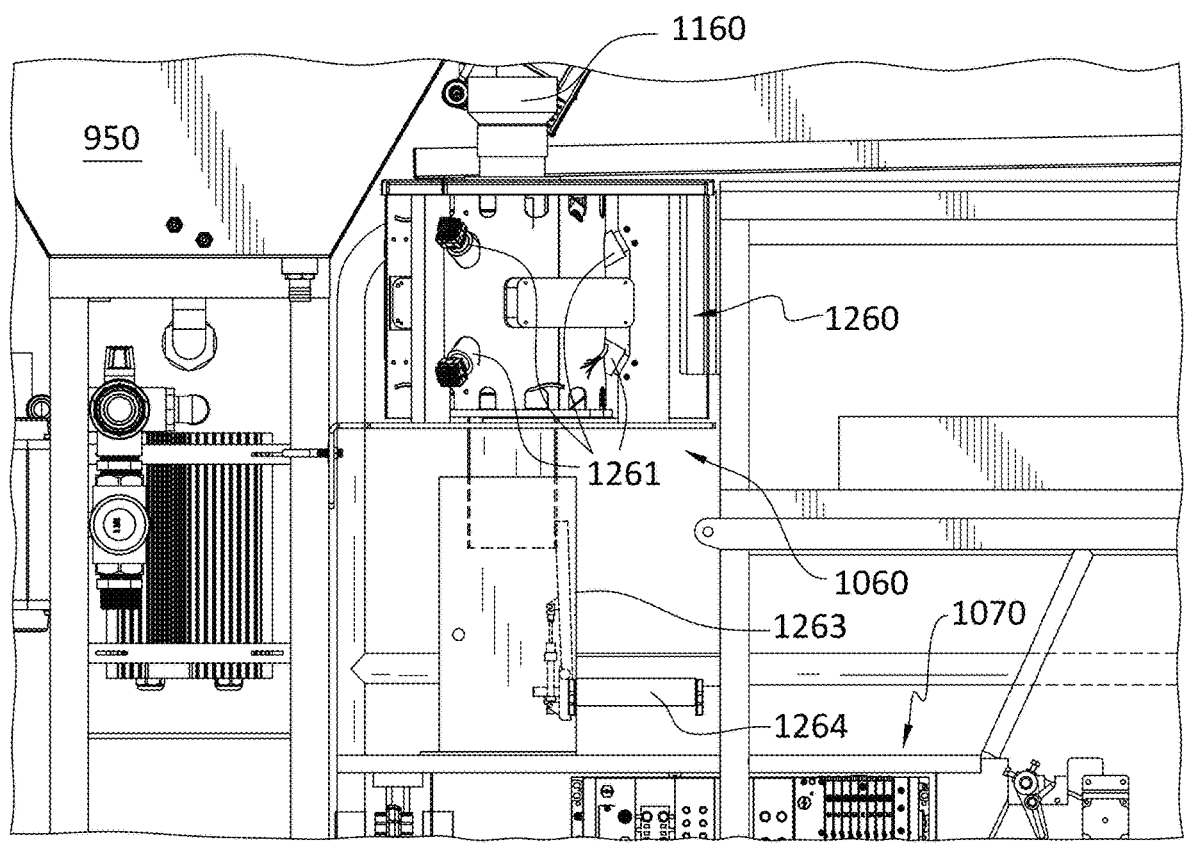
FIG. 12A illustrates a side elevational view of the inspector of FIG. 10.

FIG. 12A illustrates a side elevational view of inspector 1060. In many embodiments, inspector 1060 can include inspector inlet 1160, an imaging system 1260, and/or a reject mechanism 1263. In several embodiments, once a crop has been lifted by an extraction conveyor (e.g., 1053 (FIGS. 10-11)), the crop can be dropped into inspector inlet 1160 to be fall top-to-bottom through inspector 1060 and be inspected by inspector 1060. In several embodiments, a trigger sensor can be located on inspector inlet 1160 and/or at a top of imaging system 1260 to detect that a crop has entered inspector 1060 and trigger a timing sequence to capture images of the crops and/or triggering reject mechanism 1263, if necessary, at appropriate times while the crop falls through inspector 1060. In some embodiments, the trigger sensor can be a reflective diffuse breaking sensor or a laser beam breaking sensor.

In various embodiments, imaging system 1260 can include multiple cameras, such as cameras 1261, to capture images of the surfaces of the crop. In a number of embodiments, imaging system can include lights (internal, not shown), which can be configured to provide diffuse lighting in a diffuse light box of imaging system 1260 to light the crop while minimizing interference from fluid droplets on the crop in the images. In some embodiments, a cylindrical inspection liner, such as a clear plastic (e.g., polycarbonate) liner, can be seated inside imaging system 1260 to separate the area in which the crop falls from the lights, cameras, and/or other elements of imaging system 1260, which can beneficially facilitate food safety and prevent fluid from splashing onto the cameras and/or lights. In many embodiments, the inspection liner can be food safe and can be removable for cleaning.

Figure 13:
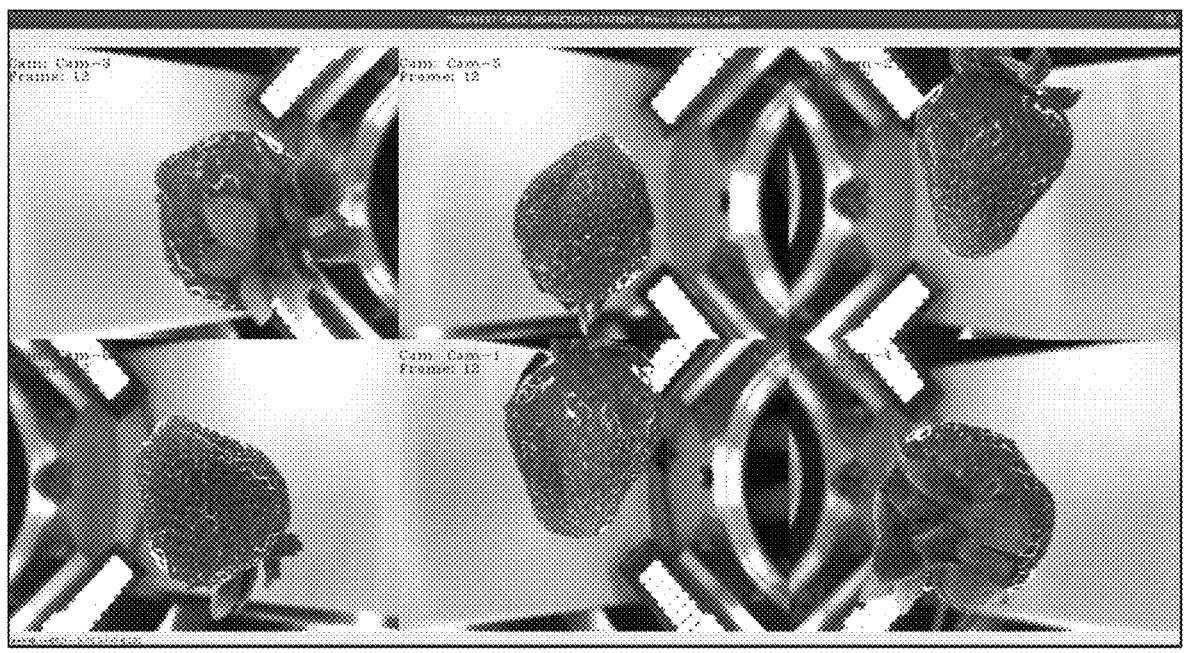
FIG. 13 shows six images captured by six cameras of FIG. 12A.

In the embodiment shown in FIG. 12A, there are six cameras 1261 (although two are not seen in FIG. 12A) that take images of the crop from six different angles (such as the six images of a strawberry shown in FIG. 13, which shows six images captured by six cameras 1261) to capture views of all of the surfaces of the crop at once. In some cases, the cameras can be triggered based on the timing sequence initiated by the trigger sensor. For example, in some embodiments, the cameras can be triggered 10 milliseconds (ms) after the trigger sensor starts the timer.

In some embodiments, an image classifier can be run on a processor to evaluate the six images to determine whether the crop is good for packing or instead should be rejected by reject mechanism 1263. The processor can be part of imaging system 1260, part of inspector 1060, or part of the harvesting vehicle, such as one or more of the processors described in the '764 Publication. In some embodiments, the artificial neural network can be used by the classifier, which can include ResNet (Residual Neural Network) artificial neural network to learn and perform classification on images. In several embodiments, the classifier can be trained by dropping good crops and bad crops that are freshly picked through inspector 1060, and training the classifier based on the binary classification of good/accept or bad/reject, such as by using the collected images from inspector 1060. The determination of whether a crop is good or bad for training purposes can be made by humans during training based on USDA (United States Department of Agriculture) grading and/or looking at size, color, blemishes, deformation, malformations, damage, and/or other aspects of the crop. In some embodiments, the classifier can include customizable parameters to allow a user (e.g., a farmer) to customize one or more factors and/or quality levels that are considered by the classifier when determining whether to classify a crop as accept or reject. In many embodiments, the classifier can determine whether to accept or reject the crop while the crop is dropping through inspector 1060. In some cases, the classifier can make the classification determination in less than 20 ms, 15 ms, or 12 ms. In several embodiments, inspector 1060 can provide in-field on-harvesting-vehicle inspection of the crops, and/or can provide a more-consistent level of inspecting crops than provided by human evaluation. In some embodiments, the classifier can classify each crop into one of three classes: reject, process, or pack. The pack class is for those crops that a graded suitable for packing as whole crops in containers. The process class is for those crops that are graded lower, but suitable for other uses, such as puree use. The reject class is for those crops that are not suitable for packing or process use.

In many embodiments, when the crop is classified as good/accept, the crop can fall into a flume of packer 1070, and when the crop is classified as bad/reject, the crop can be rejected by reject mechanism 1263, as shown in FIG. 12A. In some embodiments, reject mechanism 1263 can redirect the crop from falling into packer 1070 and instead move the crop onto a reject conveyor 1264.

In some embodiments, reject mechanism 1263 can include a fast solenoid and a diverter panel that is at a default upright position to allow the crops to fall through into packer 1070. A two-factor timing circuit can activate the solenoid to rotate a top of the diverter panel to the left in FIG. 12A to divert the crop onto reject conveyor 1264. The two-factor timing circuit can be an AND gate that activates when a reject signal from the classifier is activated and a timer signal from the timing sequence is activated, so that reject mechanism is not activated when the classifier has rejected the crop until the crop is approaching reject mechanism 1263. The timing sequence can trigger the timer signal based on the time at which the crop will be approaching reject mechanism 1263 in its fall through inspector 1060. In some embodiments, the activation of reject mechanism 1263 can take a certain amount of time, such as 10 ms, and this time can be factored into the timing sequence. In other embodiments, the reject mechanism can be an air puffer that activates to puff a blast of air on the crop as it falls to divert the crop onto reject conveyor 1264. In some embodiments, reject conveyor 1264 can dump the rejected crops into a container.

Figure 12B:
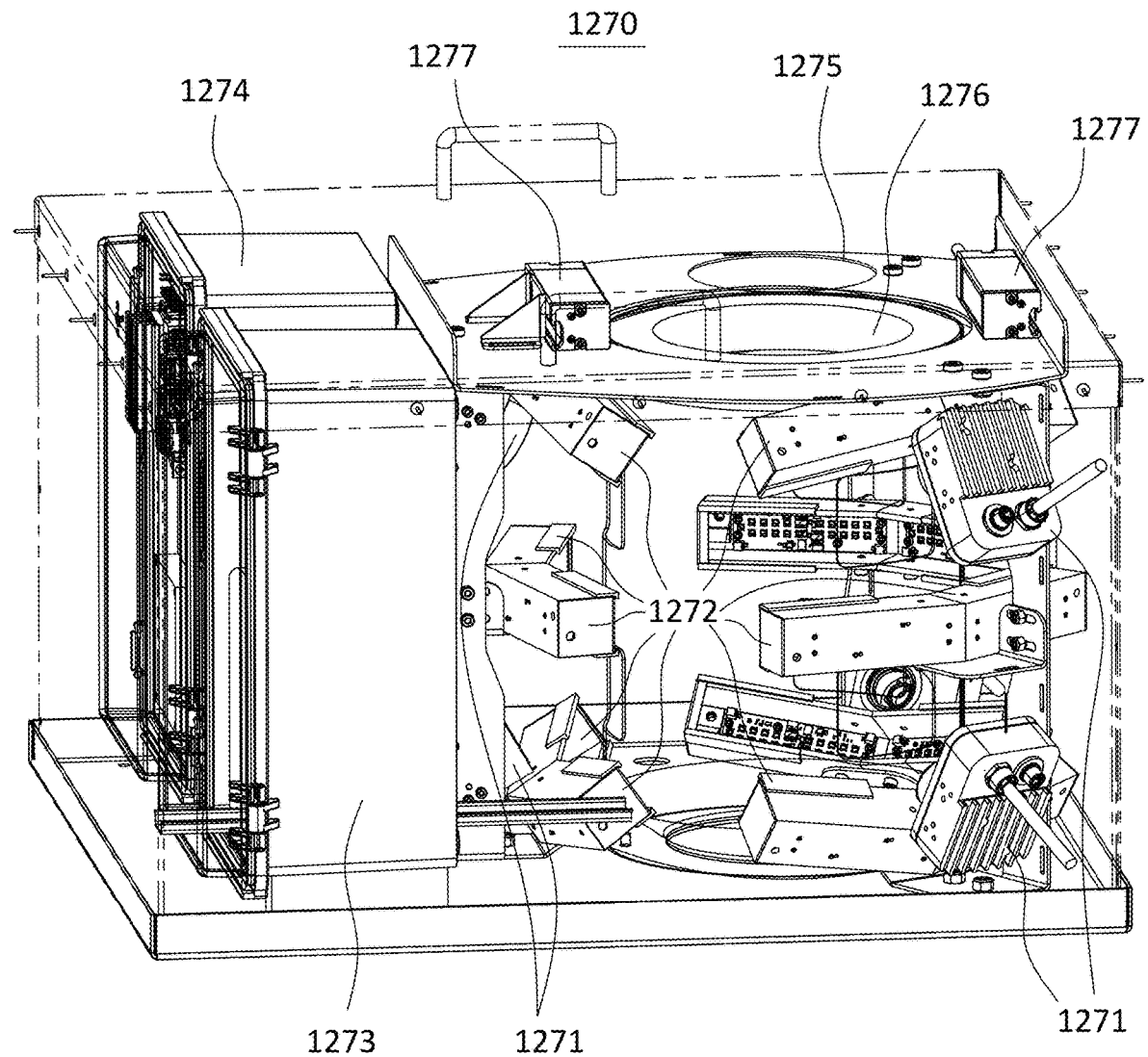
FIG. 12B illustrates a top, side perspective view of an inspector, according to another embodiment.
Figure 12C:
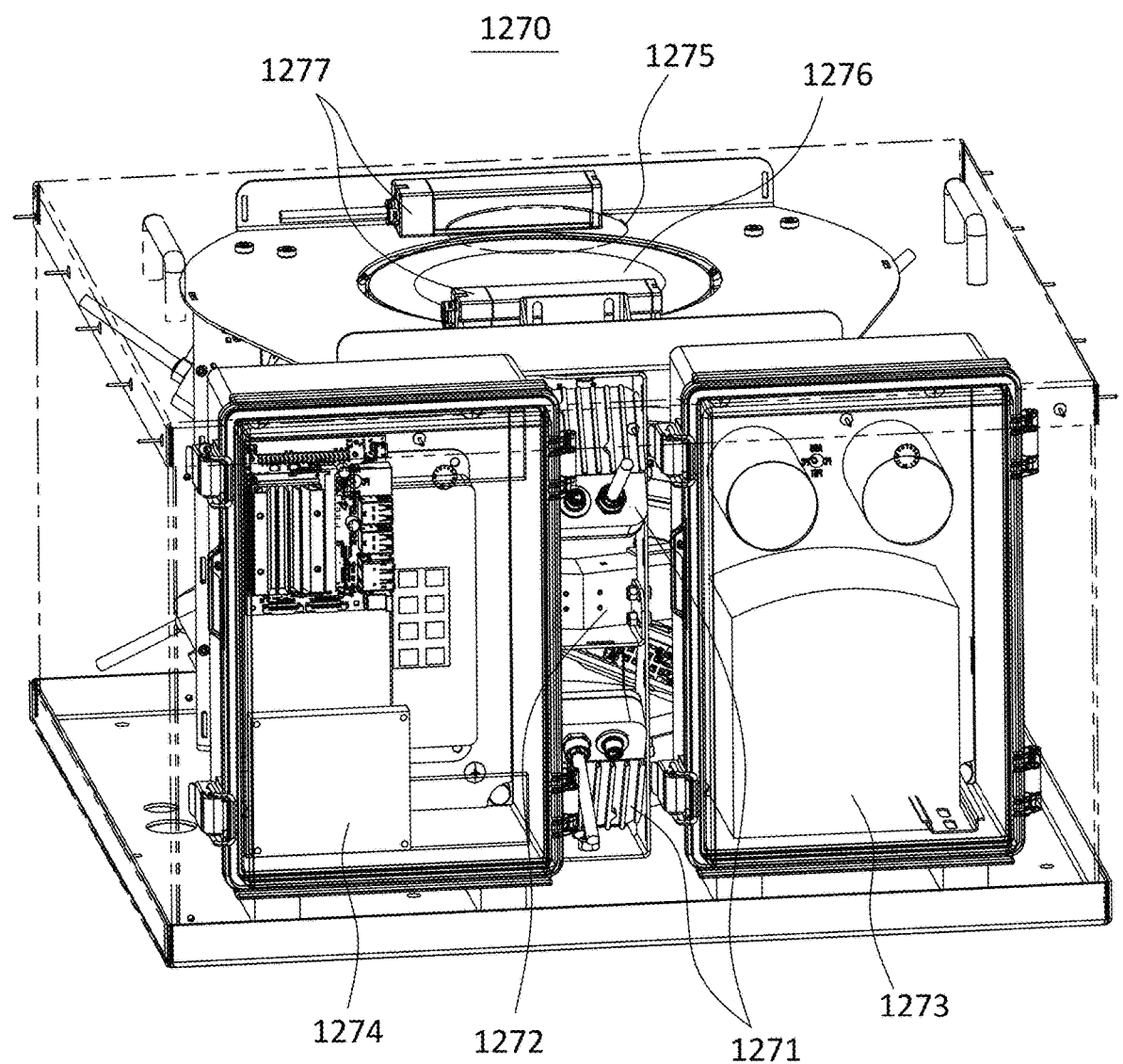
FIG. 12C illustrates a top, rear perspective view of the inspector of FIG. 12C.

FIG. 12B illustrates a top, side perspective view of an inspector 1270, according to another embodiment. FIG. 12C illustrates a top, rear perspective view of inspector 1270. Inspector 1270 is merely exemplary, and embodiments of the inspector are not limited to the embodiments presented herein. The inspector can be employed in many different embodiments or examples not specifically depicted or described herein. Inspector 1270 can be similar to inspector 1060 (FIG. 12A), and various elements of inspector 1270 can be similar or identical to various elements of inspector 1060 (FIG. 12A). In many embodiments, inspector 1270 can include cameras 1271, lights 1272, power supply 1273, processor 1274, inspector inlet 1275, removable food-safe liner 1276, and/or trigger sensors 1277. Cameras 1271 can be similar or identical to cameras 1261 (FIG. 12A). Lights 1272 can be similar or identical to the lights described above in connection with FIG. 12A. Inspector inlet 1275 can be similar or identical to inspector inlet 1160 (FIG. 12A).

Food-safe liner 1276 can be similar or identical to the liner described above in connection with FIG. 12A. Trigger sensors 1277 can be similar or identical to the trigger sensors described above in connection with FIG. 12A. In some embodiments, trigger sensors 1277 can measure the size of the crop based the time it takes for the crop to pass through trigger sensors 1277. In some embodiments, cameras 1271 each can include a vision processing unit (VPU), such as the Intel Movidius VPU.

Figure 14:
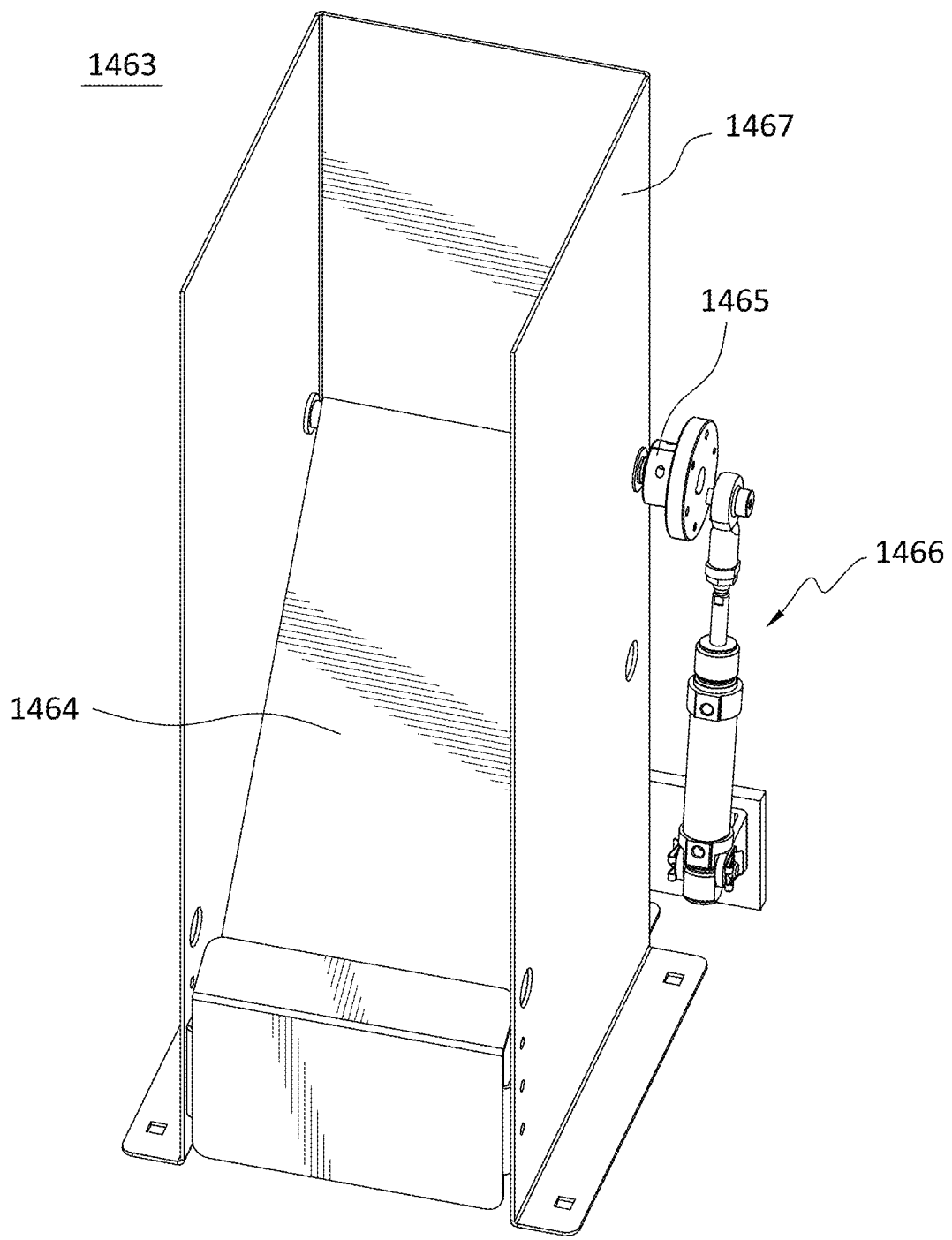
FIG. 14 illustrates a perspective view of a reject mechanism, according to an embodiment.
Figure 15:
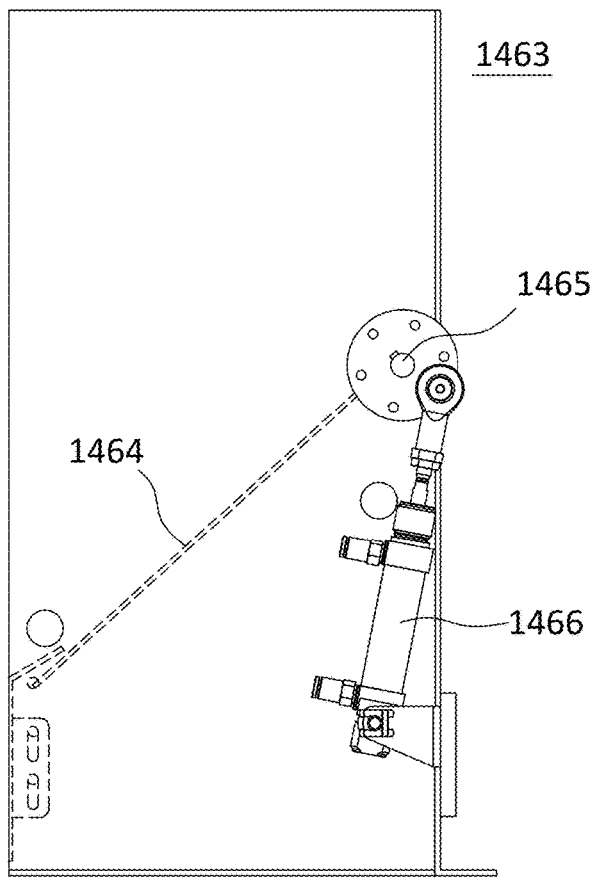
FIG. 15 illustrates a side elevational view of the reject mechanism of FIG. 14 with a flapper in a reject position.
Figure 16:
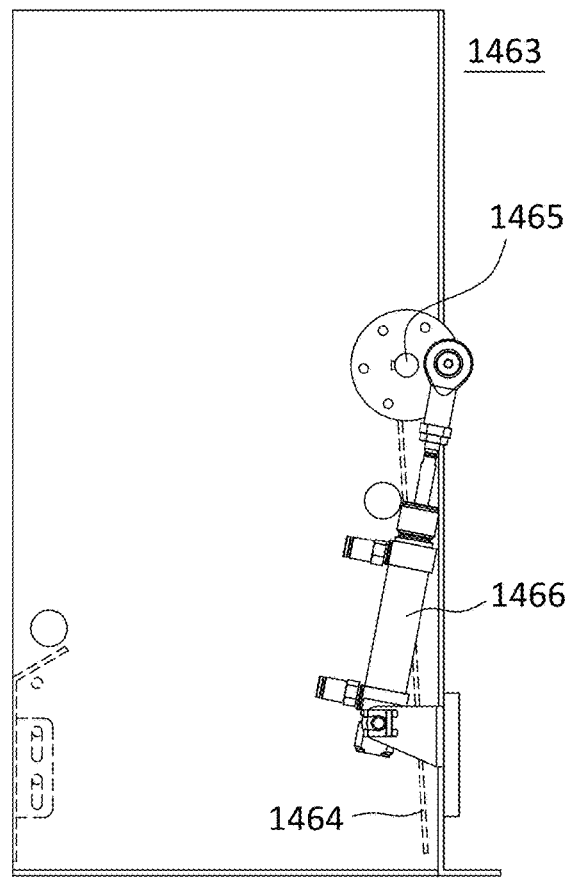
FIG. 16 illustrates a side elevational view of the reject mechanism of FIG. 14 with the flapper of FIG. 14 in an accept (pass-through) position.

FIG. 14 illustrates a perspective view of reject mechanism 1463, which is another embodiment of a reject mechanism to be used with an inspector. FIG. 15 illustrates a side elevational view of reject mechanism 1463 with a flapper 1464 in a reject position. FIG. 16 illustrates a side elevational view of reject mechanism 1463 with flapper 1464 in an accept (pass-through) position. Reject mechanism 1463 is merely exemplary, and embodiments of the reject mechanism are not limited to the embodiments presented here. The reject mechanism can be employed in many different embodiments or examples not specifically depicted or described herein. Reject mechanism 1463 can be similar to reject mechanism 1263 (FIG. 12). In some embodiments, reject mechanism can include three sides 1467 defining a travel channel, flapper 1464, a shaft 1465, and an activator 1466. In some embodiments, the travel channel defined by sides 1467 can be sized for the crop being inspected. For example, for strawberries, the travel channel (e.g., drop zone) can be approximately 4 inches (10.16 cm) wide.

In several embodiments, flapper 1464 can be connected to shaft 1465, such that when shaft rotates, flapper 1464 rotates around shaft 1465 between the reject position, as shown in FIG. 15, and the accept (pass-through) position, as shown in FIG. 16. In some embodiments, flapper 1464 can be an impact-resistant plastic, which can divert the crops onto a reject conveyor (e.g., reject conveyor 1264 (FIG. 12A). In various embodiments, activator 1466 can be a short-throw, fast-acting cylinder, such as a pneumatic solenoid. Activator 1466 can be connected to shaft 1465, to rotate shaft 1465 and flapper 1464 upon activation. In a number of embodiments, the reject position, as shown in FIG. 15, can be the default position, and the accept (pass-through) position, as shown in FIG. 16, can be the activated position, such that activator 1466 activates to allow the crop to drop through to the packer (e.g., 1070 (FIG. 10) when the crop is classified as good/accept. In such case, the timing circuit can be activated based on a combination of the timer signal and the accept signal (or a NOT of the reject signal) from the classifier.

In a number of embodiments, the inspector (e.g., 1060) can be configured to allow a continuous serial flow of crops to be inspected individually. For example, in some embodiments, the inspector can inspect 2-3 crops per second. The crops that are classified as bad/reject can be diverted from packing using a reject mechanism (e.g., 1263 (FIG. 12A), 1463 (FIG. 14)), and, in some embodiments, when the reject mechanism was activated from a crop, the reject mechanism can return to the default position before the subsequent crop falls into the inspector and/or before the timer signal is activated for the subsequent crop. In other embodiments, the position of the reject mechanism can be moved when there is a change in the reject/accept signal.

In some embodiments, a system can contain multiple consecutive reject mechanisms, such as a first reject mechanism and a second reject mechanism. For example, the reject mechanisms can be stacked, such that the crop first falls to the first reject mechanism, and if the first reject mechanism does not reject the crop, the crop then falls to the second reject mechanism. The first reject mechanism can reject crops that are classified in the reject class, and the second reject mechanism can reject crops that are classified in the process class (to be processed for puree use). Those crops classified in the pack class can fall through both the first and second reject mechanisms for packing.

Figure 17:
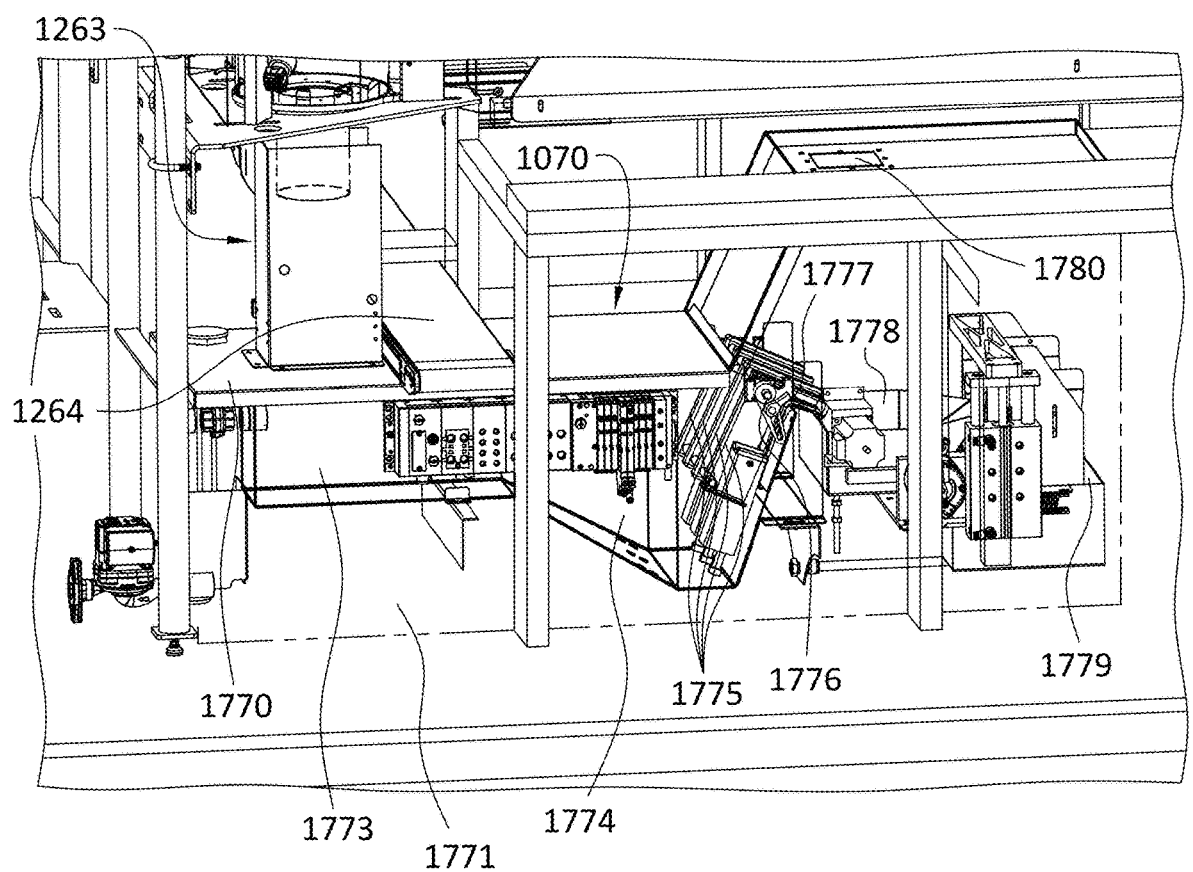
FIG. 17 illustrates a perspective view of the packer of FIG. 10 with a lid covering the packer.
Figure 18:
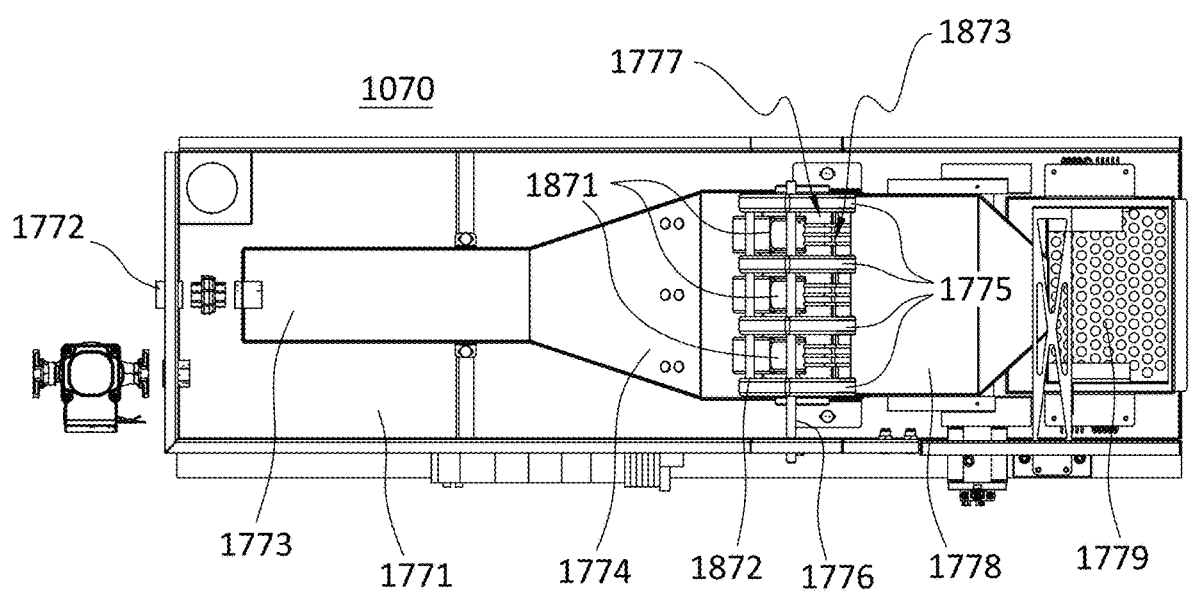
FIG. 18 illustrates a top plan view of the packer of FIG. 10 with the lid of FIG. 17 removed.
Figure 19:
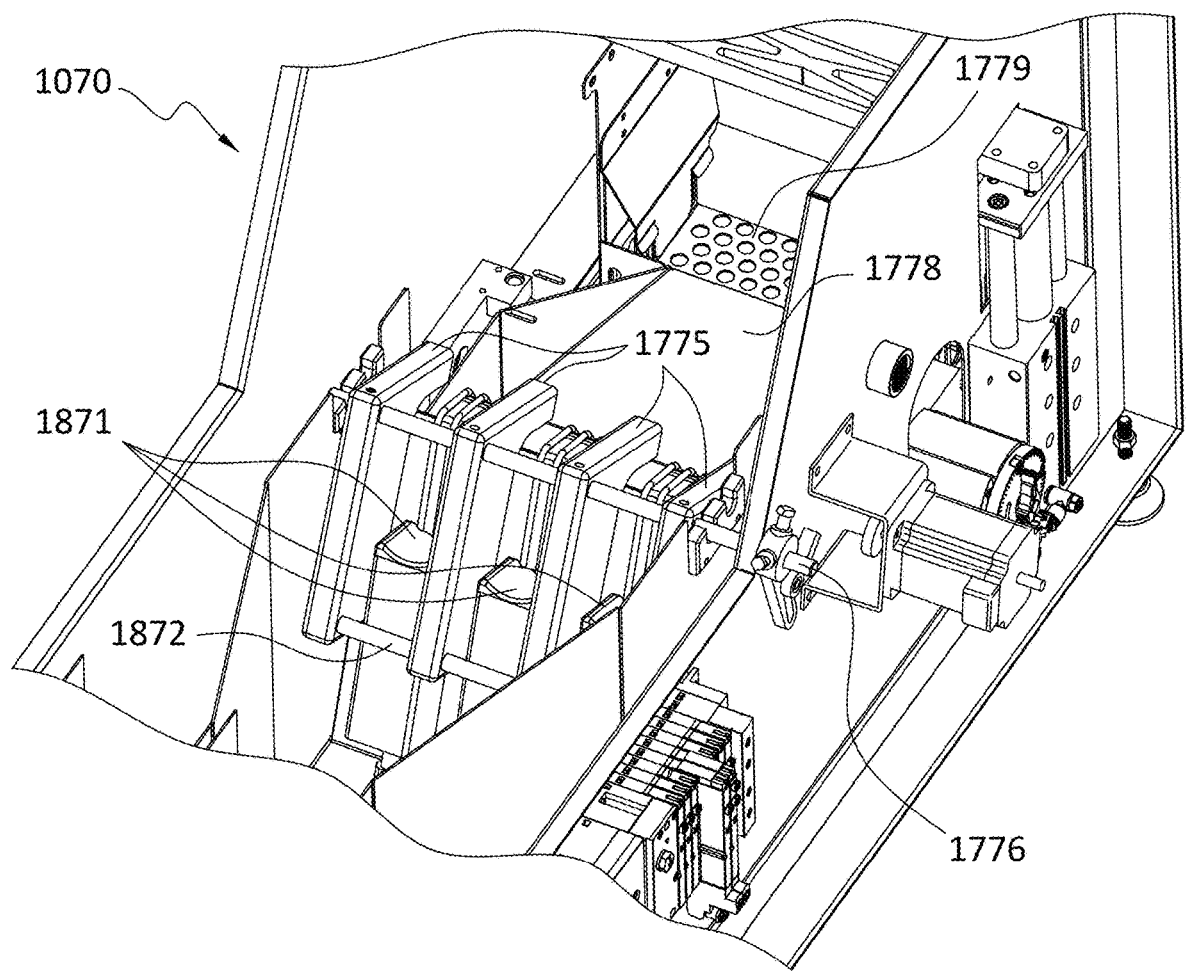
FIG. 19 illustrates a perspective view of a portion of the packer of FIG. 10, showing dividers and pumpers.

FIG. 17 illustrates a perspective view of packer 1070 with a lid 1770 covering packer 1070. FIG. 18 illustrates a top plan view of packer 1070 with lid 1770 removed. FIG. 19 illustrates a perspective view of a portion of packer 1070, showing dividers 1775 and pumpers 1871. In several embodiments, packer 1070 can include a flume 1773, which can be a flow channel in which crops are dropped into packer 1070. For example, crops that are accepted by inspector 1060 (FIG. 10) can pass through (fall through) reject mechanism 1263 and fall into flume 1773. In several embodiments, a fluid inlet 1772 can receive fluid pumped into flume 1773. Flume 1773 can be seated above a sump tank 1771 of packer 1070. Crops that drop into flume 1773 can float in the flow toward a crop queue region 1774. The fluid can be pumped into flume 1773 through fluid inlet 1772 fast enough so that crops that fall into flume 1773 are moved out of the drop area and toward crop queue region 1774 to prevent crops from falling on top of each other. Fluid in flume 1773 can flow over a weir edge 1777 (e.g., a dam edge) down into sump tank 1771 through a gap 1873 between weir edge 1777 and scale 1778. This flow of the fluid over weir edge 1777 can urge the crops toward crop queue region 1774 and toward pumpers 1871. Crop queue region 1774 can serve as a buffer area for staging crops into pumpers 1871.

In many embodiments, packer 1070 can include one or more pumpers, such as pumpers 1871, which can be positioned between dividers, such as dividers 1775. The dividers (e.g., 1775) can create a separation region for each of the pumpers (e.g., 1871), which each can be spaced to receive and lift an individual crop at a time over weir edge 1777 into scale 1778. In many embodiments, the dividers (e.g., 1775) can be attached to a shaft 1776 that rotates back-and-forth approximately 5 to 10 degrees in order to pulsate the dividers (e.g., 1775) (pulsating left and right in the view of FIG. 18) to prevent the crops from clogging in crop queue region 1774. The dividers (e.g., 1775) can be held together by a pin 1872. As a crop floats toward a pumper (e.g., 1871) between a pair of dividers (e.g., 1775), the packer can activate the pumper (e.g., 1871) to push the crop over weir edge 1777 into scale 1778. In some embodiments, gap 1873 can include a grill to prevent crops from falling into gap 1873.

In many embodiments, packer 1070 can include a sensor 1780, such as a camera, that monitors the crops at each pumper (e.g., 1871) to selectively determine the next crop to be deposited into scale 1778. The selection of each individual crop to add to the scale can be based on a sensed size of the crop, for example. In many embodiments, the crops in scale 1778 can be weighed and deposited into a container in packing tank 1779, as shown in FIGS. 20-23, described below. When a weight of the crops in scale 1778 is approaching a threshold, a smaller crop may be selected to be pushed into scale 1778 from among the crops currently available to be pushed into scale 1778 by the pumpers (e.g., 1871). In many embodiments, each pumper can move and/or be controlled independently from each other.

Figure 20:
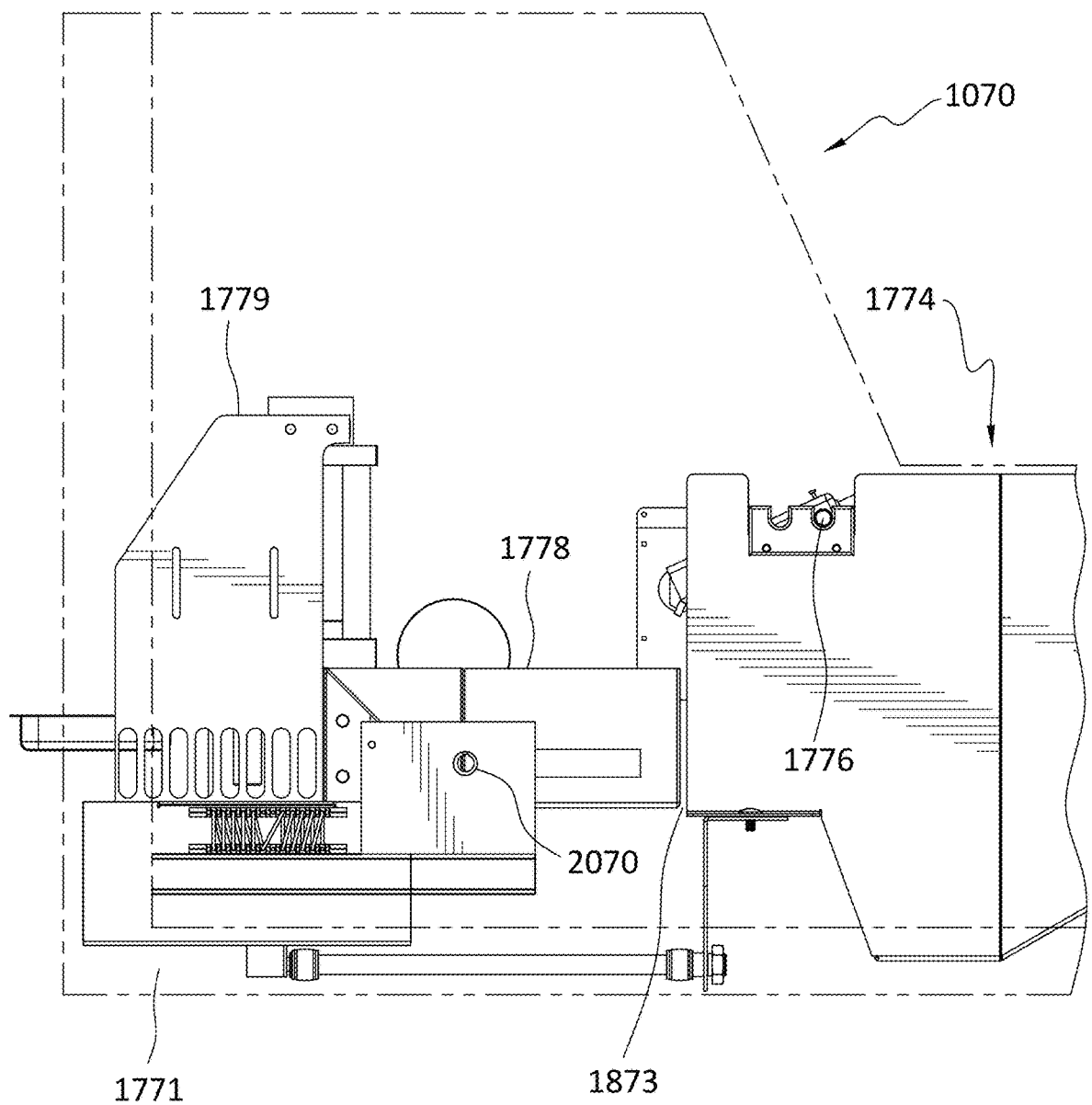
FIG. 20 illustrates a side elevational view of a portion of the packer of FIG. 10, showing a scale in a weighing position and a packing tank.

FIG. 20 illustrates a side elevational view of a portion of packer 1070, showing scale 1178 in a weighing position and packing tank 1779. In many embodiments, scale 1778 can include a container into which fluid is deposited, so that the crops can fall over weir edge 1777 (FIGS. 17-18) into fluid in scale 1778 to prevent damage to the crops. In several embodiments, once the fluid has been added to the container of scale 1778, scale 1778 can be tared in order to offset the weight of the fluid in scale 1778. The crops can then be deposited into scale 1778 by the pumpers (e.g., 1871 (FIG. 18)) until a weight threshold is reached. In several embodiments, scale 1778 can weigh the crops as they are deposited into scale 1778, in order to determine if the weight threshold is reached. In many embodiments, the scale can include calibrated load cells to provide an accurate weight of the crops. When the desired weight threshold of the crops in the scale is reached, the scale can be rotated about a rotation point 2070 to deposit the crops into a container in packing tank 1779.

In several embodiments, the weight threshold can be customized based on the weight of the crops to be specified for the container. For example, if the container will be marked as containing one pound (0.45 kg) of the crops, the weight threshold can be set to 1.0 pounds (0.45 kg), or in some cases, 1.05 pound (0.48 kg), 1.1 pounds (0.50 kg), 1.15 pounds (0.52 kg), or another suitable weight above the desired pack weight of 1.0 pounds (0.45 kg) to account for the weight of any remaining fluid on the crops and/or other possible inaccuracies, to ensure that the weight of the crops in the container will be at least 1.0 pounds (0.45 kg). When the weight of the crops in the container will be marked as 2.0 pounds (0.91 kg), the weight threshold can be adjusted accordingly.

Figure 21:
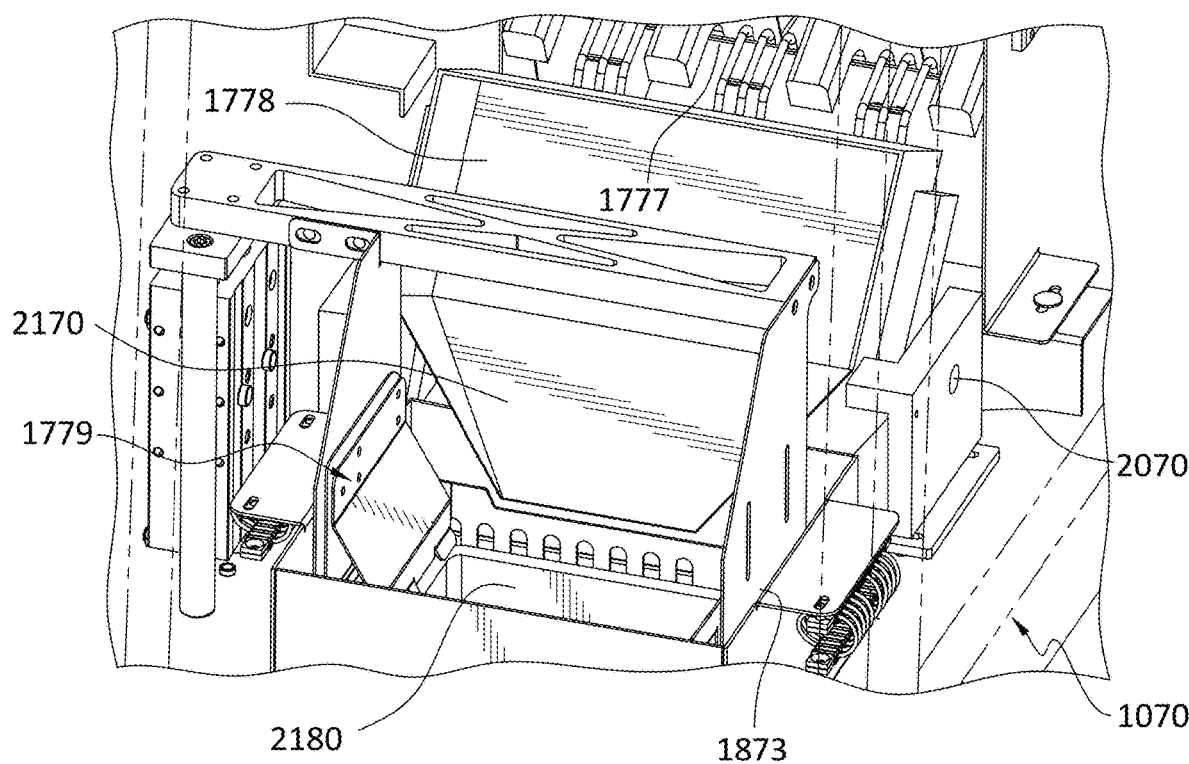
FIG. 21 illustrates a perspective view of a portion of the packer of FIG. 10, showing the scale in a dumping position, and the packing tank with a container inserted in the packing tank for packing crops.

FIG. 21 illustrates a perspective view of a portion of packer 1070, showing scale 1178 in a dumping position, and packing tank 1779 with a container 2180 inserted in packing tank 1779 for packing crops. In many embodiments, once scale 1778 has reached the threshold weight, scale 1778 can be rotated to a dumping position, as shown in FIG. 21, to drain the fluid and the crops from scale 1778 into container 2180. In several embodiments, scale 1778 can include a funnel region 2170 to guide the crops into container 2180. In a number of embodiments, container 2180 can be submerged in fluid within packing tank 1779 when the crops are dumped from scale 1178 into container 2180 to prevent damage to the crops. In some embodiments, the level of the fluid can be sufficiently above the top of container 2180 to allow the crops to float and be arranged while floating in the fluid after the crops are dumped into container 2180.

Figure 22:
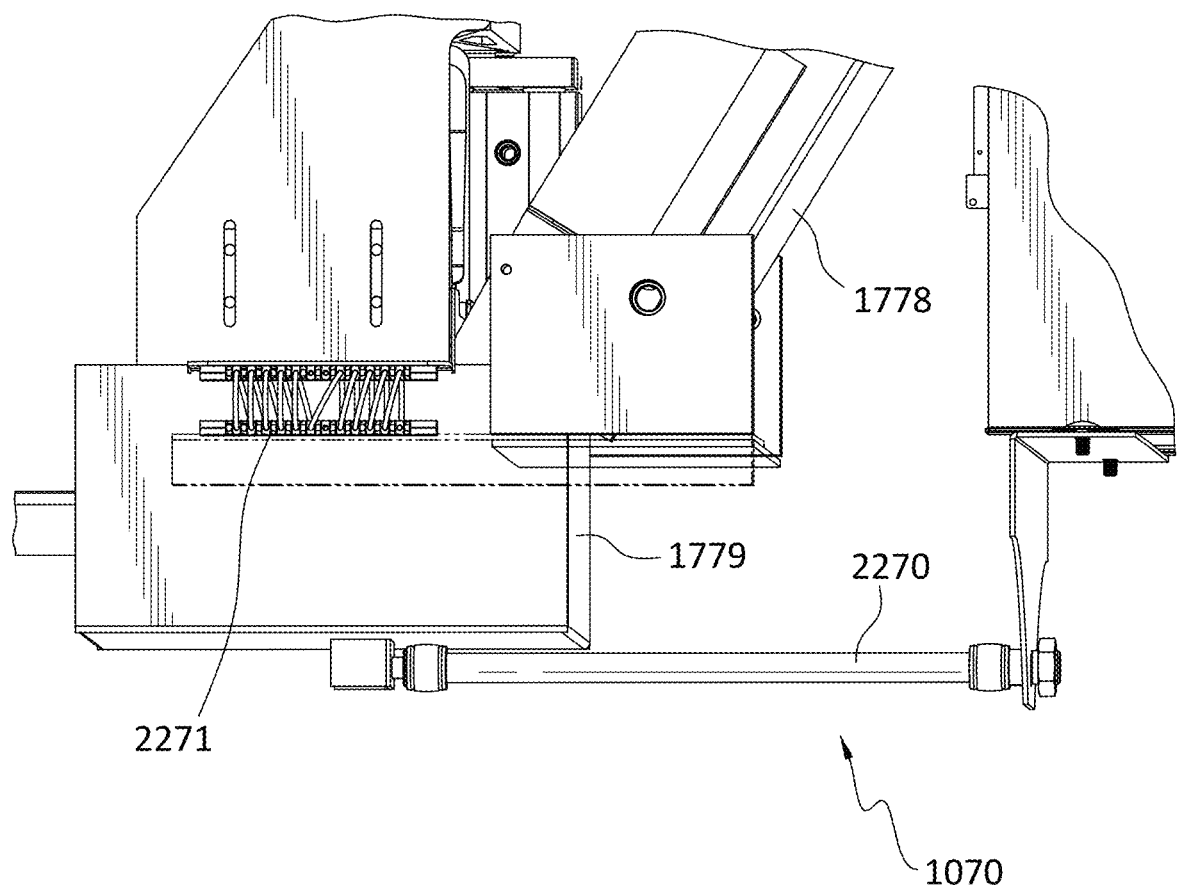
FIG. 22 illustrates a side elevational view of a portion of the packer of FIG. 10, showing the packing tank, a vibration cylinder, and springs.

FIG. 22 illustrates a side elevational view of a portion of packer 1070, showing packing tank 1779, vibration cylinder 2270, and springs 2271. In many embodiments, when the crops are dumped into packing tank 1779, the container (e.g., 2180 (FIG. 21)) can be submerged in the fluid. The level of the fluid above the top of the container can be approximately the average diameter of the crop, which can allow the crops to arrange themselves while floating in the fluid. For example, for strawberries, the fluid level can be approximately 1 to 2 inches (2.54 to 5.08 cm) above the top of the container.

Figure 23:
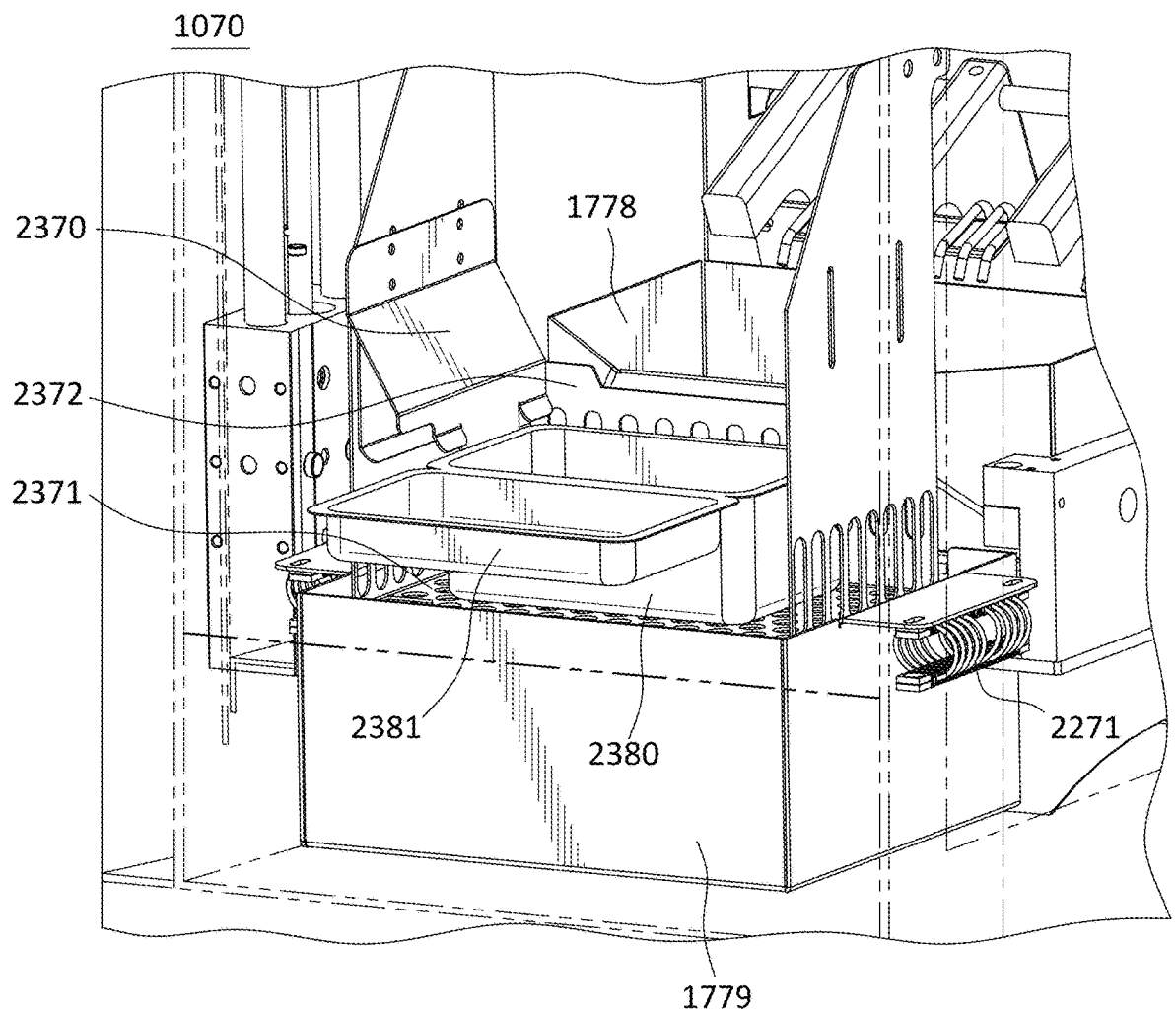
FIG. 23 illustrates a perspective view of a portion of the packer of FIG. 10, showing the packing tank with a container being lifted out of the packing tank.

In some embodiments, packing tank 1779 can be vibrated while the crops are deposited into packing tank 1779 and/or the container (e.g., 2180 (FIG. 21)), which can facilitate the crops arranging themselves in a manner that will fit into the container (e.g., 2180 (FIG. 21)). For example, vibration cylinder 2270 can be actuated at a programmed frequency to vibrate packing tank 1779, which can vibrate the fluid in packing tank 1779 and facilitate arrangement of the crops. Springs 2271 can facilitate vibrational movement of packing tank 1779 when actuated by vibration cylinder 2270. In a number of embodiments, the vibration can be actuated while the crops are being deposited into packing tank 1779 and/or can continue until the container is lifted out of the fluid, as shown in FIG. 23 and described below. The vibration can arrange and/or level out the crops, and/or cause the crops to settle evenly within the container (e.g., 2180 (FIG. 21)). In some embodiments, the vibration can facilitate shaking off excess fluid from the crops as the crops are lifted in the container out of the fluid.

FIG. 23 illustrates a perspective view of a portion of packer 1070, showing packing tank 1779 with a container 2380 being lifted out of packing tank 1779. Container 2380 can be similar to container 2180 (FIG. 21). In many embodiments, a container carrier 2371 can be raised and/or lowered within packing tank 1779. For example, once container 2180 has been inserted into packing tank 1779, and crops have been deposited into packing tank 1779, container carrier 2371 can be raised to a top of packing tank 1779 to lift container 2380 out of packing tank 1779. In several embodiments, container carrier 2371 can include a grill or holes to allow the fluid in packing tank 1779 to pass through container carrier 2371. In many embodiments, the containers (e.g., 2180 (FIG. 21), 2380) can include holes to allow fluid in the container to drain out of the container. As container carrier 2371 is raised vertically, the fluid in the container can drain into packing tank 1779. In many embodiments, the fluid in packer 1070 can be continuously flowing through it to maintain the chemistry of the solution.

In some embodiments, packing tank 1779 can include one or more removable supports, such as side support 2370, which can be inserted when packing smaller containers (e.g., 1-pound (0.45 kg) containers) and removed when packing larger containers (e.g., 2-pound (0.91 kg) containers). In several embodiments, side support 2370 can provide additional side support to hold the smaller containers and/or funnel the crops into the containers as the crops are deposited into the containers.

In some embodiments, container 2380 can be a clamshell container, which can include a lid 2381, which can be closed after container 2380 has been filled. In other example, the containers can be without lids, and a film can be adhered to the top of the container when the container is ready to be closed. In some embodiments, regulated air can be blown into the container to remove excess fluid before the container is closed. In several embodiments, once the container (e.g., 2380) is ready to be closed, the container (e.g., 2380) can be pushed horizontally by surface 2372 (which in some embodiments can be part of container carrier 2371, and in other embodiments can be separate from container carrier 2371) to a conveyor for drying and/or to a closing device (e.g., to close the clamshell lid or apply the film seal). After being closed, the containers (e.g., 2380) can be automatically placed in flats or other transport containers for palletizing. In many embodiments, the containers, flat, and/or pallets of crops can be further cooled. For example, strawberries can be further cooled to approximately 36 degrees Fahrenheit.

Figure 24:
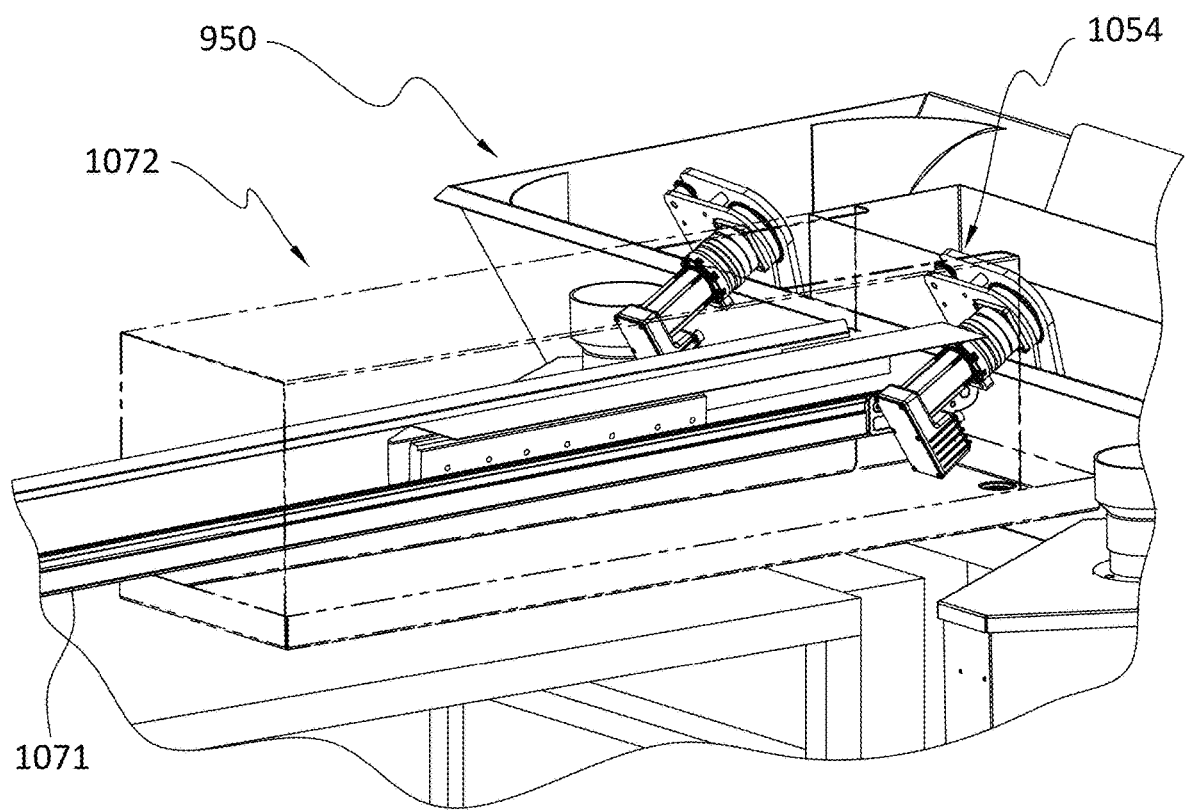
FIG. 24 illustrates a perspective view of a drying tunnel around the presentation conveyor of FIG. 10.

FIG. 24 illustrates a perspective view of drying tunnel 1072 around presentation conveyor 1071. In some embodiments, such as when the crops will be hand-packed, the crops can be lifted onto presentation conveyor 1071 by an extraction conveyor (e.g., 1054). Drying tunnel 1072 can be positioned at the beginning of presentation conveyor 1071 to remove excess fluid from the crops before the crops are hand-packed. In several embodiments, drying tunnel 1072 can include air jets to blow regulated air on the crops to dry the crops. In many embodiments, the drying tunnel (e.g., 1072) can include an enclosure and/or a drip pan to prevent splashing of fluid and/or loss of fluid.

In other embodiments, a drying tunnel, which can be similar to drying tunnel 1072 and contain elements that are similar or identical to drying tunnel 1072, can be used to dry the crops inside the containers (e.g., 2180 (FIG. 21), 2380 (FIG. 23)) before the containers are closed. For example, the containers can be conveyed into a drying tunnel with a series of air jets to blow out excess fluid. In a number of embodiments, the air jets can be configured with top-bearing jets blowing down and side jets blowing from the side and/or bottom of the containers and/or the crops. For example, an air knife can blow from each air jet as the container is conveyed past the air jet.

In many embodiments, the troughs (e.g., 411 (FIGS. 4-5), 511-514 (FIG. 5)), the transfer tubes (e.g., 431 (FIGS. 4-5), 531 (FIG. 5)), the soak tank (e.g., 600 (FIG. 6)), the lift conveyor (e.g., 850 (FIG. 8)), the drop tank (e.g., 950 (FIG. 9)), the extraction conveyors (e.g., 1053, 1054 (FIG. 10)), the inspectors (e.g., 1060, 1061 (FIG. 10)), the packers (e.g., 1070 (FIG. 10)), the presentation conveyor (e.g., 1071 (FIG. 10)), and/or the drying tunnels (e.g., 1072 (FIG. 10)) can be located on a mobile harvesting vehicle, similar to the harvesting vehicle described in the '764 Publication, to provide automated transport, inspection, and/or packing of the crops after the crops have been automatically picked. For example, in many embodiments, one or more of these elements, and in some embodiments all of these elements, can be located on the harvesting vehicle above the pick deck of the harvesting vehicle. In many embodiments, the transport of crops from the harvesting robots, up the hoppers, through the troughs, through the transfer tubes, through the soak tank, up the lift conveyor, into the drop tank, up the extraction conveyors, through the inspectors, and through the packers, can be configured to operate on the mobile harvesting vehicle, and/or can be configured to transport the crops with gentle handling (e.g., floating in fluid) to limit damage to the crops. In a number of embodiments, the harvesting vehicle can be configured such that the picking, transport, inspection, and/or packing of the crops can occur during the day, and/or at evening and/or night.

Figure 25:
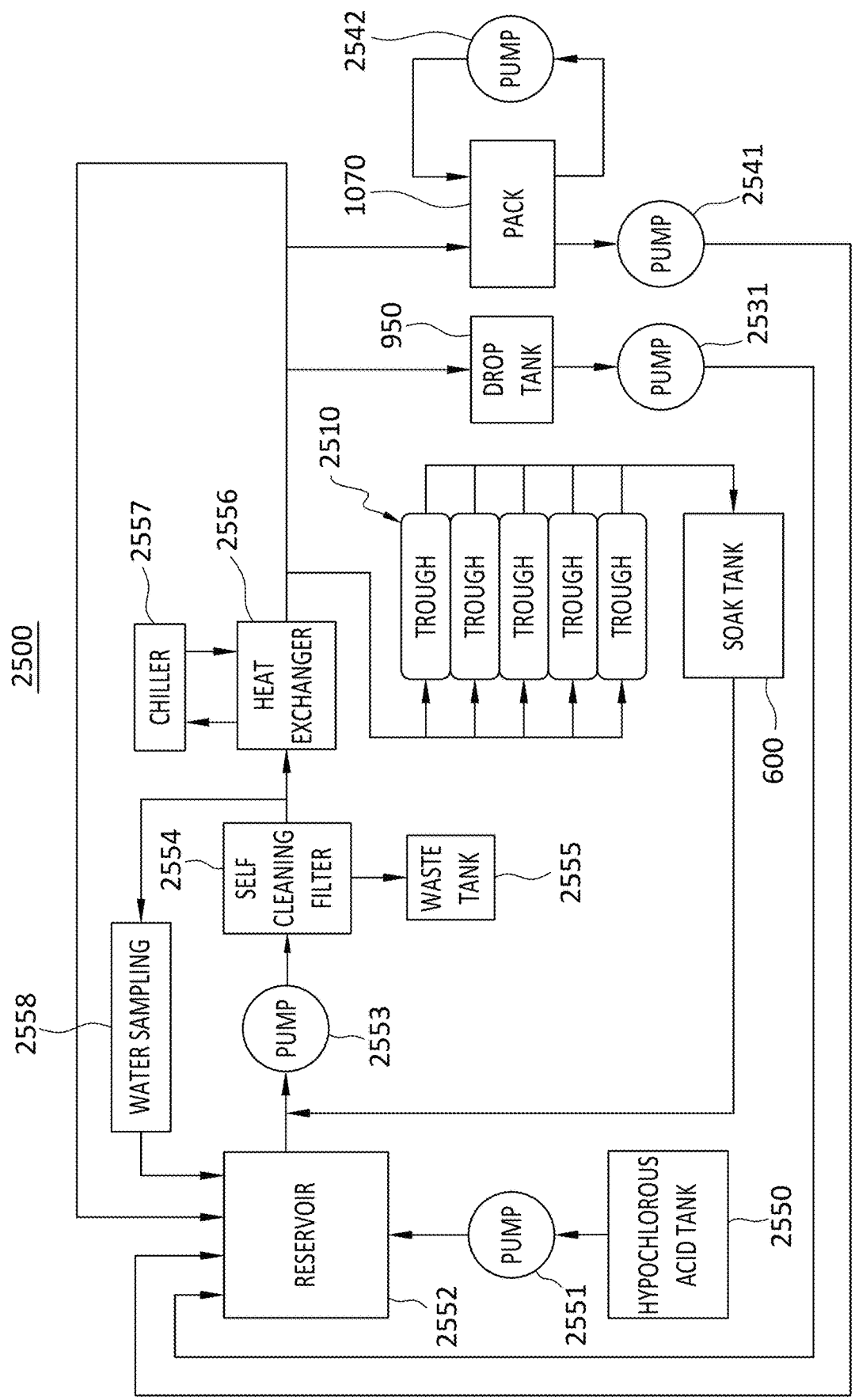
FIG. 25 illustrates a block diagram of an exemplary fluid system that can implemented on a harvesting vehicle.

FIG. 25 illustrates a block diagram of an exemplary fluid system 2500 that can implemented on the harvesting vehicle. Fluid system 2500 is merely exemplary, and embodiments of the fluid system are not limited to the embodiments presented herein. The fluid system can be employed in many different embodiments or examples not specifically depicted or described herein. In many embodiments, fluid system 2500 can be self-contained on the harvesting vehicle. As shown in FIG. 25, fluid system 2500 can include a hypochlorous acid tank 2550 that includes a supply of hypochlorous acid. In other embodiments, other fluids can be used. The hypochlorous acid can be pumped using a pump 2551 into a reservoir 2552 that is used for circulation of the hypochlorous acid in fluid system 2500. Fluid system can include a pump 2553 that pumps from reservoir 2552 into a self-cleaning filter 2554. Impurities, debris, etc. in the fluid can be filtered out by self-cleaning filter 2554 and dumped into a waste tank 2555.

In many embodiments, a water sampling system 2558 can analyze the chemistry of the fluid (e.g., hypochlorous acid) to test whether the fluid in reservoir 2552 is at the appropriate levels or within predetermined ranges. In some embodiments, fluid system 2500 can implement continuous circulation and/or self-cleaning filtering to maintain chemistry levels of the fluid solution (e.g., hypochlorous acid solution). In various embodiments, automated liquid monitoring can maintain chemistry levels.

In several embodiments, a heat exchanger 2556 can be used with a chiller 2557 to cool the fluid in reservoir 2552. The fluid can be cooled by chiller 2557 on the harvesting vehicle and can be configured to remove field heat from the crops, which can result in improved handling of the crops and/or longer shelf life for the crops.

In a number of embodiments, when one or more of the nozzles on troughs 2510 (which can include troughs 411 (FIGS. 4-5) and/or 511-514 (FIG. 5)) activate, the fluid can run through one or more of troughs 2510, then through the transfer tubes into soak tank 600, as described above. The fluid in soak tank 600 can be pumped down into self-cleaning filter 2554. The fluid also can circulate in drop tank 950 and packer 1070, as described above. Packer 1070 can include a pump 2542 that circulates fluid in packer 1070. In some embodiments, drop tank 950 and packer 1070 can each include pumps (e.g., 2531 and 2541, respectively) that drain the fluid into reservoir 2552. In a number of embodiments, fluid system 2500 can be configured to pump itself down for exchanging fluid in the harvesting vehicle.

Figure 26:
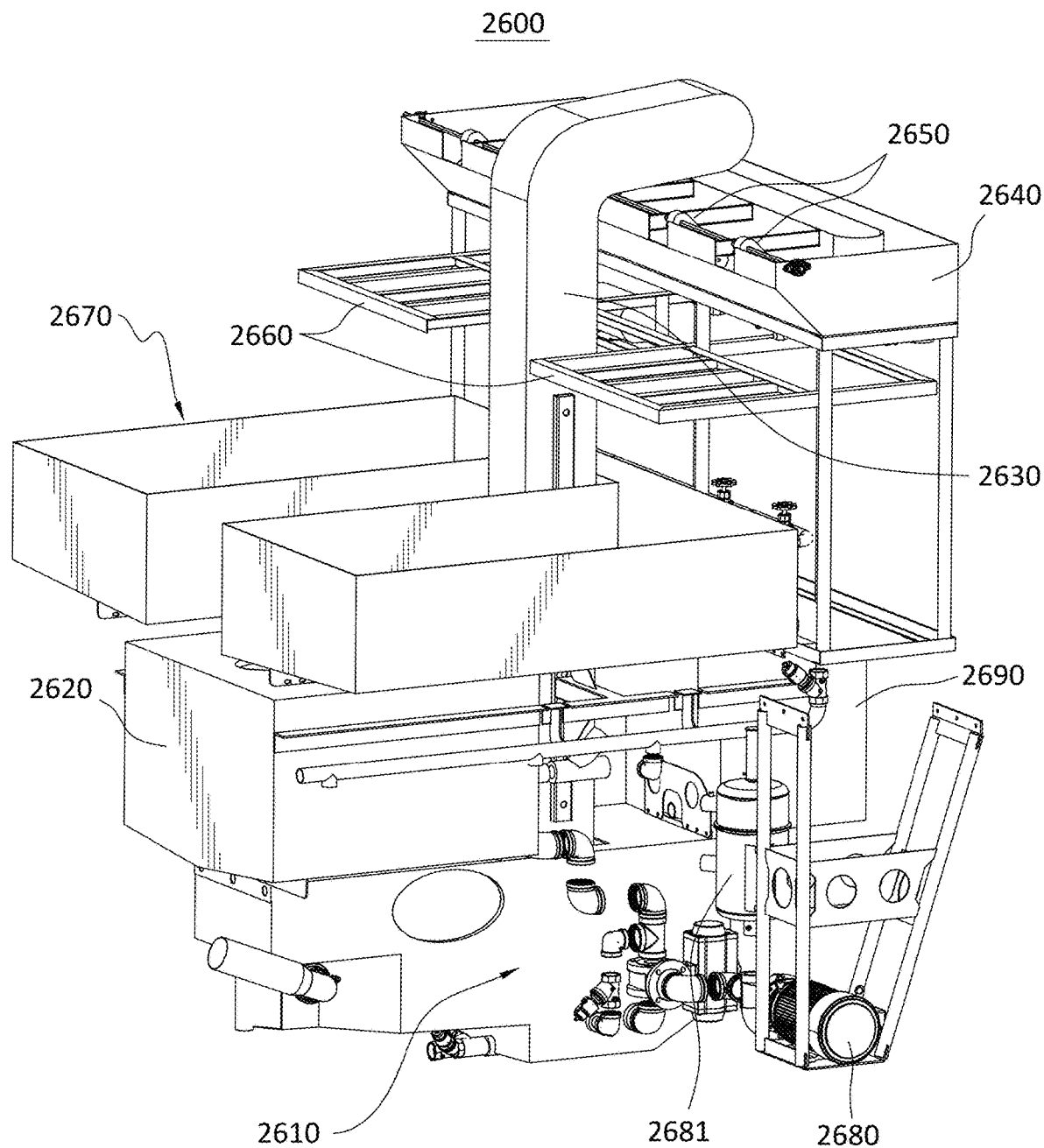
FIG. 26 illustrates a perspective view of various components of a fluid system, according to another embodiment.

FIG. 26 illustrates a perspective view of various components of a fluid system 2600, according to another embodiment. Fluid system 2600 is merely exemplary, and embodiments of the fluid system are not limited to the embodiments presented herein. The fluid system can be employed in many different embodiments or examples not specifically depicted or described herein. Fluid system 2600 can be similar to fluid system 2500 (FIG. 25), and various components of fluid system 2600 can be similar or identical to various components of fluid system 2500 (FIG. 25). Fluid system 2600 can include a soak tank 2610, a working reservoir 2620, a lift conveyor 2630, a drop tank 2640, extraction conveyors 2650, inspector mount frames 2660, packer sump tanks 2670, a main pump 2680, a filter 2681, and a makeup water tank 2690. Soak tank 2610 can be similar or identical to soak tank 600 (FIG. 6). Working reservoir 2620 can be similar or identical to reservoir 2552 (FIG. 25). Lift conveyor 2630 can be similar or identical to lift conveyor 850 (FIG. 8). Drop tank 2640 can be similar or identical to drop tank 950 (FIG. 9). Extraction conveyors 2650 can be similar or identical to extraction conveyors 1053 and/or 1054 (FIG. 10). Inspector mount frames 2660 each can support at least a portion of an inspector, such as inspectors 1060 (FIGS. 10, 12A), 1061 (FIG. 10), and/or 1270 (FIGS. 12B-12C). Packer sump tanks 2670 can be similar or identical to sump tank 1771 (FIG. 17) of packer 1070 (FIG. 10, 17) and/or pack tank 2540 (FIG. 25). Packer sump tanks 2670 can hold packers, such as packer 1070 (FIG. 10, 17). Main pump 2680 can be similar or identical to pump 2553 (FIG. 25). Filter 2681 can be similar or identical to self-cleaning filter 2554. Makeup water tank 2690 can provide additional water to fluid system 2600 to compensate for water that is lost to evaporation, etc. In many embodiments, the components of fluid system 2600 can be arranged in a compact, stacked arrangement, as shown in FIG. 26.

Figure 27:
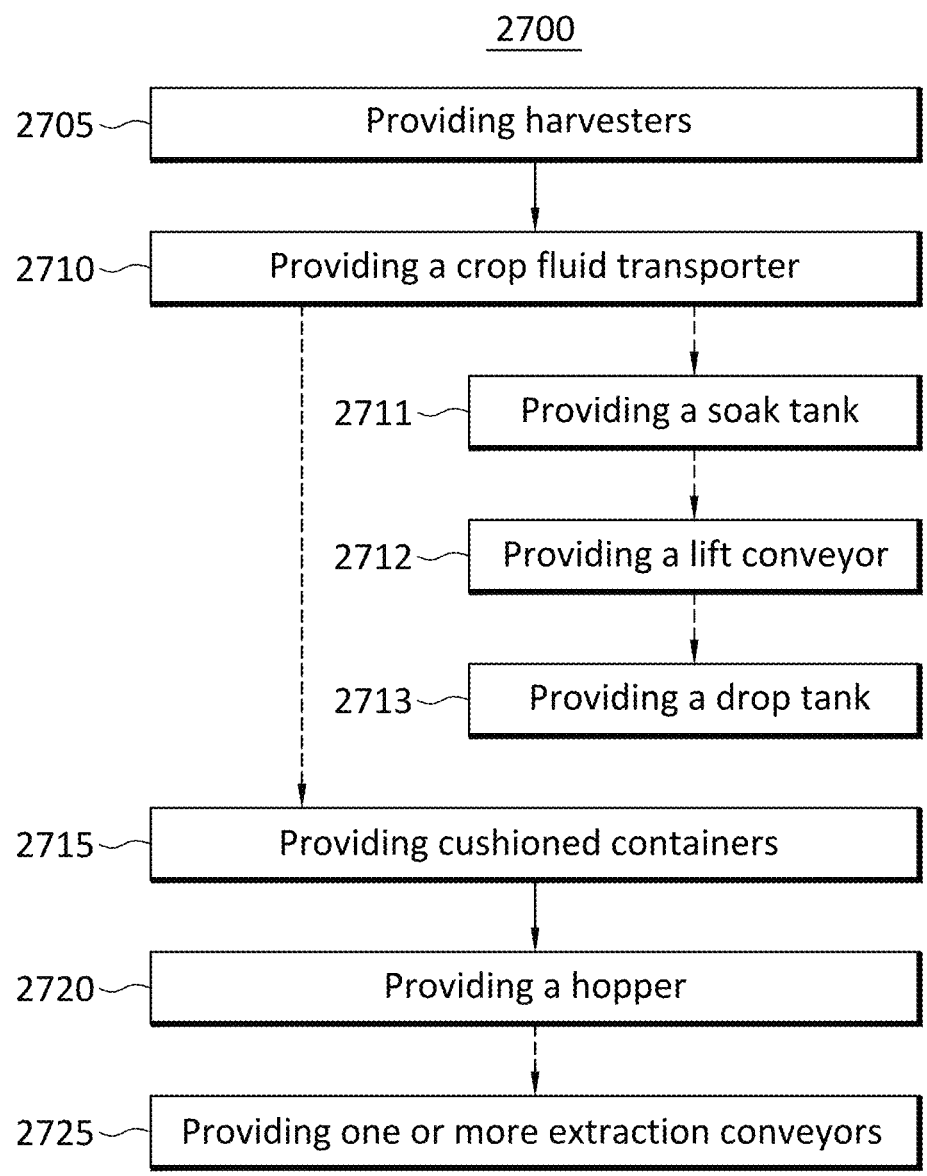
FIG. 27 illustrates a flow chart for a method of providing a harvesting vehicle, according to an embodiment.

Turning ahead in the drawings, FIG. 27 illustrates a flow chart for a method 2700 of providing a harvesting vehicle, according to an embodiment. Method 2700 is merely exemplary and is not limited to the embodiments presented herein. Method 2700 can be employed in many different embodiments or examples not specifically depicted or described herein. In some embodiments, the procedures, the processes, and/or the activities of method 2700 can be performed in the order presented. In other embodiments, the procedures, the processes, and/or the activities of method 2700 can be performed in any suitable order. In still other embodiments, one or more of the procedures, the processes, and/or the activities of method 2700 can be combined or skipped.

Referring to FIG. 27, method 2700 can include an activity 2705 of providing harvesters configured to pick crops. The harvesters can be similar or identical to harvesting robot 110 (FIG. 1).

In a number of embodiments, method 2700 also can include an activity 2710 of providing a crop fluid transporter configured to float and transport the crops in a fluid on the harvesting vehicle. The crop fluid transporter can be similar or identical to troughs 411 and/or 511-514 (FIG. 5), transfer tubes 431 and/or 531 (FIG. 5), soak tank 600 (FIG. 6), lift conveyor 850 (FIG. 8), drop tank 950 (FIG. 9), fluid system 2600 (FIG. 6), and/or other suitable elements described herein. In a number of embodiments, the fluid can be an aqueous solution of hypochlorous acid, or another suitable fluid.

In several embodiments, activity 2710 can include an activity 2711 of providing a soak tank configured to clean and cool the crops while the crops float in the fluid for at least a third predetermined time period. The soak tank can be similar or identical to soak tank 600 (FIG. 6) and/or soak tank 2610 (FIG. 26). The third predetermined time period can be approximately 15 seconds, approximately 30 seconds, approximately 45 seconds, approximately 60 seconds, approximately 75 seconds, approximately 90 seconds, approximately 105 seconds, approximately 120 seconds, or another suitable time period.

In a number of embodiments, activity 2710 also can include an activity 2712 of providing a lift conveyor configured to extract the crops from the soak tank. The lift conveyor can be similar or identical to lift conveyor 850 (FIG. 8) and/or lift conveyor 2630 (FIG. 26). In some embodiments, the crops can float into buckets of the lift conveyor, and the fluid can drain out of the buckets as the buckets are lifted above the soak tank. The buckets can be similar or identical to conveyor shelf 852 (FIG. 8).

In several embodiments, activity 2710 additionally can include an activity 2713 of providing a drop tank configured to (i) receive the crops in the fluid when the crops are dumped into the drop tank from the lift conveyor, and (ii) circulate the crops around the drop tank. The drop tank can be similar or identical to drop tank 950 (FIG. 9) and/or drop tank 2640 (FIG. 26).

In several embodiments, method 2700 further and optionally can include an activity 2715 of providing cushioned containers configured to collect the crops after the crops are picked by the harvesters. The cushioned containers can be similar or identical to trampoline 113 (FIG. 1).

In a number of embodiments, method 2700 further can include an activity 2720 of providing a hopper configured to receive the crops from the cushioned containers and lift the crops to be deposited into transport troughs. The hopper can be similar or identical to hopper 115 (FIG. 1). The transport troughs can be similar or identical to troughs 411 and/or 511-514 (FIG. 5), and/or troughs 2510 (FIG. 25). In some embodiments, the crop fluid transporter can include the transport troughs. In many embodiments, the transport troughs can be sized to float the crops in the fluid in a serial manner.

In some embodiments, the crops picked by the harvesters associated with a trough of the transport troughs can be dumped into the trough concurrently after each of the harvesters associated with the trough finishes picking the crops on a respective plant. For example, the harvesters can each pick crops from a respective plant, and once all the harvesters have each picked crops from one respective plant (one plant per harvester), the crops from all of the harvesters associated with the trough can be deposited concurrently in the trough. In some embodiments, the crop fluid transporter is configured to start flow of the fluid into the trough within a first predetermined time period before the crops picked by the harvesters associated with the trough are dumped into the trough. The first predetermined time period can be approximately 1 second, approximately 1.5 seconds, approximately 2 seconds, approximately 2.5 seconds, approximately 3 seconds, or another suitable time period. In various embodiments, the crop fluid transporter is configured to stop the flow of the fluid into the trough within a second predetermined time period after the crops picked by the harvesters associated with the trough are dumped into the trough. The second predetermined time period can be approximately 1 second, approximately 1.5 seconds, approximately 2 seconds, approximately 2.5 seconds, approximately 3 seconds, approximately 3.5 seconds approximately 4 seconds, or another suitable time period.

In several embodiments, method 2700 optionally can include an activity 2725 of providing one or more extraction conveyors each comprising respective paddles sized to extract the crops individually out of the drop tank of the crop fluid transporter to be individually inspected. The extraction conveyors can be similar or identical to extraction conveyors 1053 and/or 1054 (FIG. 10) and/or extraction conveyors 2650 (FIG. 26). The paddles can be similar or identical to paddle 1153 (FIG. 11). In some embodiments, the fluid can circulate the crops in the drop tank toward the one or more extraction conveyors. In some embodiments, a speed at which the one or more extraction conveyors rotate the respective paddles is adjustable to set a rate of inspection of the crops.

Figure 28:
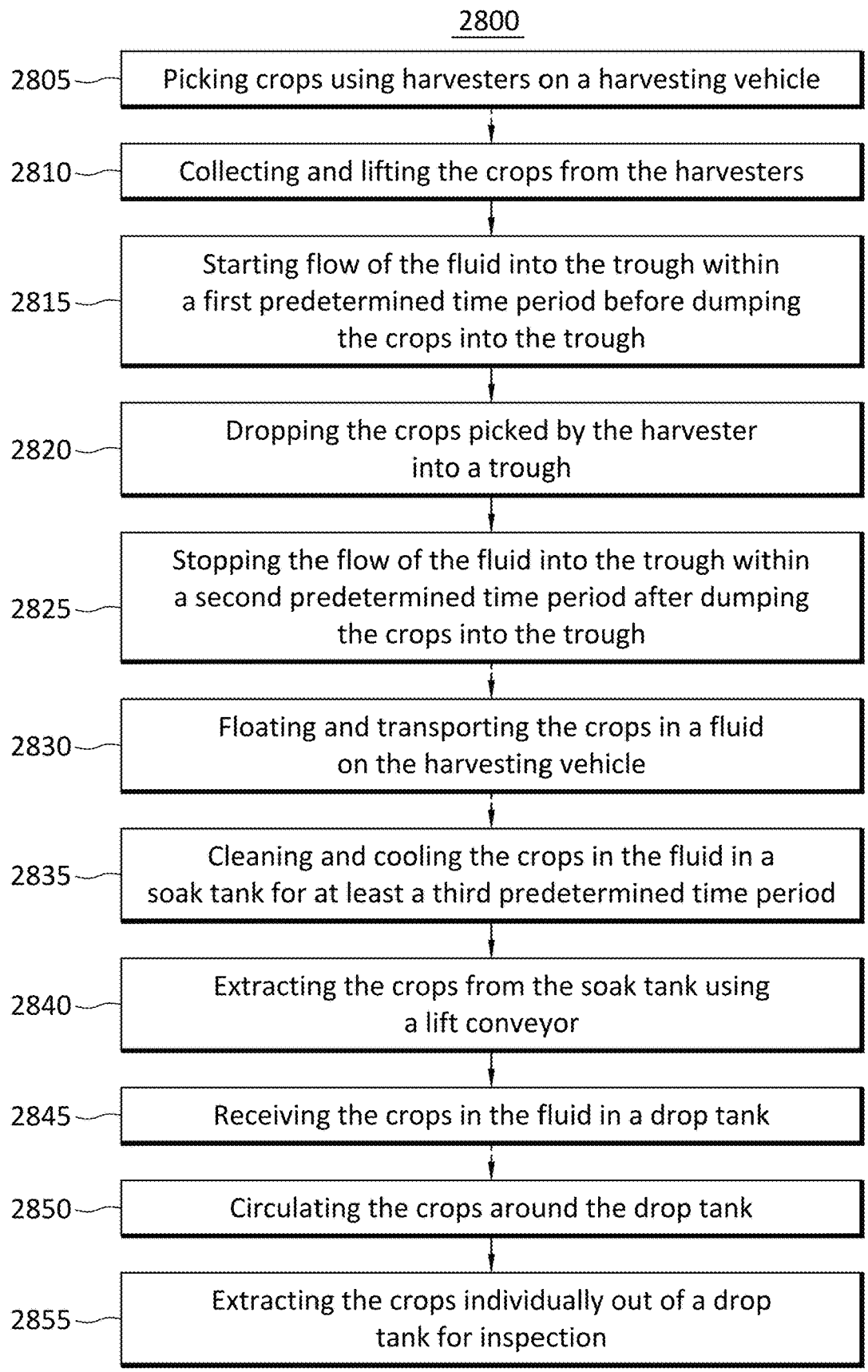
FIG. 28 illustrates a flow chart for a method of using a harvesting vehicle, according to an embodiment.

Turning ahead in the drawings, FIG. 28 illustrates a flow chart for a method 2800 of using a harvesting vehicle, according to an embodiment. Method 2800 is merely exemplary and is not limited to the embodiments presented herein. Method 2800 can be employed in many different embodiments or examples not specifically depicted or described herein. In some embodiments, the procedures, the processes, and/or the activities of method 2800 can be performed in the order presented. In other embodiments, the procedures, the processes, and/or the activities of method 2800 can be performed in any suitable order. In still other embodiments, one or more of the procedures, the processes, and/or the activities of method 2800 can be combined or skipped.

Referring to FIG. 28, method 2800 optionally can include an activity 2805 of picking crops using harvesters on a harvesting vehicle. The harvesters can be similar or identical to harvesting robot 110 (FIG. 1). The harvesting vehicle can be similar to the harvesting vehicles described and shown in the '764 Publication.

In a number of embodiments, method 2800 can include an activity 2810 of collecting and lifting the crops from the harvesters to be deposited into a fluid in transport troughs. The transport troughs can be similar or identical to troughs 411 and/or 511-514 (FIG. 5), and/or troughs 2510 (FIG. 25). In a number of embodiments, the fluid can be an aqueous solution of hypochlorous acid, or another suitable fluid. In some embodiments, the transport troughs are sized to float the crops in the fluid in a serial manner.

In several embodiments, method 2800 additionally can include an activity 2815 of starting flow of the fluid into a trough of the transport troughs within a first predetermined time period before dumping into the trough the crops picked by the harvesters associated with the trough. The first predetermined time period can be approximately 1 second, approximately 1.5 seconds, approximately 2 seconds, approximately 2.5 seconds, approximately 3 seconds, or another suitable time period.

In a number of embodiments, method 2800 further can include an activity 2820 of dumping the crops picked by the harvesters associated with the trough of the transport troughs into the trough concurrently after each of the harvesters associated with the trough finishes picking the crops on a respective plant.

In several embodiments, method 2800 additionally can include an activity 2825 of stopping the flow of the fluid into the trough within a second predetermined time period after dumping into the trough the crops picked by the harvesters associated with the trough. The second predetermined time period can be approximately 1 second, approximately 1.5 seconds, approximately 2 seconds, approximately 2.5 seconds, approximately 3 seconds, approximately 3.5 seconds approximately 4 seconds, or another suitable time period.

In a number of embodiments, method 2800 further and optionally can include an activity 2830 of floating and transporting the crops in a fluid on the harvesting vehicle. For example, the crops can be floated and/or transported in a fluid in troughs 411 and/or 511-514 (FIG. 5), transfer tubes 431 and/or 531 (FIG. 5), soak tank 600 (FIG. 6), lift conveyor 850 (FIG. 8), drop tank 950 (FIG. 9), fluid system 2600 (FIG. 6), and/or other suitable elements described herein.

In several embodiments, method 2800 additionally and optionally can include an activity 2835 of cleaning and cooling the crops in the fluid in a soak tank for at least a third predetermined time period. The soak tank can be similar or identical to soak tank 600 (FIG. 6) and/or soak tank 2610 (FIG. 26). The third predetermined time period can be approximately 15 seconds, approximately 30 seconds, approximately 45 seconds, approximately 60 seconds, approximately 75 seconds, approximately 90 seconds, approximately 105 seconds, approximately 120 seconds, or another suitable time period.

In a number of embodiments, method 2800 further can include an activity 2840 of extracting the crops from the soak tank using a lift conveyor. The lift conveyor can be similar or identical to lift conveyor 850 (FIG. 8) and/or lift conveyor 2630 (FIG. 26). In many embodiments, the crops can float into buckets of the lift conveyor, and the fluid drains out of the buckets as the buckets are lifted above the soak tank. The buckets can be similar or identical to conveyor shelf 852 (FIG. 8).

In several embodiments, method 2800 additionally can include an activity 2845 of receiving the crops in the fluid in a drop tank when the crops are dumped into the drop tank from the lift conveyor. The drop tank can be similar or identical to drop tank 950 (FIG. 9) and/or drop tank 2640 (FIG. 26).

In a number of embodiments, method 2800 further and optionally can include an activity 2850 of circulating the crops around the drop tank, which can include circulating the crops in the fluid in the drop tank toward one or more extraction conveyors. The extraction conveyors can be similar or identical to extraction conveyors 1053 and/or 1054 (FIG. 10) and/or extraction conveyors 2650 (FIG. 26).

In several embodiments, method 2800 additionally can include an activity 2855 of extracting the crops individually out of a drop tank using respective paddles of the one or more extraction conveyors. The paddles can be similar or identical to paddle 1153 (FIG. 11). In some embodiments, a speed at which the one or more extraction conveyors rotate the respective paddles is adjustable to set a rate of inspection of the crops.

Figure 29:
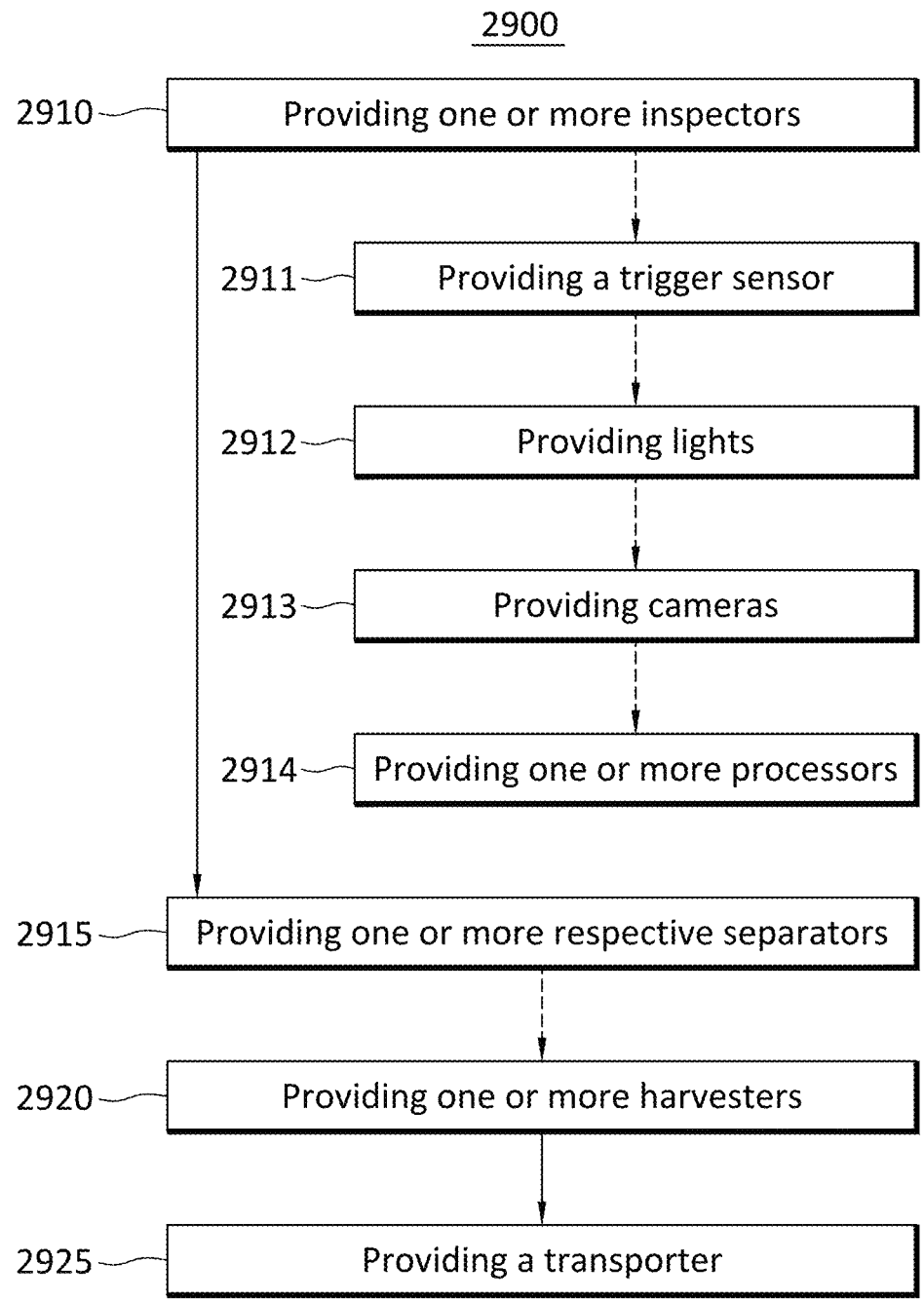
FIG. 29 illustrates a flow chart for a method of providing a system with one or more inspectors, according to an embodiment.

Turning ahead in the drawings, FIG. 29 illustrates a flow chart for a method 2900 of providing a system with one or more inspectors, according to an embodiment. Method 2900 is merely exemplary and is not limited to the embodiments presented herein. Method 2900 can be employed in many different embodiments or examples not specifically depicted or described herein. In some embodiments, the procedures, the processes, and/or the activities of method 2900 can be performed in the order presented. In other embodiments, the procedures, the processes, and/or the activities of method 2900 can be performed in any suitable order. In still other embodiments, one or more of the procedures, the processes, and/or the activities of method 2900 can be combined or skipped.

Referring to FIG. 29, method 2900 can include an activity 2910 of providing one or more inspectors each configured to automatically inspect crops individually to classify the crops into a classification comprising two or more classes. The inspectors can be similar or identical to inspectors 1060 (FIGS. 10, 12A), 1061 (FIG. 10), and/or 1270 (FIGS. 12B-12C). In some embodiments, the classification can include two classes, such as a reject class and an accept (e.g., pack) class. In other embodiments, the classification can include three classes, such as a reject class, a process class, and a pack class. In many embodiments, the classification is based on grading levels of the crops, which can be adjusted by an operator or automatically based on trained values through machine learning.

In several embodiments, activity 2910 can include an activity 2911 of providing a trigger sensor configured to start a timing sequence based on a respective crop of the crops entering an inspector of the one or more inspectors. The trigger sensor can be similar or identical to trigger sensors 1277 (FIGS. 12B-12C). In many embodiments, the trigger sensor is configured to be activated as the respective crop falls, based on gravity, into the inspector.

In a number of embodiments, activity 2910 also can include an activity 2912 of providing lights configured to be triggered based on the timing sequence and provide diffuse light to illuminate the respective crop. The lights can be similar or identical to lights 1272 (FIGS. 12B-12C).

In several embodiments, activity 2910 additionally can include an activity 2913 of providing cameras configured to be triggered based on the timing sequence and capture images of the respective crop. The cameras can be similar or identical to cameras 1261 (FIG. 12A) and/or cameras 1271 (FIGS. 12B-12C). The images can be similar to the images shown in FIG. 13. In many embodiments, the images collectively can show all surfaces of the respective crop. In some embodiments, the lights and the cameras are configured to be triggered based on the timing sequence at a first predetermined time period after a start of the timing sequence to capture the images of the respective crop at an approximate predetermined location within the inspector as the respective crop falls through a food-safe liner of the inspector. The liner can be similar or identical to liner 1276 (FIGS. 12B-12C). For example, the predetermined location can be a center point of the inspector at which the lights and cameras are aimed. The first predetermined time period can be derived based on the amount of time it takes for the crop to fall from the trigger sensor to the predetermined location. In some embodiments, for example, the lights and cameras can be triggered approximately 10 ms after the trigger sensor starts the timer, in which case the predetermined time period is 10 ms. Other suitable time periods can be used.

In a number of embodiments, activity 2910 further can include an activity 2914 of providing one or more processors configured to execute computing instructions that, when executed on the one or more processors, cause the one or more processors to perform classifying the respective crop into the classification based on the images of the respective crop. The processors can be similar or identical to processor 1274 (FIGS. 12B-12C). In several embodiments, the processors can be configured to classify the respective crop into the classification within a second predetermined time period after the start of the timing sequence and before the respective crop, based on gravity, falls to one or more respective separators. The second predetermined time period can be no longer than the time it takes for the crop to fall from the predetermined location at which the images are taken to the one or more separators. In some embodiments, the second predetermined time period can be approximately 8 ms, approximately 10 ms, approximately 12 ms, approximately 15 ms, approximately 20 ms, approximately 25 ms, approximately 30 ms, or another suitable time period.

In several embodiments, method 2900 also can include an activity 2915 of providing one or more respective separators associated with each of the one or more inspectors. The separators can be similar or identical to reject mechanism 1263 (FIG. 12A) and/or 1463 (FIGS. 14-16). The one or more respective separators are configured to automatically physically separate the crops into two or more areas based on the classification. In some embodiments, there can be a single separator. In other embodiments, there can be two separators, such as a first separator and a second separator. In several embodiments, each separator of the one or more respective separators is configured to be triggered based on the timing sequence and the classification. In some embodiments, the first separator is configured to separate the crops that are classified in the reject class into a reject area (such as a reject conveyor) and allow the crops that are not classified in the reject class to fall through to the second separator. The second separator is configured to separate the crops that are classified in the process class into a process area (e.g., a process conveyor) and allow the crops that are classified in the pack class to fall through to a pack area (e.g., a flume 1773 of packer 1070 (FIG. 17)).

In a number of embodiments, method 2900 further and optionally can include an activity 2920 of providing one or more harvesters configured to automatically pick the crops. The harvesters can be similar or identical to harvesting robot 110 (FIG. 1).

In several embodiments, method 2900 additionally can include an activity 2925 of providing a transporter configured to automatically clean the crops picked by the one or more harvesters and automatically individually deposit the crops into the one or more inspectors. The transporter can be similar or identical to troughs 411 and/or 511-514 (FIG. 5), transfer tubes 431 and/or 531 (FIG. 5), soak tank 600 (FIG. 6), lift conveyor 850 (FIG. 8), drop tank 950 (FIG. 9), fluid system 2600 (FIG. 6), and/or other suitable elements described herein. In many embodiments, a crop of the crops is inspected in one of the one or more inspectors within approximately 4 minutes, approximately 5 minutes, approximately 6 minutes, approximately 7 minutes, approximately 8 minutes, or approximately 10 minutes after the crop is picked by one of the one or more harvesters.

Figure 30:
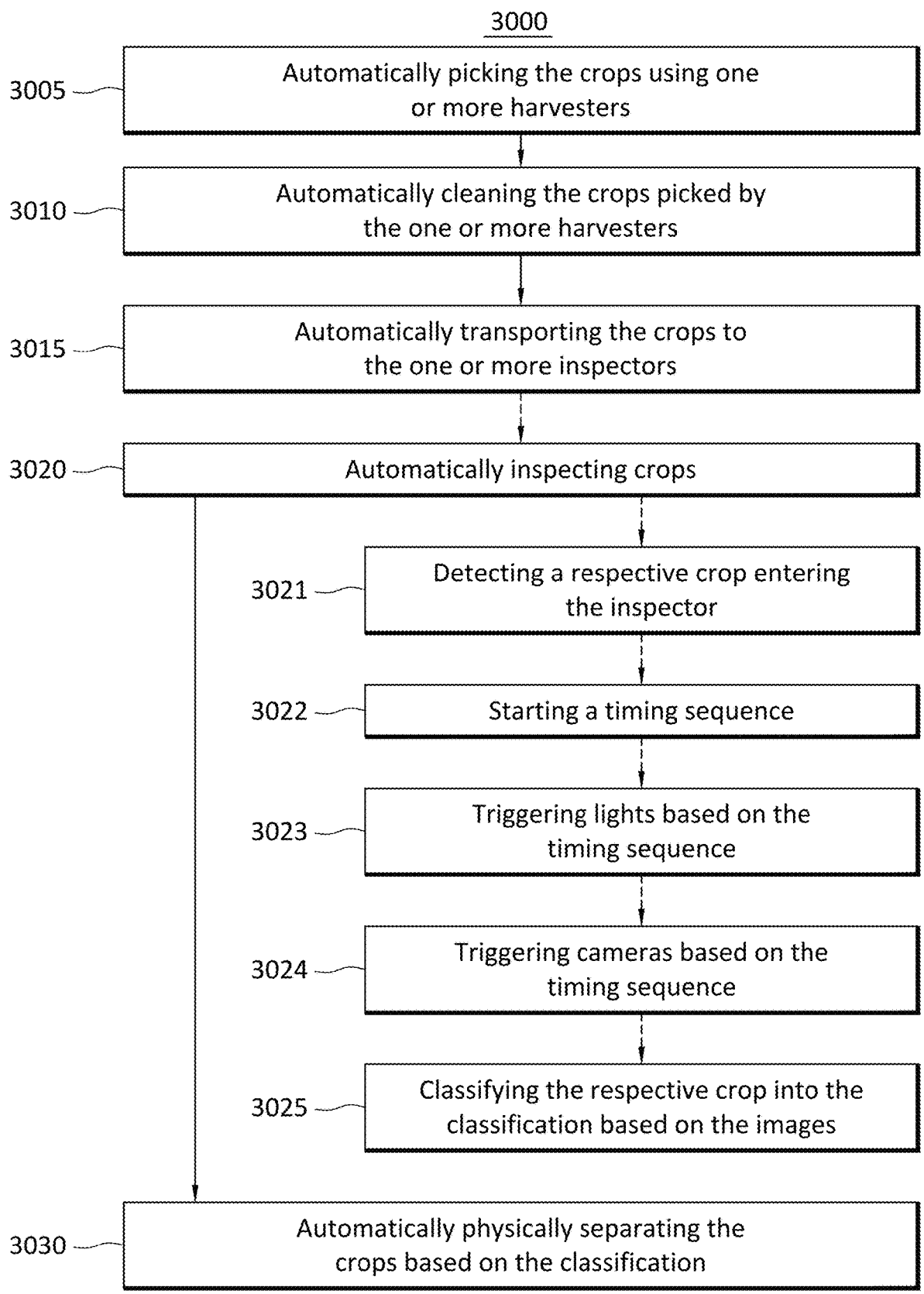
FIG. 30 illustrates a flow chart for a method of using a system with one or more inspectors, according to an embodiment.

Turning ahead in the drawings, FIG. 30 illustrates a flow chart for a method 3000 of using a system with one or more inspectors, according to an embodiment. Method 3000 is merely exemplary and is not limited to the embodiments presented herein. Method 3000 can be employed in many different embodiments or examples not specifically depicted or described herein. In some embodiments, the procedures, the processes, and/or the activities of method 3000 can be performed in the order presented. In other embodiments, the procedures, the processes, and/or the activities of method 3000 can be performed in any suitable order. In still other embodiments, one or more of the procedures, the processes, and/or the activities of method 3000 can be combined or skipped.

Referring to FIG. 30, method 3000 optionally can include an activity 3005 of automatically picking the crops using one or more harvesters. The harvesters can be similar or identical to harvesting robot 110 (FIG. 1).

In a number of embodiments, method 3000 also can include an activity 3010 of automatically cleaning the crops picked by the one or more harvesters. For example, the crops can be cleaned in a soak tank, such as soak tank 600 (FIG. 6).

In several embodiments, method 3000 additionally can include an activity 3015 of automatically transporting the crops to the one or more inspectors to automatically individually deposit the crops into one or more inspectors, such as transported in troughs 411 and/or 511-514 (FIG. 5), transfer tubes 431 and/or 531 (FIG. 5), soak tank 600 (FIG. 6), lift conveyor 850 (FIG. 8), drop tank 950 (FIG. 9), fluid system 2600 (FIG. 6), and/or other suitable elements described herein. The inspectors can be similar or identical to inspectors 1060 (FIGS. 10, 12A), 1061 (FIG. 10), and/or 1270 (FIGS. 12B-12C).

In a number of embodiments, method 3000 can include an activity 3020 of automatically inspecting crops, using the one or more inspectors, to individually to classify the crops into a classification comprising two or more classes. In some embodiments, the classification can include two classes, such as a reject class and an accept (e.g., pack) class. In other embodiments, the classification can include three classes, such as a reject class, a process class, and a pack class. In many embodiments, the classification is based on grading levels of the crops, which can be adjusted by an operator or automatically based on trained values through machine learning. In a number of embodiments, a crop of the crops is inspected in one of the one or more inspectors within approximately 4 minutes, approximately 5 minutes, approximately 6 minutes, approximately 7 minutes, approximately 8 minutes, or approximately 10 minutes of the crop being picked by one of the one or more harvesters.

In several embodiments, activity 3020 can include an activity 3021 of detecting, using a trigger sensor of an inspector of the one or more inspectors, a respective crop of the crops entering the inspector. The trigger sensor can be similar or identical to trigger sensors 1277 (FIGS. 12B-12C). In many embodiments, the trigger sensor can be activated as the respective crop falls, based on gravity, into the inspector.

In a number of embodiments, activity 3020 also can include an activity 3022 of starting a timing sequence based on detecting the respective crop entering the inspector.

In several embodiments, activity 3020 additionally can include an activity 3023 of triggering lights based on the timing sequence to provide diffuse light to illuminate the respective crop. The lights can be similar or identical to lights 1272 (FIGS. 12B-12C).

In a number of embodiments, activity 3020 further can include an activity 3024 of triggering cameras based on the timing sequence to capture images of the respective crop.

The cameras can be similar or identical to cameras 1261 (FIG. 12A) and/or cameras 1271 (FIGS. 12B-12C). The images can be similar to the images shown in FIG. 13. In some embodiments, the lights and the cameras are triggered based on the timing sequence at a first predetermined time period after a start of the timing sequence to capture the images of the respective crop at an approximate predetermined location within the inspector as the respective crop falls through a food-safe liner of the inspector. The liner can be similar or identical to liner 1276 (FIGS. 12B-12C). The first predetermined time period can be derived based on the amount of time it takes for the crop to fall from the trigger sensor to the predetermined location. In some embodiments, for example, the lights and cameras can be triggered approximately 10 ms after the trigger sensor starts the timer, in which case the predetermined time period is 10 ms. Other suitable time periods can be used. In some embodiments, the images collectively show all surfaces of the respective crop.

In several embodiments, activity 3020 additionally can include an activity 3025 of classifying the respective crop into the classification based on the images of the respective crop. In some embodiments, activity 3025 of classifying the respective crop into the classification can be performed within a second predetermined time period after the start of the timing sequence and before the respective crop, based on gravity, falls to the one or more respective separators. In some embodiments, the second predetermined time period can be approximately 8 ms, approximately 10 ms, approximately 12 ms, approximately 15 ms, approximately 20 ms, approximately 25 ms, approximately 30 ms, or another suitable time period.

In several embodiments, method 3000 further can include an activity 3030 of automatically physically separating the crops, using one or more respective separators associated with each of the one or more inspectors, into two or more areas based on the classification. The separators can be similar or identical to reject mechanism 1263 (FIG. 12A) and/or 1463 (FIGS. 14-16). In some embodiments, each separator of the one or more respective separators is triggered based on the timing sequence and the classification. In various embodiments, the one or more respective separators comprise a first separator and a second separator. Automatically physically separating the crops further can involve the first separator separating the crops that are classified in the reject class into a reject area and allowing the crops that are not classified in the reject class to fall through to the second separator. Further, the second separator can separate the crops that are classified in the process class into a process area and allow the crops that are classified in the pack class to fall through to a pack area.

Figure 31:
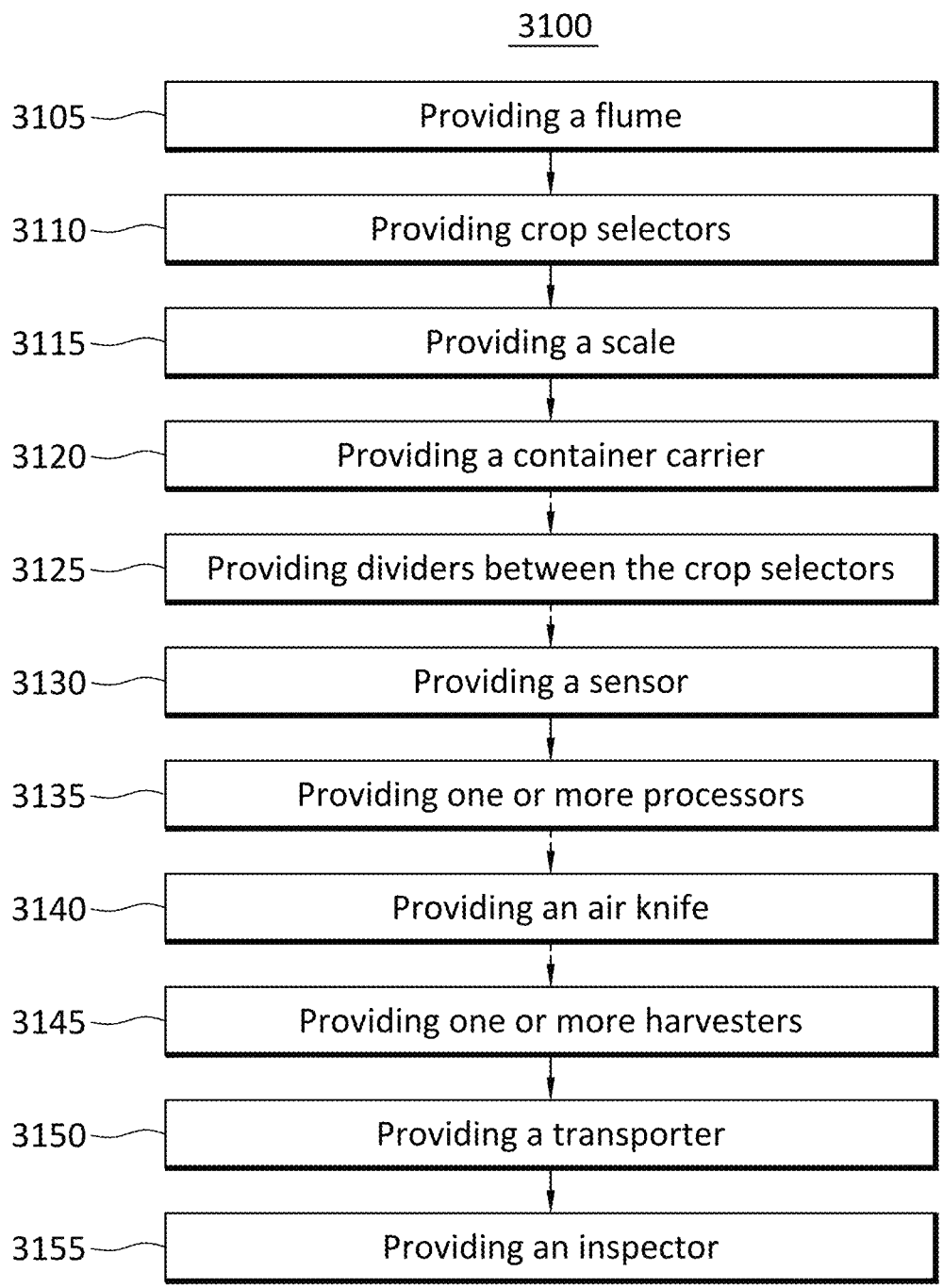
FIG. 31 illustrates a flow chart for a method of providing a system with one or more packers, according to an embodiment.

Turning ahead in the drawings, FIG. 31 illustrates a flow chart for a method 3100 of providing a system with one or more packers, according to an embodiment. Method 3100 is merely exemplary and is not limited to the embodiments presented herein. Method 3100 can be employed in many different embodiments or examples not specifically depicted or described herein. In some embodiments, the procedures, the processes, and/or the activities of method 3100 can be performed in the order presented. In other embodiments, the procedures, the processes, and/or the activities of method 3100 can be performed in any suitable order. In still other embodiments, one or more of the procedures, the processes, and/or the activities of method 3100 can be combined or skipped. The packers can be similar or identical to packer 1070 (FIG. 10).

Referring to FIG. 31, method 3100 can include an activity 3105 of providing a flume comprising a fluid and configured to receive crops. The flume can be similar or identical to flume 1773 (FIG. 17). In some embodiments, the flume can include a drop area configured to receive the crops as the crops are dropped individually into the flume, and a crop selection region adjacent to crop selectors (described below in connection with activity 3110). The crop selection region can be similar or identical to crop queue region 1774 (FIG. 17). In many embodiments, the flume is configured such that the fluid flows from the drop area toward the crop selection region to move the crops toward the crop selectors.

In a number of embodiments, method 3100 also can include an activity 3110 of providing crop selectors each sized to move the crops individually from the flume into a scale. The crop selectors can be similar or identical to pumpers 1871 (FIG. 18). The scale can be similar or identical to scale 1778 (FIG. 17). In many embodiments, the crop selectors are independently controlled to move the crops individually from the flume into the scale.

In several embodiments, method 3100 additionally can include an activity 3115 of providing the scale. In many embodiments, the scale is configured to weigh the crops while the crops are in the scale.

In a number of embodiments, method 3100 further can include an activity 3120 of providing a container carrier configured to (i) hold a container that is submerged in the fluid while the crops are dumped from the scale into the container and (ii) lift the container out of the fluid to allow the fluid to drain from the container while the container holds the crops. The container carrier can be similar or identical to container carrier 2371 (FIG. 23). The container can be similar or identical to container 2180 (FIG. 21) and/or 2380 (FIG. 23).

In several embodiments, method 3100 additionally and optionally can include an activity 3125 of providing dividers between the crop selectors. The dividers can be similar or identical to dividers 1775 (FIG. 17). In some embodiments, the dividers are configured to pulsate to agitate the crops in the crop selection region, such as to prevent the crops from becoming clogged in the crop selection region.

In a number of embodiments, method 3100 further and optionally can include an activity 3130 of providing a sensor configured to receive information about sizes of the crops. In some embodiments, the sensor can be a camera, a LIDAR sensor, or another suitable sensor. The sensor can provide information that can be used to determine the approximate size and/or weight of each of the crops in the crop selection region and/or at the crop selectors.

In several embodiments, method 3100 additionally can include an activity 3135 of providing one or more processors configured to execute computing instructions that, when executed on the one or more processors, cause the one or more processors to perform receiving the information about the sizes of the crops and selectively activating the crop selectors individually, based on the sizes of the crops, to move the crops individually from the flume into the scale.

In a number of embodiments, method 3100 further and optionally can include an activity 3140 of providing an air knife or other suitable type of dryer configured to dry the crops in the container after the container has been lifted out of the fluid. For example, the air knife can be a dryer that provides a laminar flow of air to dry the crops.

In several embodiments, method 3100 additionally and optionally can include an activity 3145 of providing one or more harvesters on a harvesting vehicle and configured to automatically pick the crops. The harvesters can be similar or identical to harvesting robot 110 (FIG. 1). The harvesting vehicle can be similar to the harvesting vehicles described and shown in the '764 Publication.

In a number of embodiments, method 3100 further can include an activity 3150 of providing a transporter configured to automatically clean and transport the crops picked by the one or more harvesters on the harvesting vehicle. The transporter can be similar or identical to troughs 411 and/or 511-514 (FIG. 5), transfer tubes 431 and/or 531 (FIG. 5), soak tank 600 (FIG. 6), lift conveyor 850 (FIG. 8), drop tank 950 (FIG. 9), fluid system 2600 (FIG. 6), and/or other suitable elements described herein.

In several embodiments, method 3100 additionally can include an activity 3155 of providing an inspector configured to individually inspect the crops on the harvesting vehicle and classify the crops for packing. The inspector can be similar or identical to inspectors 1060 (FIGS. 10, 12A), 1061 (FIG. 10), and/or 1270 (FIGS. 12B-12C). The crops that are classified for packing can be dropped into the flume. In many embodiments, the crops can be packed in the container within a predetermined time period after the crops are picked by the one or more harvesters. For example, the predetermined time period can be approximately 4 minutes, approximately 5 minutes, approximately 6 minutes, approximately 7 minutes, approximately 8 minutes, approximately 9 minutes, approximately 10 minutes, approximately 11 minutes, approximately 12 minutes, approximately 13 minutes, approximately 14 minutes, approximately 15 minutes, or another suitable time period.

Figure 32:
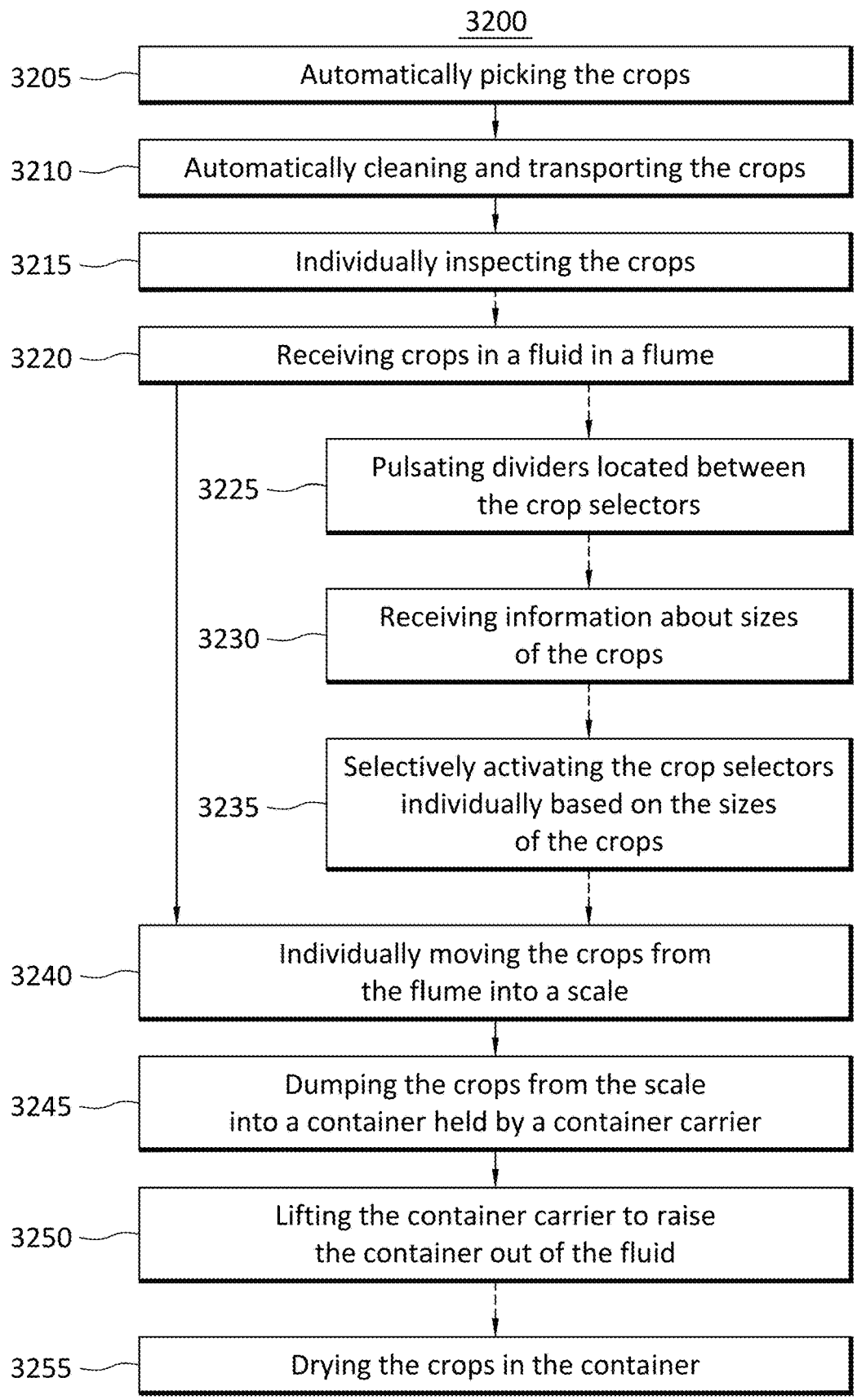
FIG. 32 illustrates a flow chart for a method 3200 of using a system with one or more packers, according to an embodiment.

Turning ahead in the drawings, FIG. 32 illustrates a flow chart for a method 3200 of using a system with one or more packers, according to an embodiment. Method 3200 is merely exemplary and is not limited to the embodiments presented herein. Method 3200 can be employed in many different embodiments or examples not specifically depicted or described herein. In some embodiments, the procedures, the processes, and/or the activities of method 3200 can be performed in the order presented. In other embodiments, the procedures, the processes, and/or the activities of method 3200 can be performed in any suitable order. In still other embodiments, one or more of the procedures, the processes, and/or the activities of method 3200 can be combined or skipped.

Referring to FIG. 32, method 3200 optionally can include an activity 3205 of automatically picking the crops using one or more harvesters on a harvesting vehicle. The harvesters can be similar or identical to harvesting robot 110 (FIG. 1). The harvesting vehicle can be similar to the harvesting vehicles described and shown in the '764 Publication.

In a number of embodiments, method 3200 also can include an activity 3210 of automatically cleaning and transporting the crops picked by the one or more harvesters on the harvesting vehicle. For example, the crops can be cleaned and/or transported using troughs 411 and/or 511-514 (FIG. 5), transfer tubes 431 and/or 531 (FIG. 5), soak tank 600 (FIG. 6), lift conveyor 850 (FIG. 8), drop tank 950 (FIG. 9), fluid system 2600 (FIG. 6), and/or other suitable elements described herein.

In several embodiments, method 3200 additionally can include an activity 3215 of individually inspecting the crops on the harvesting vehicle and classifying the crops for packing. For example, the crops can be inspected using an inspector, such as inspectors 1060 (FIGS. 10, 12A), 1061 (FIG. 10), and/or 1270 (FIGS. 12B-12C).

In a number of embodiments, method 3200 can include an activity 3220 of receiving crops in a fluid in a flume. The flume can be similar or identical to flume 1773 (FIG. 17). In a number of embodiments, the fluid flows in the flume from a drop area of the flume that receives the crops as the crops are dropped individually into the flume toward a crop selection region of the flume adjacent to crop selectors, to move the crops toward the crop selectors. The crop selectors can be similar or identical to pumpers 1871 (FIG. 18).

In several embodiments, method 3200 additionally and optionally can include an activity 3225 of pulsating dividers located between the crop selectors to agitate the crops in the crop selection region. The dividers can be similar or identical to dividers 1775 (FIG. 17).

In a number of embodiments, method 3200 further and optionally can include an activity 3230 of receiving, using a sensor, information about sizes of the crops. In some embodiments, the sensor can be a camera, a LIDAR sensor, or another suitable sensor. The sensor can provide information that can be used to determine the approximate size and/or weight of each of the crops in the crop selection region and/or at the crop selectors.

In several embodiments, method 3200 additionally and optionally can include an activity 3235 of selectively activating the crop selectors individually, based on the sizes of the crops, to move the crops individually from the flume into the scale. For example, the crop selectors can be controlled to move a crop at one of the crop selectors to the scale, while not moving crops at other crop selectors to the scale.

In a number of embodiments, method 3200 also can include an activity 3240 of individually moving the crops, using crop selectors, from the flume into a scale. The scale can be similar or identical to scale 1778 (FIG. 17). The scale can weighs the crops while the crops are in the scale. In many embodiments, the crop selectors can be independently controlled to move the crops individually from the flume into the scale.

In several embodiments, method 3200 additionally can include an activity 3245 of dumping the crops from the scale into a container held by a container carrier while the container is submerged in the fluid. For example, once the scale reaches at least a predetermined weight, the scale can dump the crops into the container. The container carrier can be similar or identical to container carrier 2371 (FIG. 23). The container can be similar or identical to container 2180 (FIG. 21) and/or 2380 (FIG. 23).

In a number of embodiments, method 3200 further can include an activity 3250 of lifting the container carrier to raise the container out of the fluid to allow the fluid to drain from the container while the container holds the crops. In a number of embodiments, the crops that are classified for packing and that are dropped into the flume can be packed in the container within a predetermined time period after the crops are picked by the one or more harvesters. For example, the predetermined time period can be approximately 4 minutes, approximately 5 minutes, approximately 6 minutes, approximately 7 minutes, approximately 8 minutes, approximately 9 minutes, approximately 10 minutes, approximately 11 minutes, approximately 12 minutes, approximately 13 minutes, approximately 14 minutes, approximately 15 minutes, or another suitable time period.

In several embodiments, method 3200 additionally optionally can include an activity 3255 of drying the crops in the container, using an air knife, after the container has been lifted out of the fluid.

Although automated transport, inspection, and packing of crops has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that various elements of FIGS. 1-32 may be modified, combined, and/or interchanged, and that the foregoing discussion of certain of these embodiments does not necessarily represent a complete description of all possible embodiments. As another example, the elements of FIGS. 1-32 can be interchanged or otherwise modified. For example, one or more of the procedures, processes, or activities of FIGS. 27-32 may include different procedures, processes, and/or activities and be performed by many different modules, in many different orders, and/or one or more of the procedures, processes, or activities of FIGS. 27-32 may include one or more of the procedures, processes, or activities of another different one of FIGS. 27-32.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   a flume comprising a fluid and configured to receive crops;
   crop selectors each sized to move the crops individually from the flume into a scale;
   the scale, wherein the scale is configured to weigh the crops while the crops are in the scale; and
   a container carrier configured to (i) hold a container that is submerged in the fluid while the crops are dumped from the scale into the container and (ii) lift the container out of the fluid to allow the fluid to drain from the container while the container holds the crops.

2. The system of claim 1, wherein the flume further comprises:
   a drop area configured to receive the crops as the crops are dropped individually into the flume; and
   a crop selection region adjacent to the crop selectors, wherein:
      the flume is configured such that the fluid flows from the drop area toward the crop selection region to move the crops toward the crop selectors.

3. The system of claim 2 further comprising:
   dividers between the crop selectors,
   wherein:
      the dividers are configured to pulsate to agitate the crops in the crop selection region.

4. The system of claim 1, wherein:
   the crop selectors are independently controlled to move the crops individually from the flume into the scale.

5. The system of claim 4 further comprising:
   a sensor configured to receive information about sizes of the crops; and
   one or more processors configured to execute computing instructions that, when executed on the one or more processors, cause the one or more processors to perform:
      receiving the information about the sizes of the crops; and
      selectively activating the crop selectors individually, based on the sizes of the crops, to move the crops individually from the flume into the scale.

6. The system of claim 1 further comprising:
   an air knife configured to dry the crops in the container after the container has been lifted out of the fluid.

7. The system of claim 1 further comprising:
   one or more harvesters on a harvesting vehicle and configured to automatically pick the crops;
   a transporter configured to automatically clean and transport the crops picked by the one or more harvesters on the harvesting vehicle; and
   an inspector configured to individually inspect the crops on the harvesting vehicle and classify the crops for packing,
   wherein:
      the system is configured such that the crops that are classified for packing are dropped into the flume and packed in the container within a predetermined time period after the crops are picked by the one or more harvesters.

8. A method of providing a system, the method comprising:
   providing a flume comprising a fluid and configured to receive crops;
   providing crop selectors each sized to move the crops individually from the flume into a scale;
   providing the scale, wherein the scale is configured to weigh the crops while the crops are in the scale; and
   providing a container carrier configured to (i) hold a container that is submerged in the fluid while the crops are dumped from the scale into the container and (ii) lift the container out of the fluid to allow the fluid to drain from the container while the container holds the crops.

9. The method of claim 8, wherein the flume further comprises:
   a drop area configured to receive the crops as the crops are dropped individually into the flume; and
   a crop selection region adjacent to the crop selectors,
   wherein:
      the flume is configured such that the fluid flows from the drop area toward the crop selection region to move the crops toward the crop selectors.

10. The method of claim 9 further comprising:
    providing dividers between the crop selectors,
    wherein:
       the dividers are configured to pulsate to agitate the crops in the crop selection region.

11. The method of claim 8, wherein:
    the crop selectors are independently controlled to move the crops individually from the flume into the scale; and
    the method further comprises:
       providing a sensor configured to receive information about sizes of the crops; and
       providing one or more processors configured to execute computing instructions that, when executed on the one or more processors, cause the one or more processors to perform:

receiving the information about the sizes of the crops; and selectively activating the crop selectors individually, based on the sizes of the crops, to move the crops individually from the flume into the scale.

12. The method of claim 8 further comprising:
providing an air knife configured to dry the crops in the container after the container has been lifted out of the fluid.

13. The method of claim 8 further comprising:
providing one or more harvesters on a harvesting vehicle and configured to automatically pick the crops;
providing a transporter configured to automatically clean and transport the crops picked by the one or more harvesters on the harvesting vehicle; and
providing an inspector configured to individually inspect the crops on the harvesting vehicle and classify the crops for packing,
wherein:
the crops that are classified for packing are dropped into the flume; and
the crops are packed in the container within a predetermined time period after the crops are picked by the one or more harvesters.

14. A method comprising:
receiving crops in a fluid in a flume;
individually moving the crops, using crop selectors, from the flume into a scale, wherein the scale weighs the crops while the crops are in the scale;
dumping the crops from the scale into a container held by a container carrier while the container is submerged in the fluid; and
lifting the container carrier to raise the container out of the fluid to allow the fluid to drain from the container while the container holds the crops.

15. The method of claim 14, wherein:
the fluid flows in the flume from a drop area of the flume that receives the crops as the crops are dropped individually into the flume toward a crop selection region of the flume adjacent to the crop selectors, to move the crops toward the crop selectors.

16. The method of claim 15 further comprising:
pulsating dividers located between the crop selectors to agitate the crops in the crop selection region.

17. The method of claim 14, wherein:
the crop selectors are independently controlled to move the crops individually from the flume into the scale.

18. The method of claim 17 further comprising:
receiving, using a sensor, information about sizes of the crops; and
selectively activating the crop selectors individually, based on the sizes of the crops, to move the crops individually from the flume into the scale.

19. The method of claim 14 further comprising:
drying the crops in the container, using an air knife, after the container has been lifted out of the fluid.

20. The method of claim 14 further comprising:
automatically picking the crops using one or more harvesters on a harvesting vehicle;
automatically cleaning and transporting the crops picked by the one or more harvesters on the harvesting vehicle; and
individually inspecting the crops on the harvesting vehicle and classifying the crops for packing,
wherein:
the crops that are classified for packing are dropped into the flume and packed in the container within a predetermined time period after the crops are picked by the one or more harvesters.

* * * * *